(12) United States Patent
Aminaka et al.

(10) Patent No.: US 8,233,116 B2
(45) Date of Patent: Jul. 31, 2012

(54) POLARIZING PLATE AND LIQUID CRYSTAL DISPLAY

(75) Inventors: Eiichiro Aminaka, Minami-Ashigara (JP); Hiroyuki Kawanishi, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1280 days.

(21) Appl. No.: 11/596,760

(22) PCT Filed: May 20, 2005

(86) PCT No.: PCT/JP2005/009717
§ 371 (c)(1),
(2), (4) Date: Nov. 16, 2006

(87) PCT Pub. No.: WO2005/114272
PCT Pub. Date: Dec. 1, 2005

(65) Prior Publication Data
US 2007/0195226 A1    Aug. 23, 2007

(30) Foreign Application Priority Data

May 20, 2004   (JP) .................................. 2004-150640
Jul. 30, 2004   (JP) .................................. 2004-223220

(51) Int. Cl.
*G02F 1/1333* (2006.01)
*G02F 1/1335* (2006.01)
(52) U.S. Cl. ............................ 349/96; 349/117; 349/122
(58) Field of Classification Search .................... 349/96, 349/117, 122
See application file for complete search history.

(56) References Cited

U.S. PATENT DOCUMENTS

| 5,705,328 | A | * | 1/1998 | Shiozaki | 430/531 |
| 6,572,941 | B1 | * | 6/2003 | Murakami et al. | 428/34 |
| 6,606,136 | B2 | * | 8/2003 | Matsumoto et al. | 349/96 |
| 2001/0015787 | A1 | * | 8/2001 | Sakuwa | 349/158 |
| 2001/0028072 | A1 | * | 10/2001 | Aoki et al. | 257/254 |
| 2002/0191128 | A1 | * | 12/2002 | Okumura et al. | 349/96 |
| 2003/0001989 | A1 | | 1/2003 | Kusumoto et al. | |
| 2003/0169497 | A1 | * | 9/2003 | Ito et al. | 359/485 |

(Continued)

FOREIGN PATENT DOCUMENTS

EP    0 911 656 A2    4/1999

(Continued)

OTHER PUBLICATIONS

Official Action dated Mar. 8, 2011, issued by the Japanese Patent Office in corresponding Japanese Patent Application No. 2006-544765, and English language translation of the Official Action.

(Continued)

*Primary Examiner* — Mark Robinson
*Assistant Examiner* — Jerry Blevins
(74) *Attorney, Agent, or Firm* — Buchanan Ingersoll & Rooney PC

(57) ABSTRACT

To provide a polarizing plate which is adjusted in curling so as to cause no defectives during sticking to a liquid crystal cell while maintaining a high optical compensation capacity and a liquid crystal display comprising the polarizing plate excellent in viewing angle properties, a polarizing plate is provided and has a polarizing film and a protective film, which curls in an amount of from −30 mm to +15 mm at 25° C. and 60% RH.

21 Claims, 1 Drawing Sheet

OBSERVER SIDE

VA MODE CELL

LIGHT SOURCE SIDE

U.S. PATENT DOCUMENTS

2004/0218117 A1* 11/2004 Matsuoka et al. ............. 349/96
2007/0035682 A1*  2/2007 Ito et al. ..................... 349/98

FOREIGN PATENT DOCUMENTS

| | | |
|---|---|---|
| JP | 2587398 B2 | 12/1996 |
| JP | 2000-258632 A | 9/2000 |
| JP | 2001-247717 A | 9/2001 |
| JP | 2001-296423 A | 10/2001 |
| JP | 2002-71957 A | 3/2002 |
| JP | 2002-258049 A | 9/2002 |
| JP | 2002-258050 A | 9/2002 |
| JP | 2002-328233 A | 11/2002 |
| JP | 2003-29036 A | 1/2003 |
| JP | 2003-75638 A | 3/2003 |
| JP | 2003-195051 A | 7/2003 |
| JP | 2003-240955 A | 8/2003 |
| JP | 2003-270442 A | 9/2003 |
| JP | 2004-20626 A | 1/2004 |
| JP | 2004-70295 A | 3/2004 |

OTHER PUBLICATIONS

Office Action (Notification for Submission of Opinions) issued by the Korean Intellectual Property Office issued in corresponding Korean Patent Application No. 2006-7024336 dated Sep. 29, 2011, with an English translation thereof.

* cited by examiner

POLARIZING PLATE AND LIQUID CRYSTAL DISPLAY

TECHNICAL FIELD

The present invention relates to a polarizing plate which curls less when stuck to a liquid crystal cell and a liquid crystal display.

BACKGROUND ART

Liquid crystal displays have been widely used for monitor for personal computer and cellular phone, television, etc. because they are advantageous in that they can operate at low voltage with low power consumption and are available in small size and thickness. These liquid crystal displays have been proposed in various modes depending on the alignment of liquid crystal molecules in the liquid crystal cell. To date, TN mode, in which liquid crystal molecules are aligned in twisted at about 90 degrees from the lower substrate to the upper substrate of the liquid crystal cell, has been a mainstream.

A liquid crystal display normally comprises a liquid crystal cell, an optical compensation sheet and a polarizing film (or a polarizer). The optical compensation sheet is used to eliminate undesirable coloring of image or expand the viewing angle. As such an optical compensation sheet there is used a stretched birefringent film or a transparent film coated with a liquid crystal. For example, Japanese Patent No. 2,587,398 discloses a technique for the expansion of the viewing angle involving the application to a TN mode liquid crystal cell of an optical compensation sheet obtained by coating a discotic liquid crystal over a triacetyl cellulose film, and then orienting (or aligning) and fixing the coat layer. However, liquid crystal displays for TV use which are supposed to give a wide screen image that can be viewed at various angles have severe requirements for dependence on viewing angle. These requirements cannot be met even by the aforementioned approach. To this end, liquid crystal displays of modes different from TN mode, including IPS (In-Plane Switching) mode, OCB (Optically Compensatory Bend) mode, VA (Vertically Aligned) mode, have been under study. In particular, VA mode has been noted as liquid crystal display for TV use because it gives a high contrast image and can be produced in a relatively high yield.

A cellulose acylate film is characterized by a higher optical isotropy (lower retardation value) than other polymer films. Accordingly, it is normally practiced to use a cellulose acylate film in uses requiring optical isotropy such as polarizing plate.

On the contrary, the optical compensation sheet (retardation film) for liquid crystal display is required to have optical anisotropy (high retardation value). In particular, the optical compensation sheet for VA mode is required to have a front retardation (Re) of from 30 to 200 nm and a thickness direction retardation (Rth) of from 70 to 400 nm. Accordingly, it has been usually practiced to use, as an optical compensation sheet, a synthetic polymer film having a high retardation value such as polycarbonate film and polysulfone film. The front retardation value and the thickness direction retardation value are optical properties calculated by formulae (V) and (VI), respectively.

$$Re = (nx - ny) \times d \quad \text{(V)}$$

$$Rth = \{(nx + ny)/2 - nz\} \times d \quad \text{(VI)}$$

wherein nx represents the refractive index in x direction of the film plane; ny represents the refractive index in y direction of the film plane; nz represents the refractive index of the film in the direction perpendicular to the film plane; and d represents the thickness (μm) of the film.

As mentioned above, it is a general principle in the art of optical material that a synthetic polymer film is used in the case where a polymer film having a high optical anisotropy (high retardation value) is required while a cellulose acylate film is used in the case where a polymer film having an optical isotropy (low retardation value) is required.

EP 0911656 A2 overthrows this conventional general principle and proposes a cellulose acylate film having a high retardation value that can be used also for purposes requiring optical anisotropy. In accordance with this proposal, an aromatic compound having at least two aromatic rings, particularly a compound having 1,3,5-triazine ring, is added to cellulose triacetate to be stretched in order to realize a cellulose triacetate film having a high retardation value. It is generally known that a cellulose triacetate is a polymer material that can be difficultly stretched and provided with a high birefringence. However, EP 0911656 A2 proposes that when additives are oriented at the same time with stretching, making it possible to raise birefringence and realize a high retardation value. This film is advantageous in that it can act also as a protective film for polarizing plate and thus can provide an inexpensive thin liquid crystal display.

JP-A-2002-71957 discloses an optical film having as a substituent a C2-C4 acyl group that satisfies formulae $2.0 \leq A + B \leq 3.0$ and $A < 2.4$ at the same time supposing that the degree of substitution by acetyl group is A and the degree of substitution by propionyl group or butyryl group is B, wherein the refractive index Nx of the film in the direction of slow axis and the refractive index Ny of the film in the direction of fast axis at a wavelength of 590 nm satisfy formula $0.0005 \leq Nx - Nz \leq 0.0050$.

JP-A-2003-270442 discloses a polarizing plate for use in VA mode liquid crystal display, wherein the polarizing plate has a polarizing film and an optically biaxial mixed aliphatic acid cellulose ester film which is disposed interposed between the liquid crystal cell and the polarizing film.

The methods disclosed in the aforementioned references are advantageous in that inexpensive thin liquid crystal displays can be obtained. In recent years, however, there has been a rapidly growing tendency for more liquid crystal displays to be larger in size. In particular, since the mixed aliphatic acid cellulose ester film disclosed in JP-A-2002-71957 and JP-A-2003-270442 has a low elastic modulus, a large thermal expansion coefficient and a large hygroscopic expansion coefficient, polarizing plates comprising the mixed aliphatic acid cellulose ester film as a protective film capable of compensating the viewing angle of liquid crystal cell can curl much, causing a problem that malsticking can easily occur at a step of sticking the polarizing plate to the liquid crystal cell.

It has been thus desired to develop a polarizing plate having an optical compensation capacity which causes no such defectives at a step of sticking a polarizing plate to a liquid crystal cell.

DISCLOSURE OF THE INVENTION

An object of an illustrative, non-limiting embodiment of the invention is to provide a polarizing plate which is adjusted in curling so as to cause no defectives at a step of sticking to a liquid crystal cell while maintaining a high optical compensation capacity, and a liquid crystal display comprising the polarizing plate excellent in viewing angle properties.

The liquid crystal displays for TV use have been required not only to expand its viewing angle but also to reduce color change (particularly in black display). Another object of an illustrative, non-limiting embodiment of the invention is to attain both the enhancement of viewing angle and the reduction of color change (tint change).

The inventors made extensive studies of solution to aforementioned problems. As a result, it was found that the aforementioned objects of the invention can be accomplished by adjusting the thickness, elastic modulus and hygroscopic expansion coefficient of the protective film on the cell side of the polarizing plate and the protective film on the side of the polarizing plate opposite the cell. Thus, the invention has been worked out. Further, both the expansion of viewing angle and the reduction of color change can be attained by adjusting the optical properties of the protective film for the viewing side polarizing plate and the backlight side protective film and the relationship between the optical properties of the protective film for the viewing side polarizing plate and the backlight side protective film and the optical properties of the liquid crystal cell.

In other words, the invention concerns a polarizing plate and a liquid crystal display having the following constitution by which the objects of the invention can be accomplished.

1. A polarizing plate comprising: a polarizing film; and at least one protective film, wherein the polarizing plate has a curl amount of from −30 mm to +15 mm at 25° C. and 60% RH.

2. The polarizing plate as defined in clause 1, which comprises: a first protective film having a thickness d1; the polarizing film; and a second protective film having a thickness d2 in this order, wherein the first protective film is between the polarizing film and a liquid crystal cell, and the thicknesses d1 and d2 satisfy formula (I):

$$0.3 \times d1 \leq d2 \leq 1.3 \times d1$$

3. The polarizing plate as defined in clause 1, which comprises: a first protective film having an elastic modulus E1; the polarizing film; and a second protective film having an elastic modulus E2 in this order, wherein the first protective film is between the polarizing film and a liquid crystal cell, and the elastic moduli E1 and E2 satisfy formula (II):

$$0.3 \times E1 \leq E2 \leq 1.3 \times E1$$

4. The polarizing plate as defined in any one of clauses 1 to 3, which comprises: a first protective film having a thickness d1 and an elastic modulus E1; the polarizing film; and a second protective film having a thickness d2 and an elastic modulus E2 in this order, wherein the first protective film is between the polarizing film and a liquid crystal cell, and the thicknesses d1 and d2 and the moduli E1 and E2 satisfy formula (III):

$$0.3 \times E1 \times d1 \times d2 \leq 1.3 \times E1 \times d1$$

5. The polarizing plate as defined in any one of clauses 1 to 4, which comprises: a first protective film having a hygroscopic expansion coefficient C1; the polarizing film; and a second protective film having a hygroscopic expansion coefficient C2 in this order, wherein the first protective film is between the polarizing film and a liquid crystal cell, and the hygroscopic expansion coefficients C1 and C2 satisfy formula (IV):

$$0.3 \times C1 \leq C2 \leq 1.3 \times C1$$

6. The polarizing plate as defined in any one of clauses 1 to 5, which has a first protective film between the polarizing film and a liquid crystal cell, wherein the first protective film satisfies formulae (VII) and (VIII) with respect to Re(λ) and Rth(λ) defined by formulae (V) and (VI):

$$Re(\lambda) = (nx - ny) \times d \quad (V)$$

$$Rth(\lambda) = \{(nx + ny)/2 - nz\} \times d \quad (VI)$$

$$20 \text{ nm} \leq Re(590) \leq 200 \text{ nm} \quad (VII)$$

$$0 \text{ nm} \leq Rth(590) \leq 400 \text{ nm} \quad (VIII)$$

wherein Re(λ) represents a retardation value by run in a film plane of the first protective film with respect to light having a wavelength of λ nm; Rth(λ) represents a retardation value by nm in a direction perpendicular to the film plane with respect to light having the wavelength of λ nm; nx represents a refractive index in a slow axis direction in the film plane; ny represents a refractive index in a fast axis direction in the film plane; nz represents a refractive index in the direction perpendicular to the film plane; and d is a thickness of the first protective film.

7. The polarizing plate as defined in any one of clauses 1 to 5, which has a first protective film between the polarizing film and a liquid crystal cell, wherein the first protective film satisfies formulae (IX) to (XII) with respect to Re(λ) and Rth(λ):

$$0 \leq Re(590) \leq 10 \text{ nm} \quad (IX)$$

$$|Rth(590)| \leq 25 \text{ nm} \quad (X)$$

$$|Re(400) - Re(700)| \leq 10 \text{ nm} \quad (XI)$$

$$|Rth(400) - Rth(700)| \leq 35 \text{ nm} \quad (XII)$$

8. The polarizing plate as defined in any one of clauses 1 to 7, which has a first protective film between the polarizing film and a liquid crystal cell, the first protective film comprising a cellulose acylate film, wherein the cellulose acylate film comprises a cellulose acylate as a main polymer component;

the cellulose acylate is a mixed aliphatic acid ester of cellulose, wherein a hydroxyl group of the cellulose is substituted by an acetyl group, and another hydroxyl group of the cellulose is substituted by an acyl group having 3 or more carbon atoms; and the cellulose acylate satisfies formulae (XIII) and (XIV):

$$2.0 \leq A + B \leq 3.0 \quad (XIII)$$

$$0 < B \quad (XIV)$$

wherein A is a degree of substitution by the acetyl group; and B is a degree of substitution by the acyl group having 3 or more carbon atoms.

9. The polarizing plate as defined in clause 8, wherein the acyl group having 3 or more carbon atoms is a butanoyl group.

10. The polarizing plate as defined in clause 8, wherein the acyl group having 3 or more carbon atoms is a propionyl group.

11. The polarizing plate as defined in any one of clauses 8 to 10, wherein the cellulose acylate has a degree of substitution of hydroxyl group at a 6-position of cellulose of 0.75 or more.

12. The polarizing plate as defined in any one of clauses 1 to 11, which has a first protective film on a side of the polarizing film facing to a liquid crystal cell, the first protective film comprising a cellulose acylate film, wherein the cellulose acylate film comprises a cellulose acylate having a glucose unit of cellulose, wherein a hydroxyl group of the glucose unit is substituted by an acyl group having 2 or more carbon atoms; and DS2, DS3 and DS6 respectively representing degrees of substitution of the hydroxyl groups at 2, 3 and 6 positions of the glucose unit by the acyl group satisfy formulae (XV) and (XVI):

$$2.0 \leq DS2+DS3+DS6 \leq 3.0 \quad \text{(XV)}$$

$$DS6/(DS2+DS3+DS6) \geq 0.315 \quad \text{(XVI)}$$

13. The polarizing plate as defined in clause 12, wherein the acyl group is an acetyl group.

14. The polarizing plate as defined in any one of clauses 1 to 13, which has a first protective film between the polarizing film and a liquid crystal cell, the first protective film comprising at least one of a plasticizer, a ultraviolet absorber, a peel accelerator, a dye and a matting agent.

15. The polarizing plate as defined in any one of clauses 1 to 6 and 8 to 14, which has a first protective film between the polarizing film and a liquid crystal cell, the first protective film comprising a retardation increasing agent that is at least one of a rod-like compound and a discotic compound.

16. The polarizing plate as defined in any one of clauses 1 to 5 and 7 to 15, which has a first protective film between the polarizing film and a liquid crystal cell, wherein the first protective film comprises a cellulose acylate film having an acyl substiturion degree from 2.85 to 3.00, and the cellulose acylate film has a compound capable of lowering $Re(\lambda)$ and $Rth(\lambda)$ in an amount of from 0.01 to 30% by weight based on a solid content of cellulose acylate.

17. The polarizing plate as defined in any one of clauses 1 to 16, which has a first protective film between the polarizing film and a liquid crystal cell, the first protective film comprising: a polymer film; and an optical anisotropic layer.

18. The polarizing plate as defined in any one of clauses 1 to 17, which has a second protective film on a side of the polarizing film opposite a liquid crystal cell, the second protective film comprising at least one layer of a hard coat layer, an anti-glare layer and an anti-reflection layer.

19. A liquid crystal display comprising a polarizing plate as defined in any one of clauses 1 to 18.

20. The liquid crystal display as defined in clause 19, which comprises: a first polarizing plate; a liquid crystal cell; and a second polarizing plate in this order, wherein the first polarizing plate has a protective film A between the polarizing film and the liquid crystal cell;

the protective film A satisfies formulae (VII) and (VIII) with respect to $Re(\lambda)$ and $Rth(\lambda)$ defined by formulae (V) and (VI);

the second polarizing plate has a protective film B between the polarizing film and the liquid crystal cell; and the protective film B satisfy formula (XVII) with respect to $Rth(\lambda)$:

$$Re(\lambda)=(nx-ny)\times d \quad \text{(V)}$$

$$Rth(\lambda)=\{(nx+ny)/2-nz\}\times d \quad \text{(VI)}$$

$$20 \text{ nm} \leq Re(590) \leq 200 \text{ nm} \quad \text{(VII)}$$

$$0 \text{ nm} \leq Rth(590) \leq 400 \text{ nm} \quad \text{(VIII)}$$

$$50 \leq Rth(590) \leq 150 \text{ nm} \quad \text{(XVII)}$$

wherein $Re(\lambda)$ represents a retardation value by nm in a film plane of the protective film with respect to light having a wavelength of $\lambda$nm; $Rth(\lambda)$ represents a retardation value by nm in a direction perpendicular to the film plane with respect to light having the wavelength of $\lambda$nm; nx represents a refractive index in a slow axis direction in the film plane; ny represents a refractive index in a fast axis direction in the film plane; nz represents a refractive index in the direction perpendicular to the film plane; and d is a thickness of the protective film.

21. The liquid crystal display as defined in clause 20, wherein the protective film B satisfies formula (XVIII) with respect to $Re(\lambda)$:

$$Re(590) \leq 20 \text{ nm}$$

22. The liquid crystal display as defined in clause 19, which comprises: a first polarizing plate; a liquid crystal cell; and a second polarizing plate in this order, wherein the first polarizing plate has a protective film A between the polarizing film and the liquid crystal cell;

the protective film A satisfies formulae (VII) and (VIII) with respect to $Re(\lambda)$ and $Rth(\lambda)$ defined by formulae (V) and (VI);

the second polarizing plate has a protective film B between the polarizing film and the liquid crystal cell; and the protective film B satisfy formula (XVIII) with respect to Rth(A):

$$Re(\lambda)=(nx-ny)\times d \quad \text{(V)}$$

$$Rth(\lambda)=\{(nx+ny)/2-nz\}\times d \quad \text{(VI)}$$

$$20 \text{ nm} \leq Re(590) \leq 200 \text{ nm} \quad \text{(VII)}$$

$$0 \text{ nm} \leq Rth(590) \leq 400 \text{ nm} \quad \text{(VIII)}$$

$$Rth(590) \leq 35 \text{ nm} \quad \text{(XVIII)}$$

wherein $Re(\lambda)$ represents a retardation value by nm in a film plane of the protective film with respect to light having a wavelength of $\lambda$nm; $Rth(\lambda)$ represents a retardation value by nm in a direction perpendicular to the film plane with respect to light having the wavelength of $\lambda$nm; nx represents a refractive index in a slow axis direction M the film plane; ny represents a refractive index in a fast axis direction in the film plane; nz represents a refractive index in the direction perpendicular to the film plane; and d is a thickness of the protective film.

23. The liquid crystal display as defined in clause 22, wherein the protective film B satisfies formulae (IX) to (XII) with respect to $Re(\lambda)$ and $Rth(\lambda)$:

$$0 \leq Re(590) \leq 10 \text{ nm} \quad \text{(IX)}$$

$$|Rth(590)| \leq 25 \text{ nm} \quad \text{(X)}$$

$$|Re(400)-Re(700)| \leq 10 \text{ nm} \quad \text{(XI)}$$

$$|Rth(400)-Rth(700)| \leq 35 \text{ nm} \quad \text{(XII)}$$

24. The liquid crystal display as defined in clause 19, which comprises: a first polarizing plate; a liquid crystal cell; and a second polarizing plate in this order, wherein the first polarizing plate has a protective film A between the polarizing film and the liquid crystal cell;

the second Polarizing plate has a protective film B between the polarizing film and the liquid crystal cell; and the liquid crystal display satisfy formula (XX):

$$0.9 \leq Rth(590)\text{total}/\Delta n \times d\text{cell} \leq 1.1$$

wherein Rth(590)total represents a sum of Rth(λ) of the protective film A and Rth(λ) of the protective film B; Rth(λ) represents a retardation value by nm in a direction perpendicular to a film plane of the protective film with respect to light having a wavelength of λnm; Δn is a birefringence of a liquid crystal in the liquid crystal cell; and dcell is cell gap.

25. The liquid crystal display as defined in clause 24, wherein the protective film A satisfies formulae (VII) and (VIII) with respect to Re(λ) and Rth(λ) defined by formulae (V) and (VI); and the protective film B satisfy formula (XVII) with respect to Rth(λ):

$$Re(\lambda) = (nx - ny) \times d \quad \text{(V)}$$

$$Rth(\lambda) = \{(nx + ny)/2 - nz\} \times d \quad \text{(VI)}$$

$$20 \text{ nm} \leq Re(590) \leq 200 \text{ nm} \quad \text{(VII)}$$

$$0 \text{ nm} \leq Rth(590) \leq 400 \text{ nm} \quad \text{(VIII)}$$

$$50 \leq Rth(590) \leq 150 \text{ nm} \quad \text{(XVII)}$$

wherein Re(λ) represents a retardation value by nm in a film plane of the protective film with respect to light having a wavelength of λnm; Rth(λ) represents a retardation value by nm in a direction perpendicular to the film plane with respect to light having the wavelength of λnm; nx represents a refractive index in a slow axis direction in the film plane; ny represents a refractive index in a fast axis direction in the film plane; nz represents a refractive index in the direction perpendicular to the film plane; and d is a thickness of the protective film.

26. The liquid crystal display as defined in clause 25, wherein the protective film B satisfies formula (XVIII) with respect to Re(λ):

$$Re(590) \leq 20 \text{ nm}$$

27. The liquid crystal display as defined in clause 19, which comprises: a first polarizing plate; a liquid crystal cell; and a second polarizing plate in this order, wherein the first polarizing plate has a protective film A between the polarizing film and the liquid crystal cell;

the second polarizing plate has a protective film B between the polarizing film and the liquid crystal cell; and the liquid crystal display satisfy formula (XXI):

$$0.6 \leq Rth(590)\text{total}/\Delta n \times d\text{cell} \leq 0.8$$

wherein Rth(590)total represents a sum of Rth(λ) of the protective film A and Rth(λ) of the protective film B; Rth(λ) represents a retardation value by nm in a direction perpendicular to a film plane of the protective film with respect to light having a wavelength of λnm; Δn is a birefringence of a liquid crystal in the liquid crystal cell; and dcell is cell gap.

28. The liquid crystal display as defined in clause 27, wherein the protective film A has satisfies formulae (VII) and (VIII) with respect to Re(λ) and Rth(λ) defined by formulae (V) and (VI); and the protective film B satisfy formula (XVIIII) with respect to Rth(λ):

$$Re(\lambda) = (nx - ny) \times d \quad \text{(V)}$$

$$Rth(\lambda) = \{(nx + ny)/2 - nz\} \times d \quad \text{(VI)}$$

$$20 \text{ nm} \leq Re(590) \leq 200 \text{ nm} \quad \text{(VII)}$$

$$0 \text{ nm} \leq Rth(590) \leq 400 \text{ nm} \quad \text{(VIII)}$$

$$Rth(590) \leq 35 \text{ nm} \quad \text{(XVIIII)}$$

wherein Re(λ) represents a retardation value by nm in a film plane of the protective film with respect to light having a wavelength of λnm; Rth(λ) represents a retardation value by run in a direction perpendicular to the film plane with respect to light having the wavelength of λnm; nx represents a refractive index in a slow axis direction in the film plane; ny represents a refractive index in a fast axis direction in the film plane; nz represents a refractive index in the direction perpendicular to the film plane; and d is a thickness of the protective film.

29. The liquid crystal display as defined in clause 28, wherein the protective film B satisfies formulae (IX) and (XII) with respect to Re(λ) and Rth(λ):

$$0 \leq Re(590) \leq 10 \text{ nm} \quad \text{(IX)}$$

$$|Rth(590)| \leq 25 \text{ nm} \quad \text{(X)}$$

$$|Re(400) - Re(700)| \leq 10 \text{ nm} \quad \text{(XI)}$$

$$|Rth(400) - Rth(700)| \leq 35 \text{ nm} \quad \text{(XII)}$$

30. The liquid crystal display as defined in any one of clauses 19 to 29, wherein the liquid crystal cell is in a vertical aligned mode.

Advantage of the Invention

The polarizing plate of the invention curls little and thus can be less poorly stuck to liquid crystal cell and exhibits an excellent effect of compensating viewing angle.

Further, the use of the polarizing plate of the invention makes it possible to eliminate the loss of the polarizing plate due to defective sticking and the loss of time required to produce the liquid crystal panel due to resticking of the polarizing plate.

Further, the liquid crystal display of the invention can attain both the expansion of viewing angle and the reduction of color change.

DETAILED DESCRIPTION OF THE INVENTION

Figure 1:
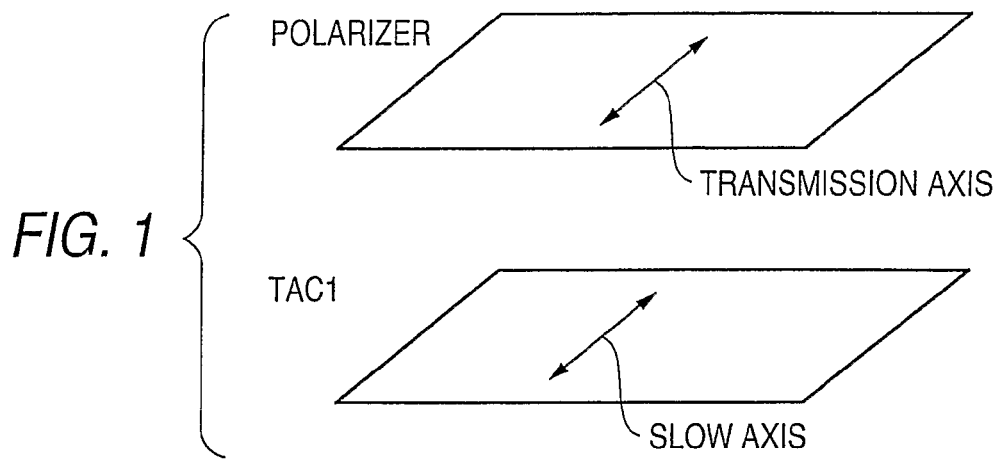
FIG. 1 is a diagram illustrating how a cellulose acylate film is superposed during the production of a polarizing plate according to an illustrative, non-limiting embodiment of the invention.

The invention will be further described hereinafter. The term "(numerical value 1) to (numerical value 2)" as used hereinafter is meant to indicate "(numerical value 1) to (numerical value 2), both inclusive". The term "(meth)acryloyl" as used hereinafter is meant to indicate "at least any of acryloyl and methacryloyl". This can apply to "(meth)acrylate", "(meth)acrylic acid", etc.

Firstly, the cellulose acylate film of the invention will be described.

The cellulose acylate film of the invention is formed by a specific cellulose acylate as a raw material. Different cellulose acylates are used from the case where the development of a great optical anisotropy is required to the case where the development of a small optical anisotropy is required.

(Cellulose Acylate to be Used in the Case where a Large Optical Anisotropy is Required)

Firstly, the cellulose acylate to be used in the invention in the case where the development of a large optical anisotropy is required will be further described. In the invention, two or more different cellulose acylates may be used in admixture.

The aforementioned specific cellulose acylate is a mixed aliphatic ester of cellulose obtained by substituting the hydroxyl groups in a cellulose by an acetyl group and an acyl group having 3 or more carbon atoms wherein the degree of substitution of hydroxyl group in the cellulose satisfies formulae (XIII) and (XIV):

$$2.0 \leq A+B \leq 3.0 \quad (XIII)$$

$$0 < B \quad (XIV)$$

wherein A and B represent the degree of substitution of hydroxyl group in the cellulose by acetyl group and acyl group having 3 or more carbon atoms, respectively.

The β-1,4-bonded glucose unit constituting the cellulose has a free hydroxyl group at the 2-, 3- and 6-positions. The cellulose acylate is a polymer obtained by esterifying some or whole of these hydroxyl groups by an acyl group. The degree of substitution by acyl group means the ratio of esterification of cellulose each at the 2-, 3- and 6-positions (100% esterification means a substitution degree of 1).

In the invention, the sum (A+B) of the degrees A and B of substitution of hydroxyl group is from 2.0 to 3.0, preferably from 2.2 to 2.9, particularly from 2.4 to 2.85 as shown by formula (XIII). The degree B of substitution is preferably more than 0, more preferably more than 0.6 as shown by formula (XIV).

When the sum (A+B) falls below 2.0, the resulting cellulose acylate exhibits too high a hydrophilicity and thus can be easily affected by ambient humidity.

Referring further to B, the hydroxyl groups at the 6-position are preferably substituted in a proportion of not smaller than 28%, more preferably not smaller than 30%, even more preferably not smaller than 31%, particularly not smaller than 32%.

Further, the sum of the degrees A and B of substitution at the 6-position of cellulose acylate is preferably 0.75 or more, more preferably 0.80 or more, particularly 0.85 or more. A solution for the preparation of a film having desirable solubility and filterability can be prepared from the cellulose acylate film. A good solvent can be prepared even with a nonchlorine-based organic solvent. A solution having a lower viscosity and better filterability can be prepared.

In the case where the cellulose acylate film is a protective film disposed on the liquid crystal cell side of the polarizing film, supposing that the degree of substitution of the hydroxyl group at the 2-position of the glucose units constituting the cellulose by an acyl group is DS2, the degree of substitution of the hydroxyl group at the 3-position of the glucose units constituting the cellulose by an acyl group is DS3 and the degree of substitution of the hydroxyl group at the 6-position of the glucose units constituting the cellulose by an acyl group is DS6, the cellulose acylate film preferably satisfies formulae (XV) and (XVI):

$$2.0 \leq DS2+DS3+DS6 \leq 3.0 \quad (XV)$$

$$DS6/(DS2+DS3+DS6) \geq 0.315 \quad (XVI)$$

When formulae (XV) and (XVI) are satisfied, the resulting cellulose acylate exhibits an enhanced solubility in a solvent and a reduced humidity dependence of optical anisotropy.

The aforementioned acyl group (B) having 3 or more carbon atoms may be either an aliphatic group or an aromatic hydrocarbon group and is not specifically limited. Examples of the acyl group include alkylcarbonyl ester of cellulose, alkenylcarbonyl ester of cellulose, aromatic carbonyl ester of cellulose, and aromatic alkylcarbonyl ester of cellulose. These acyl groups may each have substituents. Preferred among these acyl groups (B) are propionyl, butanoyl, keptanoyl, hexanoyl, octanoyl, decanonyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl, and cinnamoyl. Preferred among these acyl groups (B) are propionyl, butanoyl, decanonyl, octadecanoyl, t-butanoyl, oleoyl, benzoyl, naphthylcarbonyl, and cinnamoyl. Particularly preferred among these acyl groups (B) are propionyl and butanoyl. In the case of propionyl, the substitution degree B is preferably 1.3 or more.

Specific examples of the aforementioned mixed aliphatic cellulose acylate include cellulose acetate propionate, and cellulose acetate butyrate.

(Cellulose Acylate to be Used in the Case where a Small Optical Anisotropy is Required)

In the case where a small optical anisotropy is required, the degree of substitution of hydroxyl group in the cellulose by acyl group is preferably from 2.50 to 3.00, more preferably from 2.75 to 3.00, even more preferably from 2.85 to 3.00.

The C2-C22 acyl group by which the hydroxyl group in the cellulose is substituted may be either an aliphatic group or an allyl group and is not specifically limited. These acyl groups may be used singly or in admixture of two or more thereof. Examples of the acyl group include alkylcarbonyl ester of cellulose, alkenylcarbonyl ester of cellulose, aromatic carbonyl ester of cellulose, and aromatic alkylcarbonyl ester of cellulose. These acyl groups may each have substituents. Preferred among these acyl groups are acetyl, propionyl, butanoyl, heptanoyl, hexanoyl, octanoyl, decanonyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl, and cinnamoyl. Preferred among these acyl groups are acetyl, propionyl, butanoyl, decanonyl, octadecanoyl, t-butanoyl, oleoyl, benzoyl, naphthylcarbonyl, and cinnamoyl. Particularly preferred among these acyl groups are acetyl, propionyl and butanoyl.

The inventors made extensive studies. As a result, it was found that in the case where the amyl substituents by which the hydroxyl group in the cellulose is substituted are substantially at least two of acetyl, propionyl and butanoyl, when the total degrees of substitution is from 2.50 to 3.00, the optical anisotropy of the cellulose acylate film can be lowered. The degree of substitution by acyl is more preferably from 2.75 to 3.00, even more preferably from 2.85 to 3.00.

(Method of Synthesizing Cellulose Acylate)

A basic principle of the method of synthesizing cellulose acylate is described in Migita et al, "Mokuzai Kagaku (Wood Chemistry)", pp. 180-190, Kyoritsu Shuppan, 1968. A typical synthesis method involves liquid phase acetylation in the presence of a carboxylic anhydride-acetic acid-sulfuric acid catalyst.

In order to obtain the aforementioned cellulose acylate, a cellulose material such as cotton linter and wood pulp is pretreated with a proper amount of acetic acid, and then put in a carboxylated mixture which has been previously cooled to undergo esterification to synthesize a complete cellulose acylate (the sum of degrees of substitution by acyl in the 2-, 3- and 6-positions is almost 3.00). The aforementioned carboxylated mixture normally comprises acetic acid as a solvent, carboxylic anhydride as an esterifying agent and sulfuric acid as a catalyst. The carboxylic anhydride is normally used stoichiometrically in excess of the sum of the amount of cellulose reacting with the carboxylic anhydride and water content present in the system. The termination of the esterification reaction is followed by the addition of an aqueous solution of a neutralizing agent (e.g., carbonate, acetate or oxide of calcium, magnesium, iron, aluminum or zinc) for the purpose of hydrolyzing excessive carboxylic anhydride left in the system and neutralizing part of the esterification catalyst. Subsequently, the complete cellulose acylate thus obtained is kept at a temperature of from 50 to 90° C. in the presence of a small amount of an acetylation reaction catalyst (normally remaining sulfuric acid) to undergo saponification ripening that causes the conversion to cellulose acylate having a desired acyl substitution degree and polymerization degree. At the time when such a desired cellulose acylate is obtained, the catalyst remaining in the system is completely neutralized with a neutralizing agent mentioned above or the cellulose acylate solution is put in water or diluted sulfuric acid without being neutralized (alternatively, water or, diluted sulfuric acid is put in the cellulose acylate sol to separate the cellulose acylate which is then washed and stabilized or otherwise processed to obtain the aforementioned specific cellulose acylate.

In the aforementioned cellulose acylate film, the polymer component constituting the film is preferably made substantially of the aforementioned specific cellulose acylate. The "substantially" as used herein is meant to indicate 55% or more (preferably 70% or more, more preferably 80% or more) of the polymer component.

The aforementioned cellulose acylate is preferably used in particulate form. 90% by weight or more of the particles used preferably have a particle diameter of from 0.5 to 5 mm. Further, 50% by weight or more of the particles used preferably have a particle diameter of from 1 to 4 mm. The particulate cellulose acylate preferably is in a form as much as close to sphere.

The polymerization degree of cellulose acylate which is preferably used in the invention is preferably from 200 to 700, more preferably from 250 to 550, even more preferably from 250 to 400, particularly from 250 to 350 as calculated in terms of viscosity-average polymerization degree. The average polymerization degree can be measured by an intrinsic viscosity method proposed by Uda et al (Kazuo Uda, Hideo Saito, "Seni Gakkaishi (JOURNAL OF THE SOCIETY OF FIBER SCIENCE AND TECHNOLOGY, JAPAN)", No. 1, Vol. 18, pp. 105-120, 1962). For more details, reference can be made to JP-A-9-95538.

When low molecular components are removed, the resulting cellulose acylate has a raised average molecular weight (polymerization degree). However, the viscosity of the cellulose acylate is lower than that of ordinary acylates. Thus, as the aforementioned cellulose acylate, those freed of low molecular components are useful. Cellulose acylates having a small content of low molecular components can be obtained by removing low molecular components from cellulose acylates which have been synthesized by an ordinary method. The removal of the low molecular components can be carried out by washing the cellulose acylate with a proper organic solvent. In order to produce the cellulose acylate having a small content of low molecular components, the amount of the sulfuric acid catalyst in the acetylation reaction is preferably adjusted to a range of from 0.5 to 25 parts by weight based on 100 parts by weight of cellulose acylate. When the amount of the sulfuric acid catalyst falls within the above defined range, a cellulose acylate which is desirable also in the light of molecular weight distribution (uniform molecular weight distribution) can be synthesized. When used in the production of the cellulose acylate, the cellulose acylate preferably has a water content of 2% by weight or less, more preferably 1% by weight or less, particularly 0.7% by weight or less. A cellulose acylate normally contains water and is known to have a water content of from 2.5 to 5% by weight. In order to provide the cellulose acylate with a water content falling within this range in the invention, the cellulose acylate needs to be dried. The drying method is not specifically limited so far as the desired water content is attained.

For the details of cotton as starting material of the aforementioned cellulose acylate and its synthesis method, reference can be made to Kokai Giho No. 2001-1745, pp. 7-12, Mar. 15, 2001, Japan Institute of Invention and Innovation.

The cellulose acylate film of the invention can be obtained by filming a solution of the aforementioned specific cellulose acylate and optionally additives in an organic solvent.

(Additives)

Examples of the additives which can be incorporated in the aforementioned cellulose acylate solution in the invention include plasticizer, ultraviolet absorber, deterioration inhibitor, retardation (optical anisotropy) developer, retardation (optical anisotropy) reducer, particulate material, peel accelerator, infrared absorber and dye. In the invention, the retardation increasing agent is preferably used. It is also preferred that at least one of plasticizer, ultraviolet absorber and peel accelerator be used.

These additives may be in the form of solid material or oil-based material. In other words, these additives are not specifically limited in their inciting point or boiling point. For example, ultraviolet absorbers having a melting point of 20° C. or less and 20° C. or more may be used in admixture with each other or a plasticizer. For details, reference can be made to JP-A-2001-151901.

As the ultraviolet absorber there may be used an arbitrary kind of ultraviolet absorber depending on the purpose. Examples of the ultraviolet absorber employable herein include salicylic acid ester-based absorbers, benzophenone-based absorbers, benzotriazole-based absorbers, benzoate-based absorbers, cyano acrylate-based absorbers, and nickel complex salt-based absorbers. Preferred among these ultraviolet absorbers are benzophenone based absorbers, benzotriazole-based absorbers, and salicylic acid ester-based absorbers. Examples of the benzophenone-based ultraviolet absorbers include 2,4-dihydroxybenzophenone, 2-hydroxy-4-acetoxybenzopheone, 2-hydroxy-4-methoxy benzophenone, 2,2'-di-hydroxy-4-metoxybenzopheone, 2,2'-di-hydroxy-4,4'-metoxybenzophenone, 2-hydroxy-4-n-octoxybenzophenone, 2-hydroxy-4-dodecyloxy benzophenone, and 2-hydroxy-4-(2-hydroxy-3-methacryloxy)propoxybenzophenone. Examples of the benzotriazole-based ultraviolet absorbers include 2(2'-hydroxy-3'-tert-butyl-5'-methylphenyl)-5-chlorobenzotriazole, 2(2'-hydroxy-5' cert-butylphenyl)benzotriazole, 2(2'-hydroxy-3',5'-di-tert-amylphenyl)benzotriazole, 2(2'-hydroxy-3',5'-di-tert-butylphenyl)-5-chlorobenzotriazole, and 2(2'-hydroxy-5'-tert-octylphenyl)benzotriazole. Examples of the salicylic acid ester-based absorbers include phenyl salicylate, p-octylphenyl salicylate, and p-tert-butyl phenyl salicylate. Particularly preferred among these exemplified ultraviolet absorbers are 2-hydroxy-4-methoxybenzophenone, 2,2'-di-hydroxy-4,4'-methoxy benzophenone, 2(2'-hydroxy-3'-tert-butyl-5'-methyl phenyl)-5-chlorobenzotriazole, 2(2'-hydroxy-5'-tert-butylphenyl)benzotriazole, 2(2'-hydroxy-3',5'-di-tert-amylphehyl)benzotriazole, and 2(2'-hydroxy-3',5'-di-tert-butyphenyl)-5-chlorobenzotriazole.

A plurality of ultraviolet absorbers having different absorption wavelengths are preferably used to obtain a high barrier effect within a wide wavelength range. As the ultraviolet absorber for liquid crystal there is preferably used one having an excellent absorption of ultraviolet rays having a wavelength of 370 nm or less from the standpoint of prevention of deterioration of liquid crystal or one having little absorption of visible light having a wavelength of 400 nm or more. Particularly preferred examples of the ultraviolet absorbers include benzotriazole-based compounds and salicylic acid ester-based compounds previously exemplified. Preferred among these ultraviolet absorbers are benzotriazole-based compounds because they cause little unnecessary coloration of cellulose ester.

As the ultraviolet absorbers there may be used also compounds disclosed in JP-A-60-235852, JP-A-3-199201, JP-A-5-1907073, JP-A-5-194789, JP-A-5-271471, JP-A-6-107854, JP-A-6-118233, JP-A-6-148430, JP-A-7-11056, JP-A-7-11055, JP-A-7-11056, JP-A-8-29619, JP-A-8-239509, and JP-A-2000-204173.

The amount of the ultraviolet absorbers to be incorporated is preferably from 0.001 to 5% by weight, more preferably from 0.01 to 1% by weight based on the cellulose acylate. When the amount of the ultraviolet absorbers to be incorporated falls below 0.001% by weight, the desired effect of these ultraviolet absorbers cannot be sufficiently-exerted. On the contrary, when the amount of the ultraviolet absorbers to be incorporated exceeds 5% by weight, the ultraviolet absorbers can bleed out to the surface of the film.

Further, the ultraviolet absorber may be added at the same time as the dissolution of cellulose acylate or may be added to the dope prepared by dissolution. It is particularly preferred that using a static mixer, an ultraviolet absorber be added to the dope which is ready to be casted because the spectral absorption characteristics can be easily adjusted.

The aforementioned deterioration inhibitor can be used to prevent the deterioration or decomposition of cellulose triacetate, etc. Examples of the deterioration inhibitor include compounds such as butylamine, hindered amine compound (JP-A-8-325537), guanidine compound (JP-A-5-271471), benzotriazole-based ultraviolet absorber (JP-A-6-235819) and benzophenone-based ultraviolet-absorber (JP-A-6-118233).

As the plasticizer there is preferably used phosphoric acid ester or carboxylic acid ester. The aforementioned plasticizer is more preferably selected from the group consisting of triphenyl phosphate (TPP), tricresyl phosphate (TCP), cresyl diphenyl phosphate, octyl diphenyl phosphate, biphenyl diphenyl phosphate (BDP), trioctyl phosphate, tributyl phosphate, dimethyl phthalate (DMP), diethyl phthalate (DEP), dibutyl phthalate (DBP), dioctyl phthalate (DOP), diphenyl phthalate (DPP), diethylhexyl phthalate (DEHP), triethyl O-acetylcitrate (OACTE), tributyl O-acetylcitrate (OACTB), acetyltriethyl citrate, acetyltributyl citrate, butyl oleate, methylacetyl ricinoleate, dibutyl sebacate, triacetin, tributylin, butylphthalyl glycolate, ethylphthalylethyl glycolate, methylphthalylethyl glycolate, and butylphthalylbutyl glycolate. Further, the aforementioned plasticizer is preferably selected from the group consisting of (di)pentaerytluitolesters, glycerolesters and diglycerolesters.

Examples of the peel accelerator include citric acid ethylesters. For the details of the infrared absorbers, reference can be made to JP-A-2001-194522.

Dyes may be added to the cellulose acylate solution in the invention for adjusting hue. The amount of the dyes to be incorporated is preferably from 10 to 1,000 ppm by weight, more preferably from 50 to 1% 500 ppm by weight, based on the cellulose acylate. The dyes are preferably used to reduce the ligh piping of the cellulose acylate film and to prevent the cellulose acylate film from having a yellowish color. The dyes may be added to a solvent with cellulose acylate at the time of preparing a cellulose acylate solution, or may be added to a cellulose acylate solution during the preparation of the solution or after the preparation of the solution. The dyes may be added to an ultraviolet absorber solution that is used in inline addition. Examples of the dyes include dyes disclosed in JP-5-34858.

These additives may be added at any time during the process of preparing the dope. The step of adding these additives may be conducted at the final step in the process of preparing the dope. Further, the amount of these materials to be added is not specifically limited so far as their functions can be exhibited In the case where the cellulose acylate film is in a multi-layer form, the kind and added amount of additives in the various layers may be different. As disclosed in JP-A-2001-151902 for example, these techniques have heretofore been known. The glass transition point Tg of the cellulose acylate film measured by a Type DVA-225 Vibron dynamic viscoelasticity meter (produced by IT Keisoku Seigyo Co., Ltd.) and the elastic modulus of the cellulose acylate measured by a Type Strograph R2 tensile testing machine (produced by TOYO SEMI KOGYO CO., LTD.) are preferably predetermined to a range of from 70 to 150° C., more preferably from 80 to 135° C., and a range of from 1,500 to 4,000 MPa, more preferably from 1,500 to 3,000 MPa, respectively, by properly selecting the kind and added amount of these additives and/or the kind of cellulose acylate. In other words, the cellulose acylate film of the invention preferably exhibits a glass transition point Tg and an elastic modulus falling within the above defined range from the standpoint of adaptability to the step of forming polarizing plate or assembling liquid crystal display. The hygroscopic expansion coefficient of the cellulose acylate film is preferably determined to a range from 20 to 80 ppm/% RH, more preferably from 25 to 70 ppm/% RH, by properly selecting the kind and added amount of these additives and/or the kind of cellulose acylate.

As these additives there may be properly used those disclosed in detail in Kokai Giho No. 2001-1745, Mar. 15, 2001, pp. 16 and after, Japan Institute of Invention and Innovation.

(Retardation Increasing Agent)

In the invention, a retardation increasing agent (or a retardation developer) is preferably used to develop a large optical anisotropy and realize a desired retardation value.

The retardation increasing agent to be used in the invention may be at least one one of a rod-like (or rod-shaped) and discotic (or disc-shaped) compound.

As the aforementioned rod-like or discotic compound there may be used a compound having at least two aromatic rings.

The amount of the retardation increasing agent of a rod-like compound to be incorporated is preferably from 0.1 to 30 parts by weight, more preferably from 0.5 to 20 parts by weight based on 100 parts by weight of the polymer component containing cellulose acylate.

The discotic retardation increasing agent is preferably used in an amount of from 0.05 to 20 parts by weight, more preferably from 0.1 to 10 parts by weight, even more preferably from 0.2 to 5 parts by weight, most preferably from 0.5 to 2 parts by weight based on 100 parts by weight of the polymer component containing cellulose acylate.

The discotic compound is superior to the rod-like compound in Rth retardation developability and thus is preferably used in the case where a remarkably great Rth retardation is required.

Two or more retardation increasing agents may be used in combination.

The aforementioned retardation increasing agent of rod-like compound or discotic compound preferably has a maximum absorption at a wavelength of from 250 to 400 nm and substantially no absorption in the visible light range.

The discotic compound will be further described hereinafter. As the discotic compound there may be used a compound having at least two aromatic rings.

The term "aromatic ring" as used herein is meant to include aromatic heterocyclic groups in addition to aromatic hydrocarbon rings.

The aromatic hydrocarbon ring is preferably a 6-membered ring (i.e., benzene ring) in particular.

The aromatic heterocyclic group is normally an unsaturated heterocyclic group. The aromatic heterocyclic group is preferably a 5-membered ring, 6-membered ring or 7-membered ring, more preferably a 5-membered ring or 6-membered ring. The aromatic heterocyclic group normally has the most numerous double bonds. As hetero atoms there are preferably used nitrogen atom, oxygen atom and sulfur atom, particularly nitrogen atom. Examples of the aromatic heterocyclic group include furane ring, thiophene ring, pyrrole ring, oxazole ring, isooxazole ring, thiazole ring, isothiazole ring, imidazole ring, pyrazole ring, furazane ring, triazole ring, pyrane ring, pyridine ring, pyridazine ring, pyrimidine ring, pyrazine ring, and 1,3,5-triazine ring.

Preferred examples of the aromatic ring include benzene ring, furane ring, thiophene ring, pyrrole ring, oxazole ring, thiazole ring, imidazole ring, triazole ring, pyridine ring, pyrimidine ring, pyrazine ring, and 1,3,5-triazine ring. Particularly preferred among these aromatic rings is 1,3,5-triazine ring. In some detail, as the discotic compound there is preferably used one disclosed in JP-A-2001-166144.

The number of aromatic rings contained in the aforementioned discotic compound is preferably from 2 to 20, more preferably from 2 to 12, even more preferably from 2 to 8, most preferably from 2 to 6.

Referring to the connection of two aromatic rings, (a) they may form a condensed ring, (b) they may be connected directly to each other by a single bond or (c) they may be connected to each other via a connecting group (No spiro bond cannot be formed due to aromatic ring). Any of the connections (a) to (c) May be established.

Preferred examples of the condensed ring (a) (formed by the condensation of two or more aromatic rings) include indene ring, naphthalene ring, azlene ring, fluorene ring, phenathrene ring, anthracene ring, acenaphthylene ring, biphenylene ring, naphthacene ring, pyrene ring, indole ring, isoindole ring, benzofurane ring, benzothiophene ring, benzotriazole ring, purine ring, indazole ring, chromene ring, quinoline ring, isoquinoline ring, quinolidine ring, quinazoline ring, cinnoline ring, quinoxaline ring, phthaladine ring, puteridine ring, carbazole ring, acridine ring, phenathridine, xanthene ring, phenazine ring, phenothiazine ring, phenoxathine ring, phenoxazine ring, and thianthrene ring. Preferred among these condensed rings are naphthalene ring, azlene ring, indole ring, benzooxazole ring, benzothiazole ring, benzoimidazole ring, benzotriazole ring; and quinoline ring.

The single bond (b) is preferably a bond between the carbon atom of two aromatic rings. Two or more aromatic rings may be connected via two or more single bonds to form an aliphatic ring or nonaromatic heterocyclic group between the two aromatic rings.

The connecting group (c), too, is preferably connected to the carbon atom of two aromatic rings. The connecting group is preferably an alkylene group, alkenylene group, alkinylene group, —CO—, —O—, —NH—, —S— or combination thereof. Examples of the connecting group comprising these groups in combination will be given below. The order of the arrangement of components in the following connecting groups may be inverted.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-allylene-O—
c13: —O—CO-alkylene-CO—O—
c14: —NH—CO-alkenylene-
c15: —O—CO-alkenylene- The aromatic ring and connecting group may have substituents.

Examples of the substituents include halogen atoms (F, Cl, Br, I), hydroxyl groups, carboxyl groups, cyano groups, amino groups, sulfo groups, carbamoyl groups, sulfamoyl groups, ureido groups, alkyl groups, alkenyl groups, alkinyl groups, aliphatic acyl groups, aliphatic acyloxy groups, allcoxy groups, alkoxycarbonyl groups, alkoxycarbonylamino groups, alkylthio groups, alkylsulfonyl groups, aliphatic amide groups, aliphatic sulfonamide groups, aliphatic substituted amino groups, aliphatic substituted carbamoyl groups, aliphatic substituted sulfamoyl groups, aliphatic substituted ureido groups, and nonaromatic heterocyclic groups:

The number of carbon atoms in the alkyl group is preferably from 1 to 8. A chain-like alkyl group is preferred to cyclic allyl group. A straight-chain alkyl group is particularly preferred. The alkyl group preferably further has substituents (e.g., hydroxy group, carboxy group, alkoxy group, alkyl-substituted amino group). Examples of the alkyl group (including substituted alkyl group) include methyl group, ethyl group, n-butyl group, n-hexyl group, 2-hydroxyethyl group, 4-carboxybutyl group, 2-methoxyethyl group, and 2-diethylaminoethyl group.

The number of carbon atoms in the alkenyl group is preferably from 2 to 8. A chain-like alkinyl group is preferred to cyclic alkenyl group. A straight-chain alkenyl group is particularly preferred. The alkenyl group may further have substituents. Examples of the alkenyl group include vinyl group, allyl group, and 1-hexenyl group.

The number of carbon atoms in the alkinyl group is preferably from 2 to 8. A chain-like alkinyl group is preferred to cyclic alkinyl group. A straight-chain alkinyl group is particularly preferred. The alkinyl group may further have substituents. Examples of the alkinyl group include ethinyl group; 1-butinyl group, and 1-hexinyl group.

The number of carbon atoms in the aliphatic acyl group is preferably from 1 to 10. Examples of the aliphatic acyl group include acetyl group, propanoyl group, and butanoyl group.

The number of carbon atoms in the aliphatic acyloxy group is preferably from 1 to 10. Examples of the aliphatic acyloxy group include acetoxy group.

The number of carbon atoms in the alkoxy group is preferably from 1 to 8. The alkoxy group may further has substituents (e.g., alkoxy group). Examples of the alkoxy group (including substituted alkoxy groups) include methoxy group, ethoxy group, butoxy group, and methoxyethoxy group.

The number of carbon atoms in the alkoxycarbonyl group is preferably from 2 to 10. Examples of the alkoxycarbonyl group include methoxycarbonyl group, and ethoxycarbonyl group.

The number of carbon atoms in the alkoxycarbonylamino group is preferably from 2 to 10. Examples of the alkoxycarbonylamino group include methoxycarbonylamino group, and ethoxycarbonylamino group.

The number of carbon atoms in the alkylthio group is preferably from 1 to 12. Examples of the alkylthio group include methylthio group, ethylthio group, and octylthio group.

The number of carbon atoms in the alkylsulfonyl group is preferably from 1 to 8. Examples of the alkylsulfonyl group include methanesulfonyl group, and ethanesulfonyl group.

The number of carbon atoms in the aliphatic amide group is preferably from 1 to 10. Examples of the aliphatic amide group include acetamide group.

The number of carbon atoms in the aliphatic sulfonamide group is preferably from 1 to 8. Examples of the aliphatic sulfonamide group include methanesulfonamide group, butanesulfonamide group, and n-octanesulfonamide group.

The number of carbon atoms in the aliphatic substituted amino group is preferably from 1 to 10. Examples of the aliphatic substituted amino group include dimethylamino group, diethylamino group, and 2-carboxyethylamino group.

The number of carbon atoms in the aliphatic substituted carbamoyl group is preferably from 2 to 10. Examples of the aliphatic substituted carbamoyl group include methylcarbamoyl group, and diethylcarbamoyl group.

The number of carbon atoms in the aliphatic substituted sulfamoyl group is preferably from 1 to 8. Examples of the aliphatic substituted sulfamoyl group include methylsulfamoyl group, and diethylsulfamoyl group.

The number of carbon atoms in the aliphatic substituted ureido group is preferably from 2 to 10. Examples of the aliphatic substituted ureido group include methylureido group.

Examples of the nonaromatic heterocyclic group include piperidino group, and morpholino group.

The molecular weight of the retardation increasing agent made of discotic compound is preferably from 300 to 800.

In the invention, a rod-like compound having a linear molecular structure may be preferably used besides the aforementioned discotic compounds. The term "linear molecular structure" as used herein is meant to indicate that the molecular structure of the rod-like compound which is most thermodynamically stable is linear. The most thermodynamically stable structure can be determined by crystallographic structure analysis or molecular orbital calculation. For example, a molecular orbital calculation software (e.g., WinMOPAC2000, produced by Fujitsu Co., Ltd.) may be used to effect molecular orbital calculation, making it possible to determine a molecular structure allowing the minimization of heat formation of compound. The term "linear molecular stature" as used herein also means that the most thermodynamically stable molecular structure thus calculated forms a main chain at an angle of 140 degrees or more.

The rod-like compound is preferably one having at least two aromatic rings. As the rod-like compound having at least two aromatic rings there is preferably used a compound represented by formula (1):

$$Ar1\text{-}L1\text{-}Ar2 \tag{1}$$

wherein Ar1 and Ar2 each independently represent an aromatic ring.

Examples of the aromatic ring employable herein include aryl groups (aromatic hydrocarbon group), substituted aryl groups, and substituted aromatic heterocyclic groups.

The aryl group and substituted aryl group are preferred to the aromatic heterocyclic group and substituted aromatic heterocyclic group. The heterocyclic group in the aromatic heterocyclic group is normally unsaturated. The aromatic heterocyclic group is preferably a 5-membered ring, 6-membered ring or 7-membered ring, more preferably a 5-membered ring or 6-membered ring. The aromatic heterocyclic group normally has the most numerous double bonds. The hetero atom is preferably nitrogen atom, oxygen atom or sulfur atom, more preferably nitrogen atom or sulfur atom.

Preferred examples of the aromatic ring in the aromatic group include benzene ring, furane ring, thiophene ring, pyrrole ring, oxazole ring, thiazole ring, imidazole ring, triazole ring, pyridine ring, pyrimidine ring, and pyrazine ring. Particularly preferred among these aromatic rings is benzene ring.

Examples of the substituents on the substituted aryl group and substituted aromatic heterocyclic group include halogen atoms (F, Cl, Br, I), hydroxyl groups, carboxyl groups, cyano groups, amino groups, alkylamino groups (e.g., methylamino group, ethylamino group, butylamino group, dimethylamino group), nitro groups, sulfo groups, carbamoyl groups, alkylcarbamoyl groups (e.g., N-methylcarbamoyl group, N-ethylcarbamoyl group, N,N-dimethylcarbamoyl group), sulfamoyl groups, alkylsulfamoyl groups (e.g., N-methylsulfamoyl group, N-ethylsulfamoyl group, N,N-dimethylsulfamoyl group), ureido groups, alkylureido groups (e.g., N-methylureido group, N,N-dimethylureido group, N,N,N'-trimethyl ureido group), alkyl groups (e.g., methyl group, ethyl group, propyl group, butyl group, pentyl group, heptyl group, octyl group, isopropyl group, s-butyl group, t-amyl group, cyclohexyl group, cyclopentyl group), alkenyl groups (e.g., vinyl group, allyl group, hexenyl group), alkinyl groups (e.g., ethinyl group, butinyl group), acyl groups (e.g., formyl group, acetyl group, butyryl group, hexanoyl group, lauryl group), acyloxy groups (e.g., acetoxy group, butyryloxy group, hexanoyloxy group, lauryloxy group), alkoxy groups (e.g., methoxy group, ethoxy group, propoxy group, butoxy group, pentyloxy group, heptyloxy group, octyloxy group), aryloxy groups (e.g., phenoxy group), alkoxycarbonyl groups (e.g., methoxycarbonyl group, ethoxycarbonyl group, propoxycarbonyl group, butoxycarbonyl group, pentyloxycarbonyl group, heptyloxycarbonyl group), aryloxycarbonyl groups (e.g., phenoxycarbonyl group), alkoxycarbonylamino groups (e.g., butoxycarbonylamino group, hexyloxycarbonylamino group), alkylthio groups (e.g., methylthio group, ethylthio group, propylthiogoup, butylthio group, pentylthio group, heptylthio group, octylthio group), arylthio groups (e.g., phenylthio group), alkylsulfonyl groups (e.g., methyl sulfonyl group, ethylsulfonyl group, propylsulfonyl group, butylsulfonyl group, pentylsulfonyl group, heptylsulfonyl group, octylsulfonyl group), amide groups (e.g., acetamide group, butylamide group, hexylamide group, laurylamide group), and nonaromatic heterocyclic groups (e.g., morpholyl group, pyradinyl group).

Examples of the substituents on the substituted aryl group and substituted aromatic heterocyclic group include halogen atoms, cyano groups, carboxyl groups, hydroxyl groups, amino groups, alkyl-substituted amino groups, acyl groups, acyloxy groups, amide groups, alkoxycarbonyl groups, alkoxy groups, alkylthio groups, and alkyl groups.

The alkyl moiety and alkyl group in the alkylamino group, alkoxycarbonyl group, alkoxy group and alkylthio group may further have substituents. Examples of the substituents on the alkyl moiety and alkyl group include halogen atoms, hydroxyl groups, carboxyl groups, cyano groups, amino groups, alkylamino groups, nitro groups, sulfo groups, carbamoyl groups, alkylcarbamoyl groups, sulfamoyl groups, alkylsulfamoyl groups, ureido groups, alkylureido groups, alkenyl groups, alkinyl groups, acyl groups, acyloxy groups, acylamino groups, alkoxy groups, aryloxy groups, alkoxycarbonyl groups, aryloxycarbonyl groups, alkylthio groups, arylthio groups, alkylsulfonyl groups, amide groups, and nonaromatic heterocyclic groups. Preferred among these substituents on the alkyl moiety and alkyl group are halogen atoms, hydroxyl groups, amino groups, alkylamino groups, acyl groups, aryloxy groups, acylamino groups, and alkoxy groups.

In formula (1), L1 represents a divalent connecting group selected from the group consisting of groups composed of alkylene group, alkenylene group, alkinylene group, —O—, —CO— and combination thereof.

The alkylene group may have a cyclic structure. The cyclic alkylene group is preferably cyclohexylene, particularly 1,4-cyclohexylene. As the chain-like alkylene group, a straight-chain alkylene is preferred to a branched alkylene.

The number of carbon atoms in the alkylene group is preferably from 1 to 20, more preferably from 1 to 15, even more preferably from 1 to 10, even more preferably from 1 to 8, most preferably from 1 to 6.

The alkenylene group and alkinylene group preferably has a chain-like structure rather than cyclic structure, more preferably a straight-chain structure than branched chain-like structure.

The number of carbon atoms in the alkenylene group and alkinylene group is preferably from 2 to 10, more preferably from 2 to 8, even more preferably from 2 to 6, even more preferably from 2 to 4, most preferably 2 (vinylene or ethinylene).

The number of carbon atoms in the arylene group is preferably from 6 to 20, more preferably from 6 to 16, even more preferably from 6 to 12.

In the molecular structure of formula (1), the angle formed by Ar1 and Ar2 with L1 interposed therebetween is preferably 140 degrees or more.

The rod-like compound is more preferably a compound represented by formula (2):

$$Ar1\text{-}L2\text{-}X\text{-}L3\text{-}Ar2 \qquad (2)$$

wherein Ar1 and Ar2 each independently represent an aromatic group. The definition and examples of the aromatic group are similar to that of Ar1 and Ar2 in formula (1).

In formula (2), L2 and L3 each independently represent a divalent connecting group selected from the group consisting of groups formed by alkylene group, —O—, —CO— and combination thereof.

The alkylene group preferably has a chain-like structure rather than cyclic structure, more preferably a straight-chain structure rather than branched chain-like structure.

The number of carbon atoms in the alkylene group is preferably from 1 to 10, more preferably from 1 to 8, even more preferably from 1 to 6, even more preferably from 1 to 4, most preferably 1 or 2 (methylene or ethylene).

L2 and L3 each are preferably —O—CO— or —CO—O— in particular.

In formula (2), X represents 1,4-cyclohexylene, vinylene or ethinylene.

Specific examples of the compound represented by formula (1) or (2) include those disclosed in JP-A-2004-109657, (ka-1) to (ka-11).

Other preferred examples of these compounds will be given below.

(46)
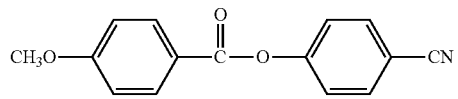

(47)
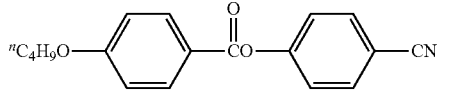

(48)
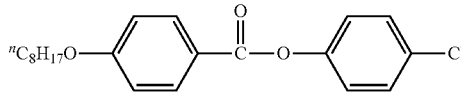

(49)
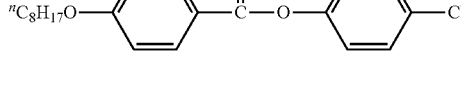

(50)
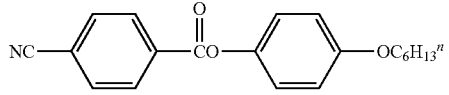

(51)
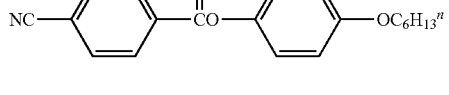

(52)
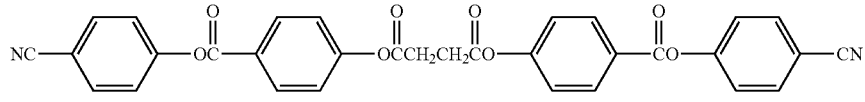

(53)

(54)
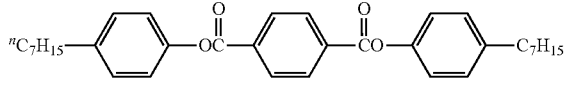

-continued

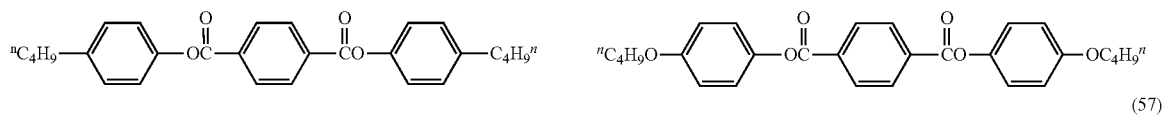
(55) (56)

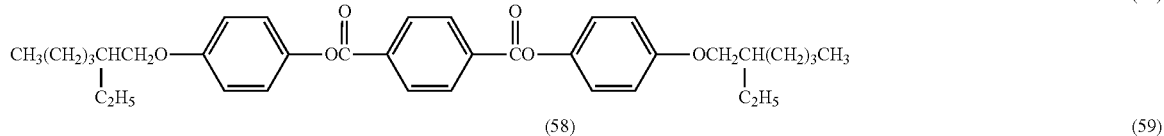
(57)

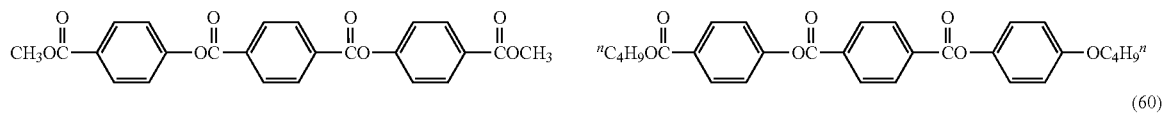
(58) (59)

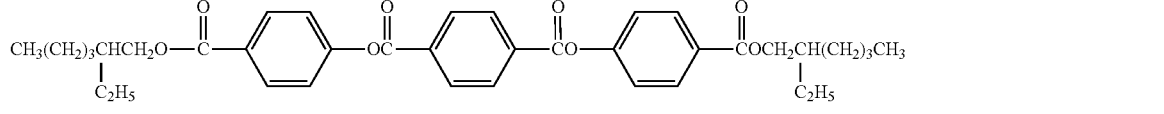
(60)

(61) (62)

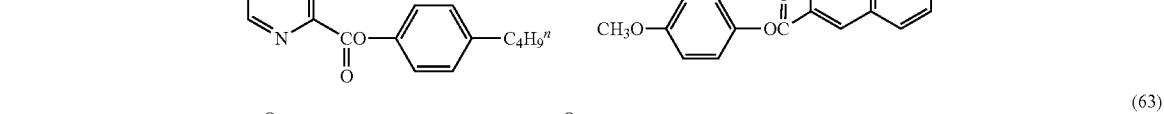

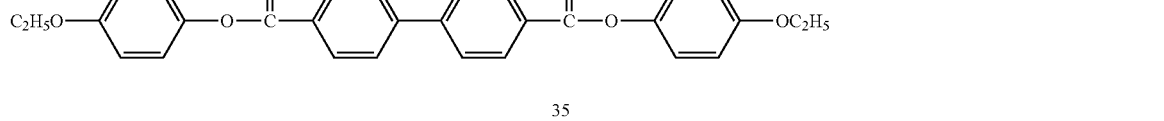
(63)

Two or more rod-like compounds having a maximum absorption wavelength (λmax) of shorter than 250 nm in the ultraviolet absorption spectrum of solution may be used in combination.

The rod-like compound can be synthesized by any method disclosed in literatures such as "Mol. Cryst. Liq. Cryst.", vol. 53, page 229, 1979, "Mol. Cryst. Liq. Cryst.", vol. 89, page 93, 1982, "Mol. Cryst. Liq. Cryst.", vol. 145, page 11, 1987, "Mol. Cryst. Liq. Cryst.", vol. 170, page 43, 1989, "J. Am. Chem. Soc.", vol. 113, page 1,349, 1991, "J. Am. Chem. Soc.", vol. 118, page 5,346, "J. Am. Chem. Soc.", vol. 92, page 1,582, 1970, "J. Org. Chem.", vol. 40, page 420, 1975, and "Tetrahedron", vol. 48, No. 16, page 3,437, 1992.

(Retardation Reducer)

Firstly, the compound for reducing the optical anisotropy of the cellulose acylate film will be described. As a result of extensive studies, the present inventors succeeded in giving Re and Rth of zero or close to zero by sufficiently reducing the optical anisotropy using a compound that inhibits the orientation of cellulose acylate in the film in the in-plane and thickness directions. To this end, the compound that reduces the optical anisotropy should be sufficiently compatible with the cellulose acylate and have neither rod-like structure nor planar structure to advantage. In some detail, in the case where the compound has a plurality of planar functional groups such as aromatic group, the compound should have a structure such that these functional groups are disposed in nonplanar arrangement rather than on the same plane.

(Log P value)

In order to prepare a cellulose acylate film of the invention, a compound having an octanol-water distribution coefficient (log P) of from 0 to 7 is desirable among the compounds that inhibit the orientation of cellulose acylate in the film in the in-plane and thickness directions to reduce the optical anisotropy. The compound having a log P of more than 7 lacks compatibility with cellulose acylate and thus can easily cause the clouding of the film or dusting. The compound having a log P of less than 0 has a high hydrophilicity that can cause the deterioration of the water resistance of the cellulose acylate film. The log P value is more preferably from 1 to 6, particularly from 1.5 to 5.

For the measurement of octanol-water distribution coefficient (log P value), a flask osmosis method described in JIS Z7260-107 (2000) can be employed. The octanol-water distribution coefficient can be estimated by computational chemistry or empirical method rather than measurement Preferred examples of the calculation method employable herein include Crippen's fragmentation method (J. Chem. Inf. Comput Sci., 27, 21 (1987)), Viswanadhan's fragmentation method (J. Chem. Inf. Comput. Sci., 29, 163 (1989)), and Broto's fragmentation method (Eur. J. Med. Chem.—Chim. Theor., 19, 71 (1984)). Particularly preferred among these calculation methods is Crippen's fragmentation method (J. Chem. Inf. Comput. Sci., 27, 21 (1987)). In the case where the log P value of a compound differs with the measurement method or calculation method, it is desired to use Crippen's fragmentation method to judge to see whether or not the compound falls within the above defined range.

(Physical Properties of Compound for Reducing Optical Anisotropy)

The compound for reducing optical anisotropy may or may not contain aromatic groups. The compound for reducing optical anisotropy preferably has a molecular weight of from not smaller than 150 to not greater than 3,000, more preferably from not smaller than 170 to not greater than 2,000, particularly from not smaller than 200 to not greater than 1,000. The compound for reducing optical anisotropy may have a specific monomer structure or an oligomer or polymer structure comprising a plurality of such monomer units connected to each other so far as it has a molecular weight falling within this range.

The compound for reducing optical anisotropy preferably stays liquid at 25° C. or is a solid material having a melting point of from 25 to 250° C., more preferably stays liquid at 25° C. or is a solid material having a melting point of from 25 to 200° C. The compound for reducing optical anisotropy preferably undergoes no evaporation during the casting and drying of dope in the preparation of cellulose acylate film.

The added amount of the compound for reducing optical anisotropy is preferably from 0.01 to 30% by weight, more preferably from 1 to 25% by weight, particularly from 5 to 20% by weight based on the weight of cellulose acylate.

The compounds for reducing optical anisotropy may be used singly or in admixture of two or more thereof at an arbitrary ratio.

The compound for reducing optical anisotropy may be added at any time during the preparation of the dope or in the final stage of the preparation of the dope.

The content of the compound for reducing optical anisotropy average over the region ranging from at least one surface of the cellulose acylate film to a thickness corresponds to 10% of the total thickness is from 80 to 99% of the average content of the compound in the central portion of the cellulose acylate film. The amount of the compound of the invention in the cellulose acylate film can be determined by measuring the amount of the compound on the surface of the film and in the central portion of the film using infrared absorption spectrum described in JP-A-8-57879.

Specific examples of the compound for reducing the optical anisotropy of the cellulose acylate film which can be preferably used in the invention will be given below, but the invention is not limited thereto.

A-1
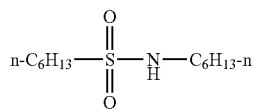

A-2
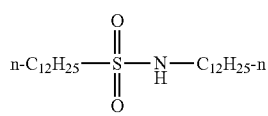

A-3
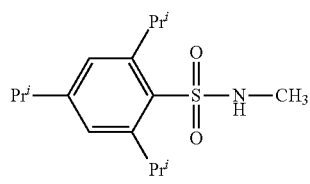

A-4
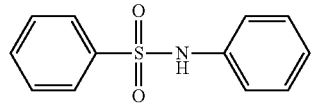

A-5
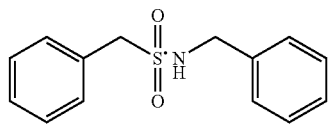

A-6
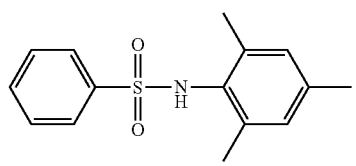

A-7
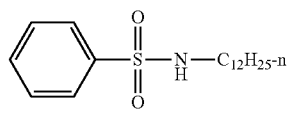

A-8
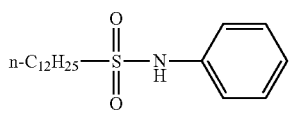

A-9
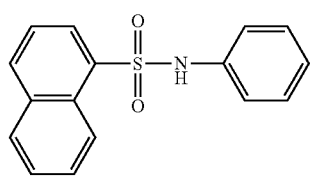

A-10
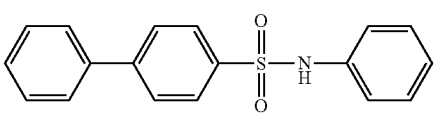

A-11
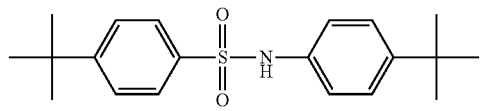

A-12
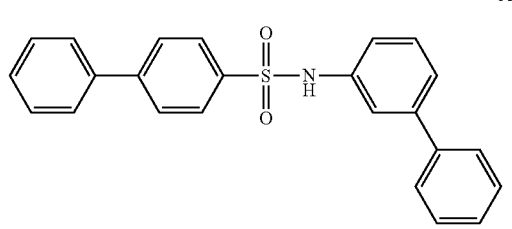

A-13
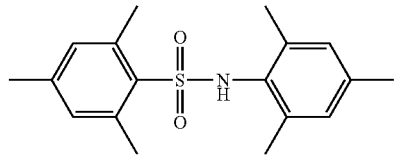

A-14
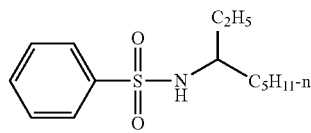

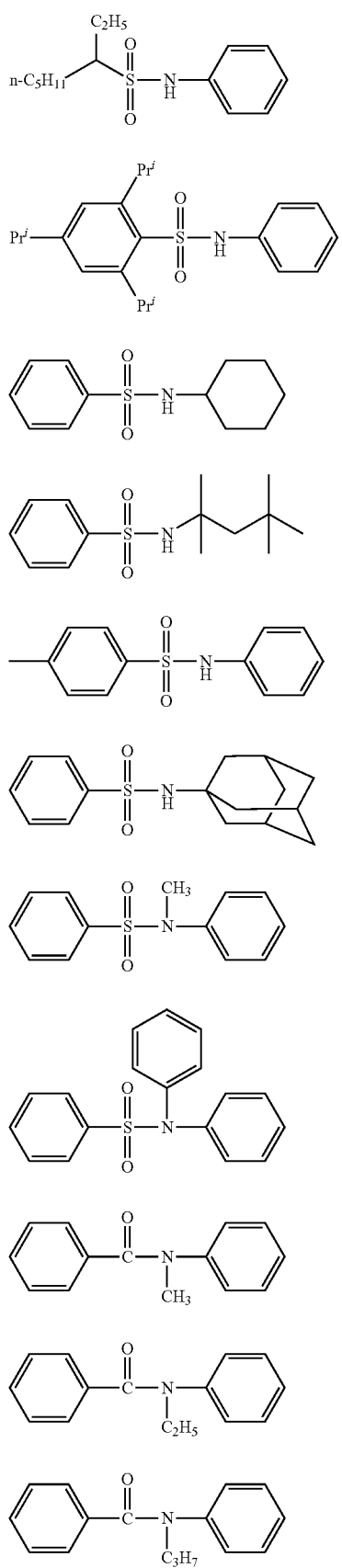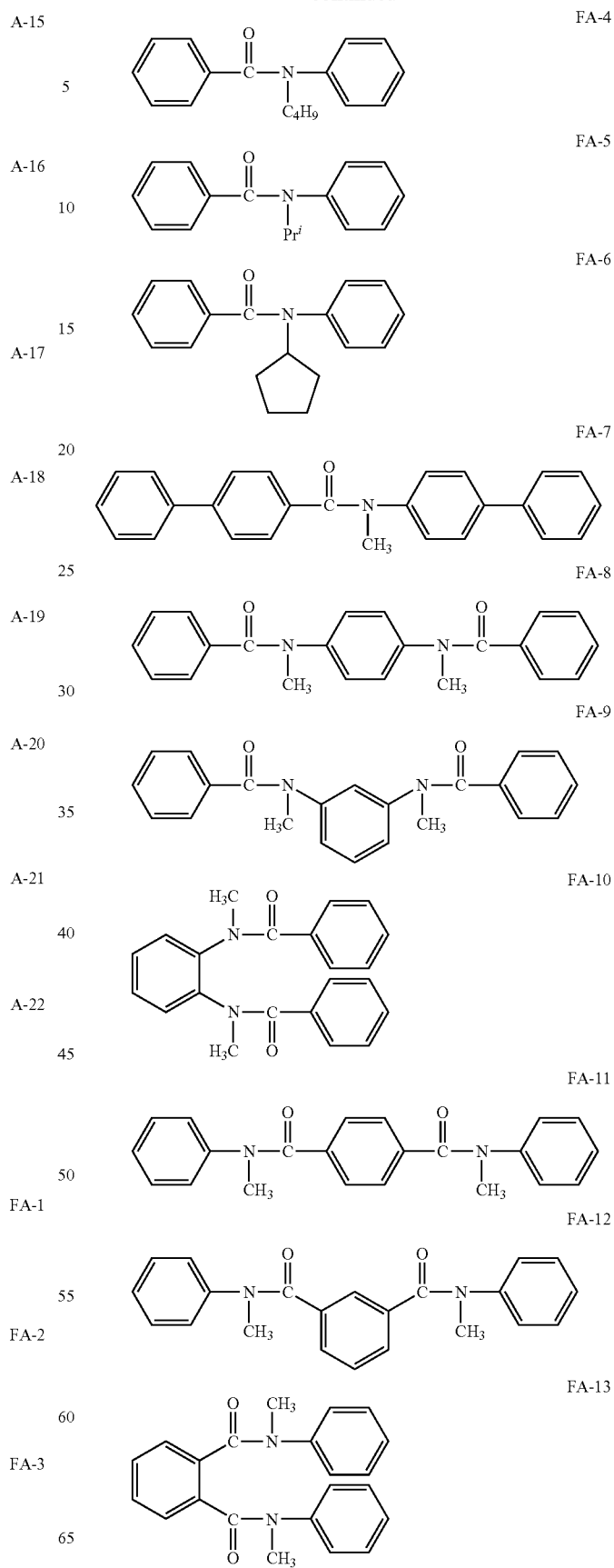

FA-14
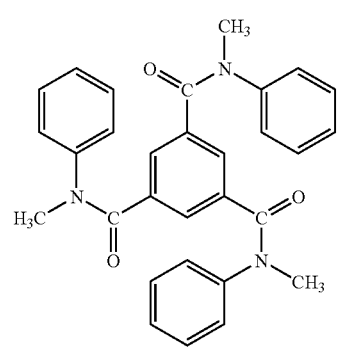
FA-15
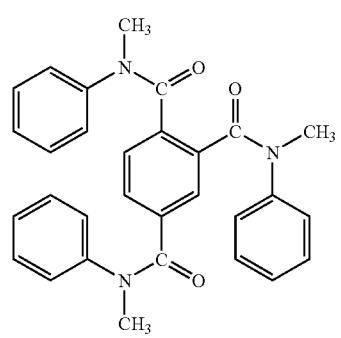
FA-16
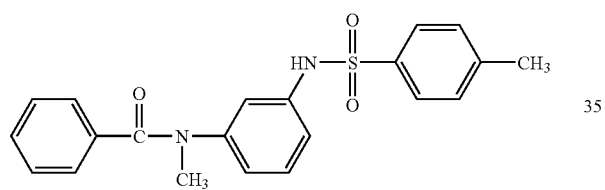
FA-17
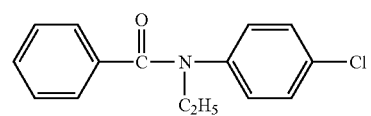
FA-18
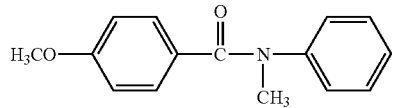
FA-19
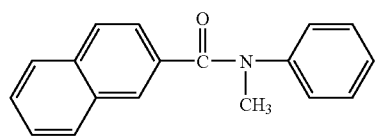
FA-20
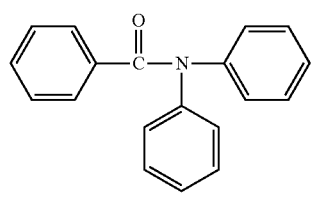
FA-21
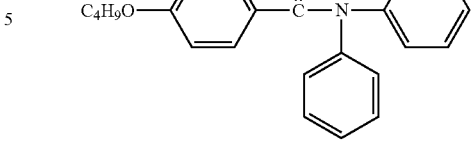
FA-22
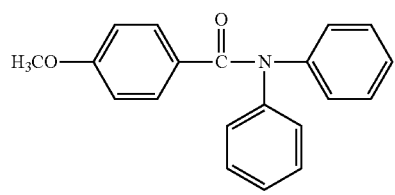
FA-23
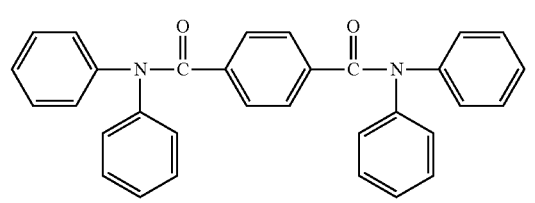
FA-24
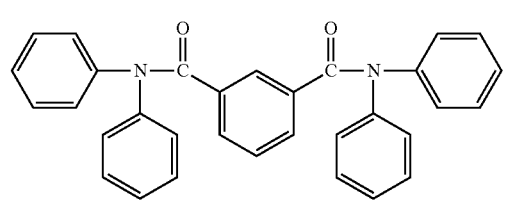
FA-25
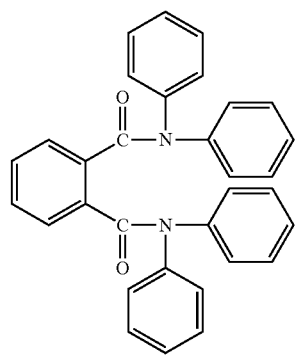
FA-26
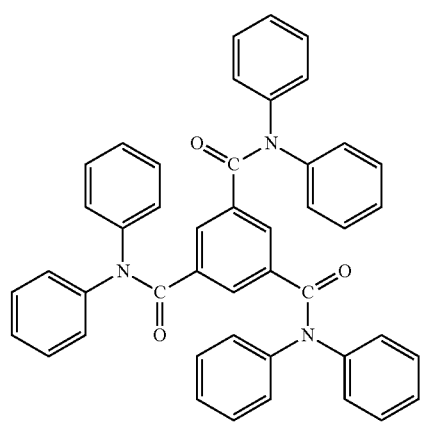

FA-27
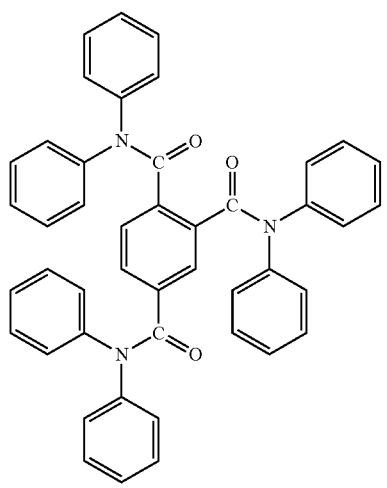
FA-28
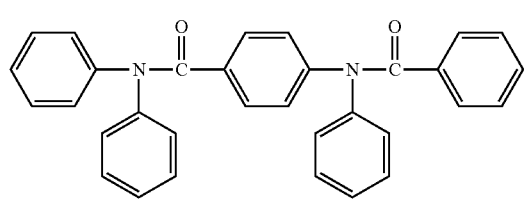
FB-1
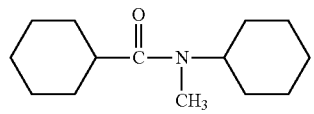
FB-2
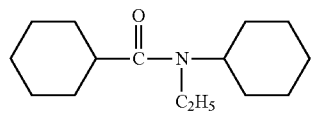
FB-3
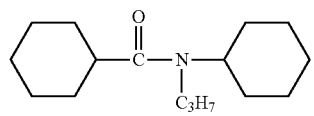
FB-4
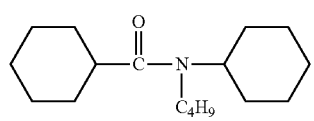
FB-5
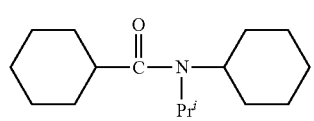
FB-6
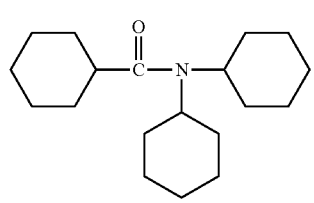
FB-7
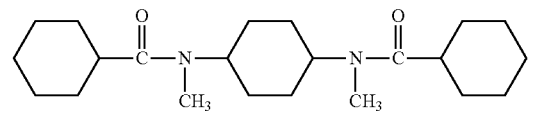
FB-8
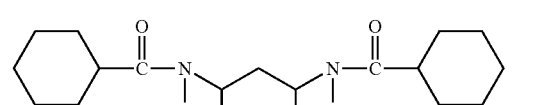
FB-9
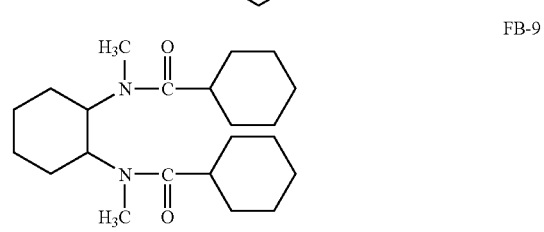
FB-10
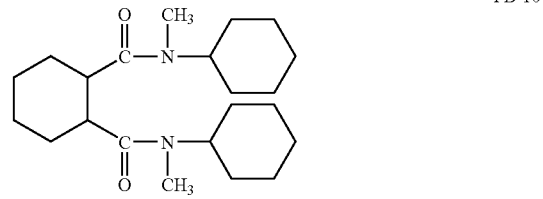
FB-11
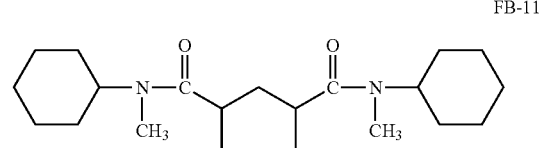
FB-12
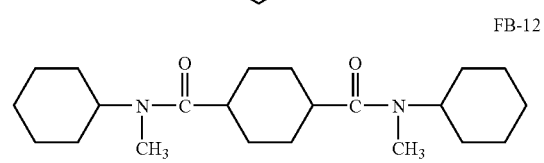
FB-13
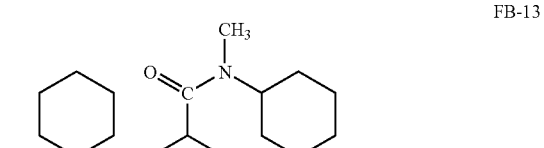
FB-14
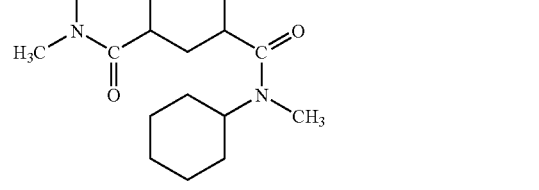

FB-15
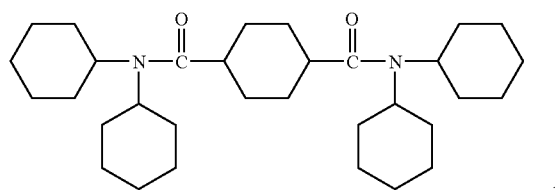
FB-16
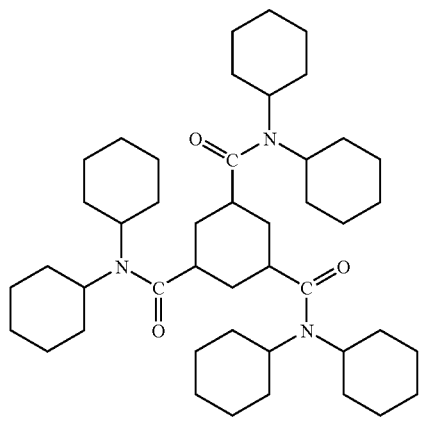
FB-17
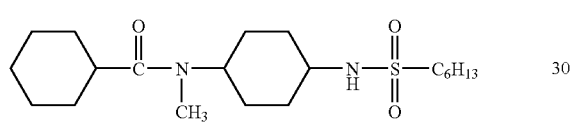
FB-18
FB-19
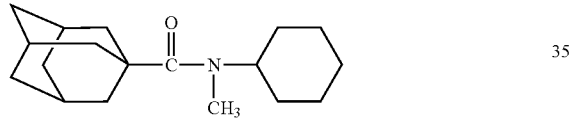
FB-20
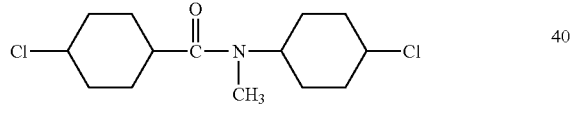
FB-21
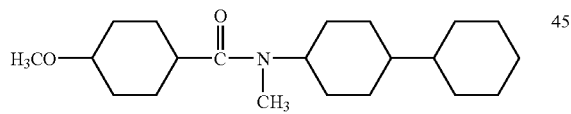
FB-22
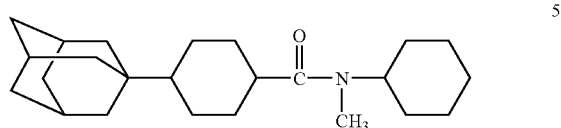
FB-23
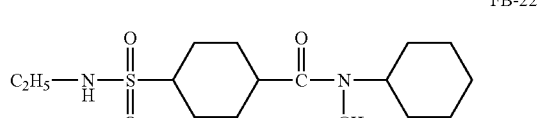
FB-24
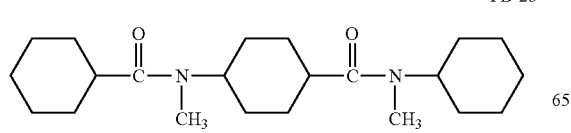
FC-1
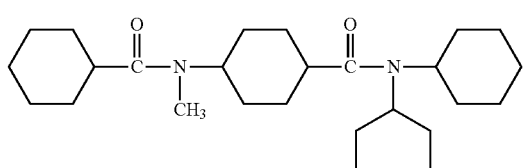
FC-2
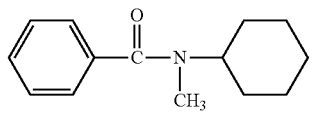
FC-3
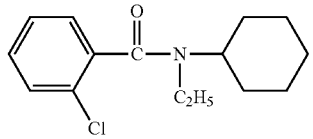
FC-4
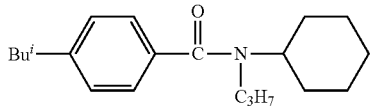
FC-5
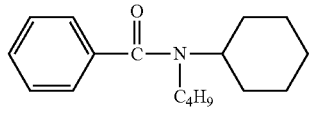
FC-6
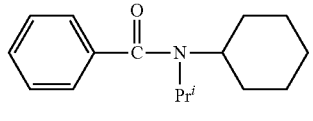
FC-7
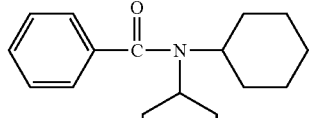
FC-8
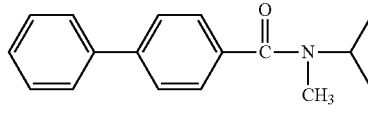
FC-9
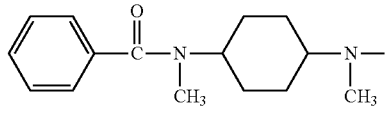

-continued

FC-10, FC-11, FC-12, FC-13, FC-14, FC-15, FC-16

FC-17, FC-18, FC-19, FC-20, FC-21, FC-22, FC-23, FC-24, FC-25

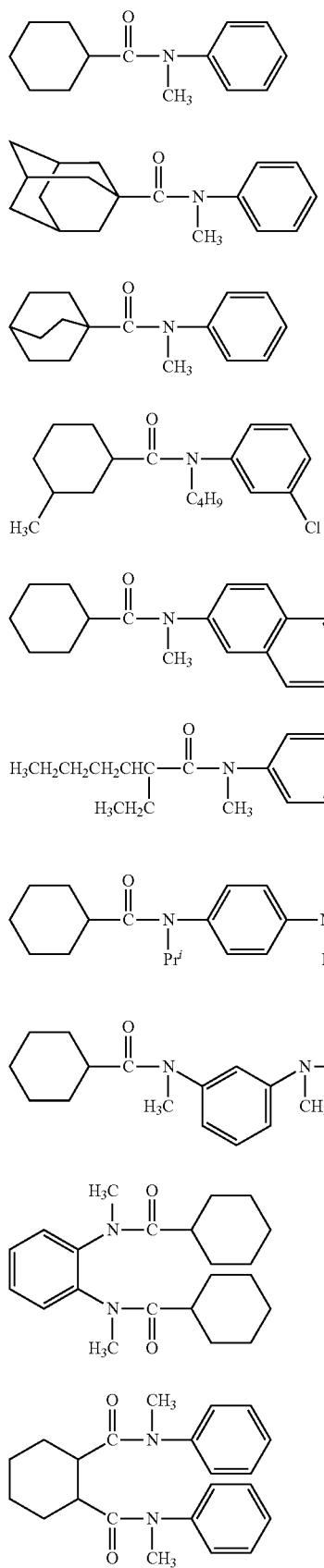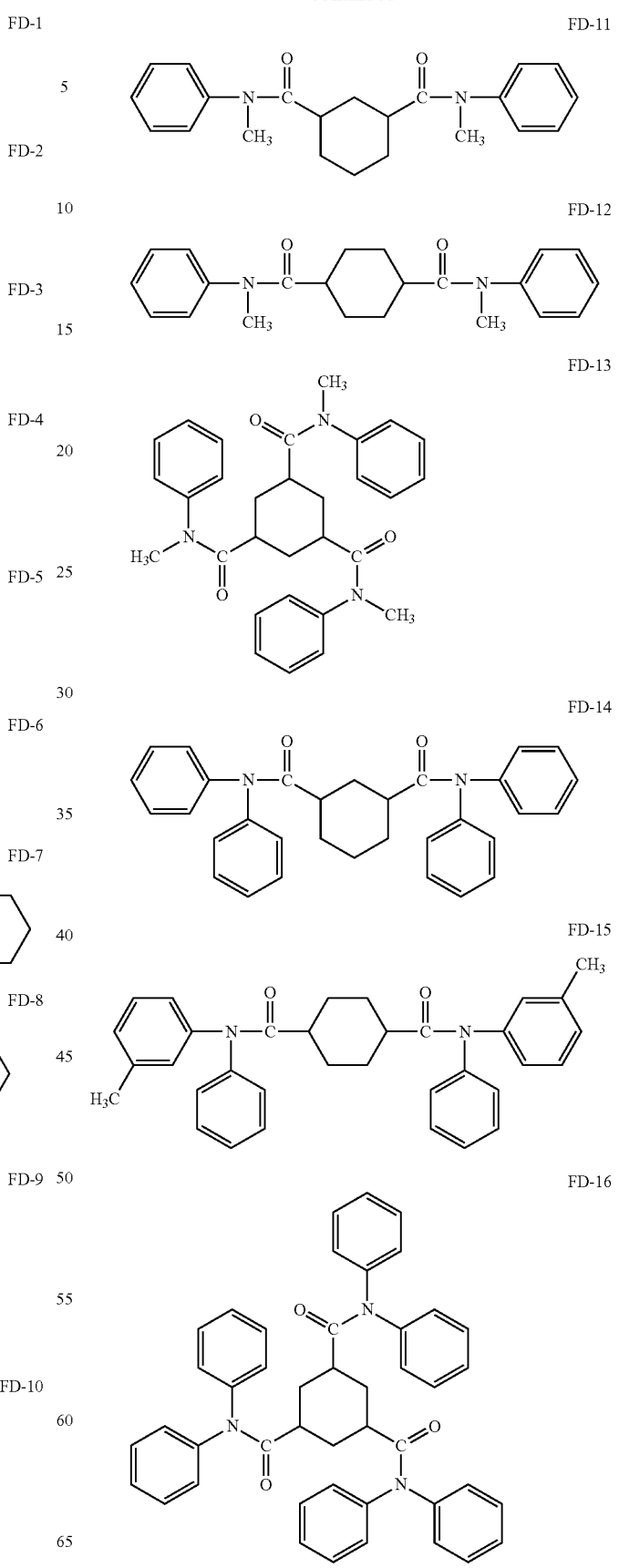

FD-17
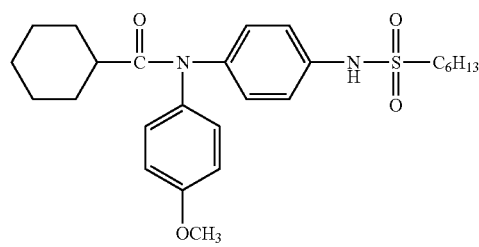
FD-18
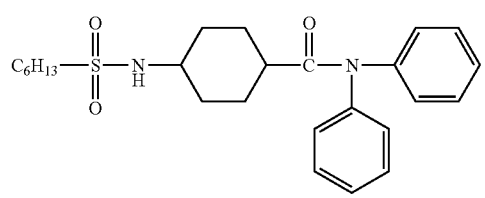
FD-19
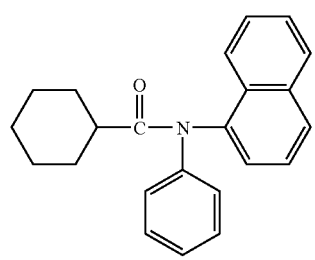
FD-20
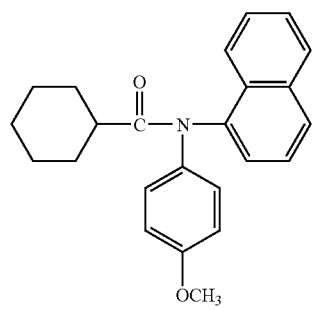
FD-21
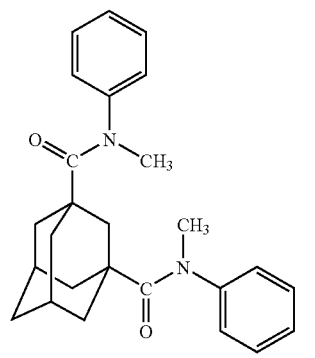
FD-22
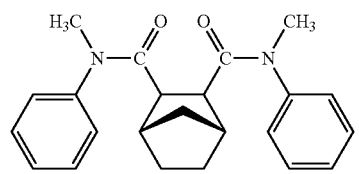
I-1
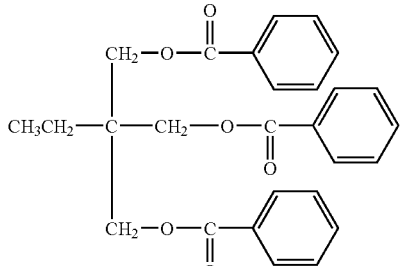
I-2
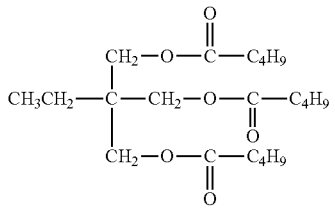
I-3
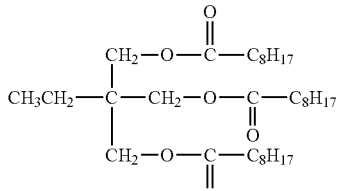
I-4
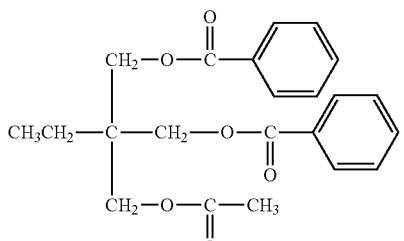
I-5
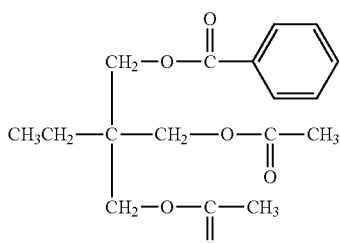
I-6
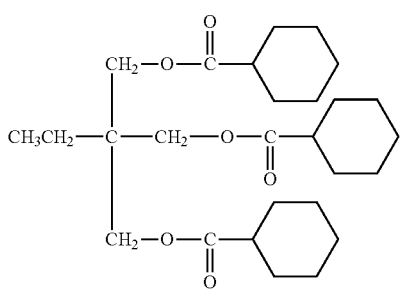
(Wavelength Dispersion Adjustor)
The compound for deteriorating the wavelength dispersion of the cellulose acylate film will be described hereinafter. As a result of extensive studies, the present inventors succeeded in adjusting Re and Rth wavelength dispersion of cellulose acylate film by incorporating at least one compound having absorption in ultraviolet range of from 200 to 400 nm that deteriorates |Re(400)-Re(700)| and |Rth(400)-Rth(700)| of film in an amount of from 0.01 to 30% by weight based on the solid content of cellulose acylate. When the added amount of the compound is from 0.1 to 30% by weight, Re and Rth wavelength dispersion of the cellulose acylate film can be adjusted.

The wavelength dispersion characteristics of the cellulose acylate film are such that Re and Rth value are normally greater on the long wavelength side than on the short wavelength side. Accordingly, it is required that Re and Rth values on the short wavelength side, which are relatively small, be raised to smoothen wavelength dispersion. On the other hand, the compound having absorption in ultraviolet range of from 200 to 400 nm has wavelength dispersion characteristics such that absorbance is greater on the long wavelength side than on the short wavelength side. It is presumed that when the compound itself is isotropically present in the cellulose acylate film, the birefringence of the compound itself and hence Re and Rth wavelength dispersion is greater on the short wavelength side similar to the wavelength dispersion of absorbance.

Accordingly, the use of the aforementioned compound which has absorption in ultraviolet range of from 200 to 400 nm and greater Re and Rth wavelength dispersion on the short wavelength side makes it possible to adjust Re and Rth wavelength dispersion of cellulose acylate film. To this end, it is required that the compound the wavelength dispersion of which is needed to be adjusted have a sufficiently uniform compatibility with cellulose acylate. The ultraviolet absorption wavelength range of such a compound is preferably from 200 to 400 nm, more preferably from 220 to 395 nm, even more preferably from 240 to 390 nm.

In recent years, optical members for liquid crystal display having a higher transmission have been required to enhance the brightness of liquid crystal displays for television, note personal computer, mobile type cellular phone terminal with smaller electric power. In this respect, the compound which has absorption in ultraviolet range of from 200 to 400 nm and deteriorates |Re(400)-Re(700)| and |Rth(400)-Rth (700)| of film is required to have an excellent spectral transmittance when incorporated in the cellulose acylate film. The cellulose acylate film of the invention preferably has a spectral transmittance of from not smaller than 45% to not greater than 95% at a wavelength of 380 nm and a spectral transmittance of 10% or less at a wavelength of 350 nm.

The aforementioned wavelength dispersion adjustor which can be preferably used in the invention preferably has a molecular weight of from 250 to 1,000, more preferably from 260 to 800, even more preferably from 270 to 800, particularly from 300 to 800 from the standpoint of volatility. The wavelength dispersion adjustor may have a specific monomer structure or an oligomer or polymer structure comprising a plurality of such monomer units connected to each other so far as it has a molecular weight falling within this range.

The wavelength dispersion adjustor of the invention preferably undergoes no evaporation during the casting and drying of dope in the preparation of cellulose acylate film.

(Added Amount of Compound)

The added amount of the aforementioned wavelength dispersion adjustor which can be preferably used in the invention is preferably from 0.01 to 30% by weight, more preferably from 0.1 to 20% by weight, particularly from 0.2 to 10% by weight based on the weight of the cellulose acylate.

(Method of Adding Compound)

These wavelength dispersion adjustors may be used singly or in admixture of two or more thereof at an arbitrary ratio.

The wavelength dispersion adjustor may be added at any time during the preparation of the dope or in the final stage of the preparation of the dope.

Specific examples of the wavelength dispersion adjustor which can be preferably used in the invention include benzotriazole-based compounds, benzophenone-based compounds, cyano-containing compounds, oxybenzophenone-based compounds, salicylic acid ester-based compounds, and nickel complex salt-based compounds. The invention is not limited to these compounds.

(Particulate Matting Agent)

The cellulose acylate film of the invention preferably has a particulate material incorporated therein as a matting agent. Examples of the particulate material employable herein include silicon dioxide, titanium dioxide, aluminum oxide, zirconium oxide, calcium carbonate, talc, clay, calcined kaolin, calcined calcium silicate, hydrous calcium silicate, aluminum silicate, magnesium silicate, and calcium phosphate. The particulate material preferably contains silicon to reduce turbidity. In particular, silicon dioxide is preferred. The particulate silicon dioxide preferably has a primary average particle diameter of 20 nm or less and an apparent specific gravity of 70 g/l or more. The primary average particle diameter of the particulate silicon dioxide is more preferably as small as from 5 to 16 nm to reduce the haze of the film. The apparent specific gravity of the particulate silicon dioxide is preferably not smaller than from 90 to 200 g/l, more preferably not smaller than from 100 to 200 g/l. As the apparent specific gravity of the silicon dioxide rises, a high concentration dispersion can be prepared more easily to reduce haze and agglomeration.

The amount of the aforementioned particulate silicon dioxide, if used, is preferably from 0.01 to 0.3 parts by weight based on 100 parts by weight of the polymer component containing cellulose acylate.

These particles normally form secondary particles having an average particle diameter of from 0.1 to 3.0 μm. These particles are present in the film in the form of agglomerates of primary particles to form an unevenness having a height of from 0.1 to 3.0 μm on the surface of the film. The secondary average particle diameter is preferably from not smaller than 0.2 μm to not greater than 1.5 μm, more preferably from not smaller than 0.4 μm to not greater than 1.2 μm, most preferably from not smaller than 0.6 μm to not greater than 1.1 μm. When the secondary average particle diameter exceeds 1.5 μm, the resulting film exhibits a raised haze. On the contrary, when the secondary average particle diameter falls below 0.2 μm, the effect of preventing squeak is reduced.

For the determination of primary and secondary particle diameter, particles in the film are observed under scanning electron microphotograph. The particle diameter is defined by the diameter of the circle circumscribing the particle. 200 particles which are located in dispersed positions are observed. The measurements are averaged to determine the average particle diameter.

As the particulate silicon dioxide there may be used a commercially available product such as Aerosil R972, R972V, R974, R812, 200, 200V, 300, R202, OX50 and TT600 (produced by Nippon Aerosil Co., Ltd.). The particulate zirconium oxide is commercially available as Aerosil R976 and R811 (produced by Nippon Aerosil Co., Ltd.). These products can be used in the invention.

Particularly preferred among these products are Aerosil 200V and Aerosil R972 because they are a particulate silicon dioxide having a primary average particle diameter of 20 nm or less and an apparent specific gravity of 70 g/l or more that exerts a great effect of reducing friction coefficient while keeping the turbidity of the optical film low.

In the invention, in order to obtain a cellulose acylate film containing particles having a small secondary average particle diameter, various methods may be proposed to prepare a dispersion of particles. For example, a method may be employed which comprises previously preparing a particulate dispersion of particles in a solvent, stirring the particulate dispersion with a small amount of a cellulose acylate solution which has been separately prepared to make a solution, and then mixing the solution with a main cellulose acylate dope solution. This preparation method is desirable because the particulate silicon dioxide can be fairly dispersed and thus can be difficultly re-agglomerated. Besides this method, a method may be employed which comprises stirring a solution with a small amount of cellulose ester to make a solution, dispersing the solution with a particulate material using a dispersing machine to make a solution having particles incorporated therein, and then thoroughly mixing the solution having particles incorporated therein with a dope solution using an in-line mixer. The invention is not limited to these methods. The concentration of silicon dioxide during the mixing and dispersion of the particulate silicon dioxide with a solvent or the like is preferably from 5 to 30% by weight, more preferably from 10 to 25% by weight, most preferably from 15 to 20% by weight. As the concentration of dispersion rises, the turbidity of the solution with respect to the added amount decreases to further reduce haze and agglomeration to advantage. The content of the matting agent in the final cellulose acylate dope solution is preferably from 0.01 to 1.0 g, more preferably from 0.03 to 0.3 g, most preferably from 0.08 to 0.16 g per m$^2$.

Preferred examples of the solvent which is a lower alcohol include methyl alcohol, ethyl alcohol, propyl alcohol, isopropyl alcohol, and butyl alcohol. The solvent other than lower alcohol is not specifically limited, but solvents which are used during the preparation of cellulose ester are preferably used.

The aforementioned organic solvent in which the cellulose acylate of the invention is dissolved will be described hereinafter.

In the invention, as the organic solvent there may be used either a chlorine-based solvent mainly composed of chlorine-based organic solvent or a nonchlorine-based solvent free of chlorine-based organic solvent.
(Chlorine-Based Solvent)

In order to prepare the cellulose acylate solution of the invention, as the main solvent there is preferably used a chlorine-based organic solvent In the invention, the kind of the chlorine-based organic solvent is not specifically limited so far as the cellulose acylate can be dissolved and casted to form a film, thereby attaining its aim. The chlorine-based organic solvent is preferably dichloromethane or chloroform. In particular, dichloromethane is preferred. The chlorine-based organic solvent may be used in admixture with organic solvents other than chlorine-based organic solvent. In this case, it is necessary that dichloromethane be used in an amount of at least 50% by weight based on the total amount of the organic solvents. Other organic solvents to be used in combination with the chlorine-based organic solvent in the invention will be described hereinafter. In some detail, other organic solvents employable herein are preferably selected from the group consisting of ester, ketone, ether, alcohol and hydrocarbon having from 3 to 12 carbon atoms. The ester, ketone, ether and alcohol may have a cyclic structure. A compound having two or more of functional groups (i.e., —O—, —CO—, and —COO—) of ester, ketone and ether, too, may be used as a solvent. The solvent may have other functional groups such as alcohol-based hydroxyl group at the same time. The number of carbon atoms in the solvent having two or more functional groups, if used, may fall within the range defined for the compound having any of these functional groups. Examples of C3-C12 esters include ethyl formate, propyl formate, pentyl formate, methyl acetate, ethyl acetate, and pentyl acetate. Examples of C3-C12 ketones include acetone, methyl ethyl ketone, diethyl ketone, diisobutyl ketone, cyclopentanone, cyclohexanone, and methyl cyclohexanone. Examples of C3-C12 ethers include diisopropyl ether, dimethoxymethane, dimethoxyethane, 1,4-dioxane, 1,3-dioxolane, tetrahydrofurane, anisole, and phenethol. Examples of the organic solvent having two or more functional groups include 2-ethoxyethyl acetate, 2-methoxyethanol, and 2-butoxyethanol.

The alcohol to be used in combination with the chlorine-based organic solvent may be preferably straight-chain, branched or cyclic. Preferred among these organic solvents is saturated aliphatic hydrocarbon. The hydroxyl group in the alcohol may be primary to tertiary. Examples of the alcohol employable herein include methanol, ethanol, 1-propanol, 2-propanol, 1-butanol, 2-butanol, t-butanol, 1-pentanol, 2-methyl-2-butanol, and cyclohexanol. As the alcohol there may be used also a fluorine-based alcohol. Examples of the fluorine-based alcohol include 2-fluoroethanol, 2,2,2-trifluoroethanol, and 2,2,3,3-tetrafluoro-1-propanol. Further, the hydrocarbon may be straight-chain, branched or cyclic. Either an aromatic hydrocarbon or aliphatic hydrocarbon may be used. The aliphatic hydrocarbon may be saturated or unsaturated. Examples of the hydrocarbon include cyclohexane, hexane, benzene, toluene, and xylene.

Examples of the combination of chlorine-based organic solvent and other organic solvents include formulations, but the invention is not limited thereto.

Dichloromethane/methanol/ethanol/butanol (80/10/5/5, parts by weight)

Dichloromethane/acetone/methanol/propanol (80/10/5/5, parts by weight)

Dichloromethane/methanol/butanol/cyclohexane (80/10/5/5, parts by weight)

Dichloromethane/methyl ethyl ketone/methanol/butanol (80/10/5/5, parts by weight)

Dichloromethane/acetone/methyl ethyl ketone/ethanol/isopropanol (75/8/5/5/7, parts by weight)

Dichloromethane/cyclopentanone/methanol/isopropanol (80/7/5/8, parts by weight)

Dichloromethane/methyl acetate/butanol (80/10/10, parts by weight)

Dichloromethane/cyclohexanone/methanol/hexane (70/20/5/5, parts by weight)

Dichloromethane/methyl ethyl ketone/acetone/methanol/ethanol (50/20/20/5/5, parts by weight)

Dichloromethane/1,3-dioxolarte/methanol/ethanol (70/20/5/5, parts by weight)

Dichloromethane/dioxane/acetone/methanol/ethanol (60/20/10/5/5, parts by weight)

Dichloromethane/acetone/cyclopentanone/ethanol/isobutanol/cyclohexane (65/10/10/5/5, parts by weight)

Dichloromethane/methyl ethyl ketone/acetone/methanol/ethanol (70/10/10/5/5, parts by weight)

Dichloromethane/acetone/ethyl acetate/ethanol/butanol/hexane (65/10/10/5/5/5, parts by weight)

Dichloromethane/methyl acetoacetate/methanol/ethanol (65/20/10/5, parts by weight)

Dichloromethane/cyclopentanone/ethanol/butanol (65/20/10/5, parts by weight)

(Nonchlorine-Based Solvent)

The nonchlorine-based solvent which can be preferably used to prepare the cellulose acylate solution of the invention will be described hereinafter. The nonchlorine-based organic solvent to be used in the invention is not specifically limited so far as the cellulose acylate can be dissolved and casted to form a film, thereby attaining its aim. The nonchlorine-based organic solvent employable herein is preferably selected from the group consisting of ester, ketone, ether and having from 3 to 12 carbon atoms. The ester, ketone and ether may have a cyclic structure. A compound having two or more of functional groups (i.e., —O—, —CO—, and —COO—) of ester, ketone and ether, too, may be used as a solvent. The solvent may have other functional groups such as alcohol-based hydroxyl group. The number of carbon atoms in the solvent having two or more functional groups, if used, may fall within the range defined for the compound having any of these functional groups. Examples of C3-C12 esters include ethyl formate, propyl formate, pentyl formate, methyl acetate, ethyl acetate, and pentyl acetate. Examples of C3-C12 ketones include acetone, methyl ethyl ketone, diethyl ketone, diisobutyl ketone, cyclopentanone, cyclohexanone, and methyl cyclohexanone. Examples of C3-C12 ethers include diisopropyl ether, dimethoxymethane, dimethoxyethane, 1,4-dioxane, 1,3-dioxolane, tetrahydrofurane, anisole, and phenethol. Examples of the organic solvent having two or more functional groups include 2-ethoxyethyl acetate, 2-methoxyethanol, and 2-butoxyethanol.

The nonchlorine-based organic solvent to be used for cellulose acylate may be selected from the aforementioned various standpoints of view but is preferably as follows. In some detail, the nonchlorine-based solvent is preferably a mixed solvent mainly composed of the aforementioned nonchlorine-based organic solvent. This is a mixture of three or more different solvents wherein the first solvent is at least one or a mixture of methyl acetate, ethyl acetate, methyl formate, ethyl formate, acetone, dioxolane and dioxane, the second solvent is selected from the group consisting of ketones or acetoacetic acid esters having from 4 to 7 carbon atoms and the third solvent is selected from the group consisting of alcohols or hydrocarbons having from 1 to 10 carbon atoms, preferably alcohols having from 1 to 8 carbon atoms. In the case where the first solvent is a mixture of two or more solvents, the second solvent may be omitted. The first solvent is more preferably methyl acetate, acetone, methyl formate, ethyl formate or mixture thereof. The second solvent is preferably methyl ethyl ketone, cyclopentanone, cyclohexanone, methyl acetylacetate or mixture thereof.

The third solvent which is an alcohol may be straight-chain, branched or cyclic. Preferred among these alcohols are unsaturated aliphatic hydrocarbons. The hydroxyl group in the alcohol may be primary to tertiary. Examples of the alcohol include methanol, ethanol, 1-propanol, 2-propanol, 1-butanol, 2-butanol, t-butanol, 1-pentanol, 2-methyl-2 butanol, and cyclohexanol. As the alcohol there may be used also a fluorine-based alcohol. Examples of the fluorine-based alcohol include 2-fluoroethanol, 2,2,2-trifluoroethanol, and 2,2,3,3-tetrafluoro-1-propanol. Further, the hydrocarbon may be straight-chain, branched or cyclic. Either an aromatic hydrocarbon or aliphatic hydrocarbon may be used. The aliphatic hydrocarbon may be saturated or unsaturated. Examples of the hydrocarbon include cyclohexane, hexane, benzene, toluene, and xylene. The alcohols and hydrocarbons which are third solvents may be used singly or in admixture of two or more thereof without any limitation. Specific examples of the alcohol which is a third solvent include methanol, ethanol, 1-propanol, 2-propanol, 1-butanol, 2-butanol, cyclohexanol, cyclohexane, and hexane. Particularly preferred among these alcohols are methanol, ethanol, 1-propanol, 2-propanol, and 1-butanol.

Referring to the mixing ratio of the aforementioned three solvents, the mixing ratio of the first solvent, the second solvent and the third solvent are preferably from 20 to 95% by weight, from 2 to 60% by weight and from 2 to 30% by weight, more preferably from 30 to 90% by weight, from 3 to 50% by weight and from 3 to 25% by weight, particularly from 30 to 90% by weight, from 3 to 30% by weight and froth 3 to 15% by weight, respectively, based on the total weight of the mixture. For the details of the nonchlorine-based organic solvents to be used in the invention, reference can be made to Kokai Giho No. 2001-1745, Mar. 15, 2001, pp. 12-16, Japan Institute of Invention and Innovation. Examples of the combination of nonchlorine-based organic solvents include formulations, but the invention is not limited thereto.

Methyl acetate/acetone/methanol/ethanol/butanol (75/10/5/5/5, parts by weight)

Methyl acetate/acetone/methanol/ethanol/propanol (75/10/5/5/5, parts by weight)

Methyl acetate/acetone/methanol/butanol/cyclohexane (75/10/5/5/5, parts by weight)

Methyl acetate/acetone/ethanol/butanol (81/8/7/4, parts by weight)

Methyl acetate/acetone/ethanol/butanol (82/10/4/4, parts by weight)

Methyl acetate/acetone/ethanol/butanol (80/10/4/6, parts by weight)

Methyl acetate/methyl ethyl ketone/methanol/butanol (80/10/5/5, parts by weight)

Methyl acetate/acetone/methyl ethyl ketone/ethanol/isopropanol (75/8/10/5/7, parts by weight)

Methyl acetate/cyclopentanone/methanol/isopropanol (80/7/5/8, parts by weight)

Methyl acetate/acetone/butanol (85/10/5, parts by weight)

Methyl acetate/cyclopentanone/acetone/methanol/butanol (60/15/14/5/6, parts by weight)

Methyl acetate/cyclohexanone/methanol/hexane (70/20/5/5, parts by weight)

Methyl acetate/methyl ethyl ketone/acetone/methanol/ethanol (50/20/5/5, parts by weight)

Methyl acetate/1,3-dioxolane/methanol/ethanol (70/20/5/5, parts by weight)

Methyl acetate/dioxane/acetone/methanol/ethanol (60/20/10/5/5, parts by weight)

Methyl acetate/acetone/cyclopentanone/ethanolIisobutanol/cyclohexane (65/10/10/5/5/5, parts by weight)

Methyl formate/methyl ethyl ketone/acetone/methanol/ethanol (50/20/20/5/5, parts by weight)

Methyl formate/acetone/ethyl acetate/ethanol/butanol/hexane (65/10/5/5/5, parts by weight)

Acetone/methyl acetoacetate/methanol/ethanol (65/20/10/5, parts by weight)

Acetone/cyclopentanone/methanol/butanol (65/20/10/5, parts by weight)

Acetone/1,3-dioxolane/ethanol/butanol (65/20/10/5, parts by weight)

1,3-Dioxolane/cyclohexanone/methyl ethyl ketone/methanol/butanol (55/20/10/5/5/5, parts by weight)

Further, cellulose acylate solutions prepared by the following methods may be used.

Method which comprises preparing a cellulose acylate solution with methyl acetate/acetone/ethanol/butanol (81/8/7/4, parts by weight), filtering and concentrating the solution, and then adding 2 parts by weight of butanol to the solution Method which comprises preparing a cellulose acylate solution with methyl acetate/acetone/ethanol/butanol (84/10/4/2, parts by weight), filtering and concentrating the solution, and then adding 4 parts by weight of butanol to the solution Method which comprises preparing a cellulose acylate solution with methyl acetate/acetone/ethanol (84/10/6, parts by weight), filtering and concentrating the solution, and then adding 5 parts by weight of butanol to the solution The dope to be used in the invention comprises dichloromethane incorporated therein in an amount of 10% by weight or less based on the total weight of the organic solvents of the invention besides the aforementioned nonchlorine-based organic solvent of the invention.

(Properties of Cellulose Acylate Solution)

The cellulose acylate solution of the invention preferably comprises cellulose acylate incorporated in the aforementioned organic solvent in an amount of from 10 to 30% by weight, more preferably from 13 to 27% by weight, particularly from 15 to 25% by weight from the standpoint of adaptability to film casting. The adjustment of the concentration of the cellulose acylate solution to the predetermined range may be effected at the dissolution step. Alternatively, a cellulose acylate solution which has been previously prepared in a low concentration (e.g., 9 to 14% by weight) may be adjusted to the predetermined concentration range at a concentrating step described later. Alternatively, a cellulose acylate solution which has been previously prepared in a high concentration may be adjusted to the predetermined lower concentration range by adding various additives thereto. Any of these methods may be used so far as the predetermined concentration range can be attained.

In the invention, the molecular weight of the associated cellulose acylate in the cellulose acylate solution which has been diluted with an organic solvent having the same formulation to a concentration of from 0.1 to 5% by weight is preferably from 150,000 to 15,000,000, more preferably from 180,000 to 9,000,000 from the standpoint of solubility in solvent. For the determination of the molecular weight of associated product, a static light scattering method may be used. The dissolution is preferably effected such that the concurrently determined square radius of inertia ranges from 10 to 200 nm, more preferably from 20 to 200 nm. Further, the dissolution is preferably effected such that the second virial coefficient ranges from $-2 \times 10^{-4}$ to $+4 \times 10^{-4}$, more preferably from $-2 \times 10^{-4}$ to $+2 \times 10^{4}$.

The definition of the molecular weight of the associated product, the square radius of inertia and the second virial coefficient will be described hereinafter. These properties are measured by static light scattering method in the following manner. The measurement is made within a dilute range for the convenience of device, but these measurements reflect the behavior of the dope within the high concentration range of the invention.

Firstly, the cellulose acylate is dissolved in the same solvent as used for dope to prepare solutions having a concentration of 0.1% by weight, 0.2% by weight, 0.3% by weight and 0.4% by weight, respectively. The cellulose acylate to be weighed is dried at 120° C. for 2 hours before use to prevent moistening. The cellulose acylate thus dried is then weighed at 25° C. and 10% RH. The dissolution of the cellulose acylate is effected according to the same method as used in the dope dissolution (ordinary temperature dissolution method, cooled dissolution method, high temperature dissolution method). Subsequently, these solutions with solvent are filtered through a Teflon filter having a pore diameter of 0.2 The solutions thus filtered are each then measured for static light scattering every 10 degrees from 30 degrees to 140 degrees at 25° C. using a Type DLS-700 light scattering device (produced by Otsuka Electronics Co., Ltd.). The data thus obtained are then analyzed by Berry plotting method. For the determination of refractive index required for this analysis, the refractive index of the solvent is measured by an Abbe refractometer. For the determination of concentration gradient of refractive index (dn/dc), the same solvent and solution as used in the measurement of light scattering are measured using a type DRM-1021 different refractometer (produced by Otsuka Electronics Co., Ltd.).

(Preparation of Dope)

The preparation of the cellulose acylate solution (dope) will be described hereinafter. The method of dissolving the cellulose acylate is not specifically limited. The dissolution of the cellulose acylate may be effected at room temperature. Alternatively, a cooled dissolution method or a high temperature dissolution method may be used. Alternatively, these dissolution methods may be in combination. For the details of the method of preparing a cellulose acylate solution, reference can be made to JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-04-259511, JP-A-2000-273184, JP-A-11-323017, and JP-A-11-302388. The aforementioned method of dissolving cellulose acylate in an organic solvent may be applied also to the invention so far as it falls within the scope of the invention. For the details of these methods, reference can be made to Kokai Giho No. 2001-1745, Mar. 15, 2001, pp. 22-25, Japan Institute of Invention and Innovation. The cellulose acylate dope solution of the invention is then subjected to concentration and filtration. For the details of these methods, reference can be made similarly to Kokai Giho No. 2001-1745, Mar. 15, 2001, page 25, Japan Institute of Invention and Innovation. In the case where dissolution is effected at high temperatures, the temperature is higher than the boiling point of the organic solvent used in most cases. In this case, dissolution is effected under pressure.

The viscosity and dynamic storage elastic modulus of the cellulose acylate solution preferably fall within the following range from the standpoint of castability. 1 mL of the sample solution is measured using a Type CLS 500 rheometer (produced by TA Instruments) with a steel cone having a diameter of 4 cm/2° (produced by TA Instruments). Referring to the measurement conditions, measurement is effected every 2° C. per minute within a range of from −10° C. to 40° C. at an oscillation step with temperature ramp to determine 40° C. static non-Newton viscosity n*(Pa·s) and −5° C. storage elastic modulus G'(Pa). The sample solution is previously kept at the measurement starting temperature before measurement. In the invention, the sample solution preferably has a 40° C. viscosity of from 1 to 400 Pa·s, more preferably from 10 to 200 Pa·s, and a 15° C. dynamic storage elastic modulus of 500 Pa or more, more preferably from 100 to 1,000,000 Pa. The low temperature dynamic storage elastic modulus of the sample solution is preferably as great as possible. For example, if the casting support has a temperature of −5° C., the dynamic storage elastic modulus of the sample solution is preferably from 10,000 to 1,000,000 Pa at −5° C. If the casting support has a temperature of −50° C., the dynamic storage elastic modulus of the sample solution is preferably from 10,000 to 5,000,000 Pa at −50° C.

The invention is characterized in that the use of the aforementioned specific cellulose acylate makes it possible to obtain a high concentration dope. Accordingly, a high concentration cellulose acylate solution having an excellent stability can be obtained without relying on the concentrating method. In order to further facilitate dissolution, the cellulose acylate may be dissolved in a low concentration. The solution thus prepared is then concentrated by a concentrating method. The concentrating method is not specifically limited. For example, a method may be used which comprises introducing a low concentration solution into the gap between a case body and the rotary orbit of the periphery of a rotary blade that rotates circumferentially inside the case body while giving a temperature difference between the solution and the case body to vaporize the solution, thereby obtaining a high concentration solution (see, e.g., JP-A-4-259511). Alternatively, a method may be used which comprises blowing a heated low concentration solution into a vessel through a nozzle so that the solvent is flash-evaporated over the distance from the nozzle to the inner wall of the vessel while withdrawing the solvent thus evaporated from the vessel and the resulting high concentration solution from the bottom of the vessel (see, e.g., U.S. Pat. No. 2,541,012, U.S. Pat. No. 2,858,229, U.S. Pat. No. 4,414,341, U.S. Pat. No. 4,504,355).

Prior to casting, the solution is preferably freed of foreign matters such as undissolved matter, dust and impurities by filtration through a proper filtering material such as metal gauze and flannel. For the filtration of the cellulose acylate solution, a filter having an absolute filtration precision of from 0.1 to 100 μm is preferably used. More preferably, a filter having an absolute filtration precision of from 0.5 to 25 μm is used. The thickness of the filter is preferably from 0.1 to 10 mm; more preferably from 0.2 to 2 mm. In this case, filtration is preferably effected under a pressure of 1.6 MPa or less, more preferably 1.2 MPa or less, even more preferably 1.0 MPa or less, particularly 0.2 MPa or less. As the filtering material there is preferably used any known material such as glass fiber, cellulose fiber, filter paper and fluororesin, e.g., ethylene tetrafluoride resin. In particular, ceramics, metal, etc. are preferably used. The viscosity of the cellulose acylate solution shortly before filming may be arbitrary so far as the cellulose acylate solution can be casted during filming and normally is preferably from 10 Pa·s to 2,000 Pa·s, more preferably from 30 Pa·s to 1,000 Pa·s, even more preferably from 40 Pa·s to 500 Pa·s. The temperature of the cellulose acylate solution shortly before filming is not specifically limited so far as it is the casting temperature but is preferably from −5° C. to +70° C., more preferably from −5° C. to +55° C.

(Filming)

The cellulose acylate film of the invention can be obtained by filming the aforementioned cellulose acylate solution. As the filming method and the filming device there may be used any solution casting/filing method and solution casting/filming device for use in the related art method of producing cellulose acylate film, respectively. The dope (cellulose acylate solution) prepared in the dissolving machine (kiln) is stored in a storage kiln so that bubbles contained in the dope are removed to make final adjustment. The dope thus adjusted is then delivered from the dope discharge port to a pressure die through a pressure constant rate gear pump capable of delivering a liquid at a constant rate with a high precision depending on the rotary speed. The dope is then uniformly casted through the slit of the pressure die over a metallic support in the casting portion which is being running endlessly. When the metallic support has made substantially one turn, the half-dried dope film (also referred to as "web") is then peeled off the metallic support. The web thus obtained is then dried while being conveyed by a tenter with the both ends thereof being clamped by a clip to keep its width. Subsequently, the web is conveyed by a group of rolls in the drying apparatus to finish drying. The web is then wound to a predetermined length by a winding machine. The combination of tenter and a group of rolls varies with the purpose. In a solution casting/filming method for use in functional protective film for electronic display, a coating device is often added to the solution casting/filming device for the purpose of surface working of film such as subbing layer, antistatic layer, anti-halation layer and protective film. The various producing steps will be briefly described hereinafter, but the invention is not limited thereto.

Firstly, in order to prepare a cellulose acylate film by a solvent casting method, the cellulose acylate solution (dope) thus prepared is casted over a drum or band so that the solvent is evaporated to form a film. The dope to be casted is preferably adjusted in its concentration such that the solid content is from 5 to 40% by weight. The surface of the drum or band is previously mirror-like finished. The dope is preferably casted over a drum or band having a surface temperature of 30° C. or less, particularly over a metallic support having a temperature of from −10 to 20° C. Further, methods disclosed in JP-A-2000-301555, JP-A-2000-301558, JP-A-07-32391, JP-A-03-193316, JP-A-05-086212, JP-A-62-037113, JP-A-03-193316, JP-A-05-086212, JP-A-62-037113, JP-A-02-276607, JP-A-55-014201, JP-A-02-111511, and JP-A-02-208650 may be used in the invention.

(Multi-Layer Casting)

The cellulose acylate solution may be casted over a smooth band or drum as a metallic support in the form of a single layer. Alternatively, two or more cellulose acylate solutions may be casted over the metallic support. In the case where a plurality of cellulose acylate solutions are casted, a cellulose acylate-containing solution may be casted over the metallic support through a plurality of casting ports disposed at an interval along the direction of running of the metallic support to make lamination. For example, any method as disclosed in JP-A-61-158414, JP-A-1-122419, and JP-A-11-198285 may be employed. Alternatively, a cellulose acylate solution may be casted through two casting ports to make filming. For example, any method as disclosed in JP-B-60-27562, JP-A-61-94724, JP-A-61-947245, JP-A-61-104813, JP-A-61-158413, and JP-A-6-134933 may be employed. As disclosed in JP-A-56-162617, a cellulose acylate film casting method may be used which comprises simultaneously casting a high viscosity cellulose acylate solution and a lbw viscosity cellulose acylate solution with a flow of the high viscosity cellulose acylate solution surrounded by the low viscosity cellulose acylate solution. Further, as disclosed in JP-A-61-94724 and JP-A-61-94725, it is a preferred embodiment that the outer solution contains a greater content of an alcohol component as a poor solvent than the inner solution. Alternatively, two casting ports may be used so that the film formed on the metallic support by the first casting port is peeled off the metallic support and the second casting is then made on the side of the film which has come in contact with the metallic support. For example, a method disclosed in JP-B-44-20235 may be used. The cellulose acylate solutions to be casted may be the same or different and thus are not specifically limited. In order to render a plurality of cellulose acylate layers functional, cellulose acylate solutions having a formulation according to the function may be extruded through the respective casting port. The casting of the cellulose acylate solution may be accompanied by the casting of other functional layers (e.g., adhesive layer, dye layer, antistatic layer, anti-halation layer, ultraviolet-absorbing layer, polarizing layer).

In order to form a film having a desired thickness from the related art single layer solution, it is necessary that a cellulose acylate solution having a high concentration and a high viscosity be extruded. In this case, a problem often arises that the cellulose acylate solution exhibits a poor stability and thus forms a solid material that causes the generation of granular structure or poor planarity. In order to solve these problems, a plurality of cellulose acylate solutions can be casted through casting ports, making it possible to extrude high viscosity solutions onto the metallic support at the same time. In this manner, a film having an improved planarity and hence excellent surface conditions can be prepared. Further, the use of a highly concentrated cellulose acylate solution makes it possible to attain the reduction of the drying load that can enhance the production speed of film. In the case of co-casting method, the thickness of the inner solution and the outer solution are not specifically limited, but the thickness of the outer solution is preferably from 1 to 50%, more preferably from 2 to 30% of the total thickness. In the case of co-casting of three of more layers, the sum of the thickness of the layer in contact with the metallic support and the layer in contact with air is defined as the thickness of the outer layer. In the case of co-casting, cellulose acylate solutions having different concentrations of the aforementioned additives such as plasticizer, ultraviolet absorber and matting agent can be co-casted to a cellulose acylate film having a laminated structure. For example, a cellulose acylate film having a skin layer/core layer/skin layer structure can be prepared. For example, the matting agent can be incorporated much or only in the skin layer. The plasticizer and ultraviolet absorber may be incorporated more in the core layer than in the skin layer or only in the core layer. The kind of the plasticizer and the ultraviolet absorber may differ from the core layer to the skin layer. For example, at least either of low volatility plasticizer and ultraviolet absorber may be incorporated in the skin layer while a plasticizer having an excellent plasticity or an ultraviolet absorber having excellent ultraviolet absorbing properties may be incorporated in the core layer. In another preferred embodiment, a peel accelerator may be incorporated in only the skin layer on the metallic support side. It is also preferred that the skin layer contain an alcohol as a poor solvent more than the core layer in order that the solution might be gelled by cooling the metallic support by a cooled drum method. The skin layer and the core layer may have different Tg values. It is preferred that Tg of the core layer be lower than that of the skin layer. Further, the viscosity of the solution containing cellulose acylate may differ from the skin layer to the core layer during casting. It is preferred that the viscosity of the skin layer be lower than that of the core layer. However, the viscosity of the core layer may be lower than that of the skin layer.

(Casting)

Examples of the solution casting method include a method which comprises uniformly extruding a dope prepared onto a metallic support through a pressure die, a doctor blade method which comprises adjusting the thickness of a dope casted over a metallic support using a blade, and a reverse roll coater method which comprises adjusting the thickness of the dope casted using a roll that rotates in the reverse direction. Preferred among these casting methods is the pressure die method. Examples of the pressure die include coat hunger type pressure die, and T-die type pressure die. Any of these pressure dies may be preferably used. Besides the aforementioned methods, various conventional methods for casting/filming a cellulose triacetate solution may be effected. By predetermining the various conditions taking into account the difference in boiling point between solvents used, the same effects as the contents disclosed in the above cited references can be exerted. As the endless running metallic support to be used in the production of the cellulose acylate film of the invention there may be used a drum which has been mirror-like finished by chromium plating or a stainless steel belt (also referred to as "band") which has been mirror-like finished by polishing. One or more pressure dies for producing the cellulose acylate film of the invention may be disposed above the metallic support. Preferably, the number of pressure dies is 1 or 2. In the case where two or more pressure dies are provided, the dope to be casted may be allotted to these dies at various ratios. A plurality of precision constant rate gear pumps may be used to deliver the dope to these dies at the respect ratio. The temperature of the cellulose acylate solution to be casted is preferably from −10 to 55° C., more preferably from 25 to 50° C. In this case, the temperature of the cellulose acylate solution may be the same at all the steps or may differ from step to step. In the latter case, it suffices if the temperature of the cellulose acylate solution is the desired temperature shortly before being casted.

(Drying)

General examples of the method of drying the dope on the metallic support in the production of the cellulose acylate film include a method which comprises blowing a hot air against the web on the front surface of the metallic support (drum or band), that is, the front surface of the web on the metallic support or on the back surface of the drum or band, and a liquid heat conduction method which comprises allowing a temperature-controlled liquid to come in contact with the back surface of the belt or drum, which is the side thereof opposite the dope casting surface, so that heat is conducted to the drum or belt to control the surface temperature. Preferred among these drying methods is the back surface liquid heat conduction method. The surface temperature of the metallic support before casting may be arbitrary so far as it is not higher than the boiling point of the solvent used in the dope. However, in order to accelerate drying or eliminate fluidity on the metallic support, it is preferred that the surface temperature of the metallic support be predetermined to be from 1 to 10° C. lower than the boiling point of the solvent having the lowest boiling point among the solvents used. However, this limitation is not necessarily applied in the case where the casted dope is cooled and peeled off the metallic support without being dried.

(Stretching)

The cellulose acylate film of the invention may be subjected to stretching to adjust the retardation thereof. Further, the cellulose acylate film may be positively subjected to crosswise stretching. For the details of these stretching methods, reference can be made to JP-A-62-115035, JP-A-4-152125, JP-A-4-284211, JP-A-4-298310, and JP-A-11-48271. In accordance with these methods, the cellulose acylate film produced is stretched to raise the in-plane retardation value thereof.

The stretching of the film is effected at ordinary temperature or under heating. The heating temperature is preferably not higher than the glass transition temperature of the film. The film may be subjected to monoaxial stretching only in the longitudinal or crosswise direction or may be subjected to simultaneous or successive biaxial stretching. The stretching is effected by a factor or from 1 to 200%, preferably from 1 to 100%, more preferably from 1 to 50%. The birefringence of the optical film is preferably such that the crosswise refractive index of the film is greater than the longitudinal refractive index of the film. Accordingly, the film is preferably stretched more in the crosswise direction than in the longitudinal direction. The stretching may be effected in the course of filming step. Alternatively, the raw fabric of film wound may be subjected to stretching. In the former case, the film may be stretched while retaining residual solvent therein. When the content of residual solvent is from 2 to 30%, stretching can be fairly effected.

The thickness of the cellulose acylate film of the invention thus dried depends on the purpose but is normally preferably from 5 to 500 μm, more preferably from 20 to 300 μm, particularly from 30 to 150 μm. Further, the thickness of the cellulose acylate film for optical devices, particularly for VA liquid crystal display, is preferably from 40 to 110 μm. In order to adjust the thickness of the film to the desired value, the concentration of solid content in the dope, the gap of slit of the die, the extrusion pressure of die, the speed of metallic support, etc. may be properly adjusted. The width of the cellulose acylate film thus obtained is preferably from 0.5 to 3 m, more preferably from 0.6 to 2.5 m, even more preferably from 0.8 to 2.2 m. The winding length of the film per roll is preferably from 100 to 10,000 m, more preferably 500 to 7,000 m, even more preferably from 1,000 to 6,000. During winding, the film is preferably knurled at least at one edge thereof. The width of the knurl is preferably from 3 mm to 50 mm, more preferably from 5 mm to 30 mm. The height of the knurl is preferably from 0.5 to 500 μm, more preferably from 1 to 200 μm. The edge of the film may be knurled on one or both surfaces thereof.

The dispersion of Re(590) value over the total width is preferably ±5 nm, more preferably ±3 nm. The dispersion of Rth(590) value over the total width is preferably ±10 nm, more preferably ±5 nm. The longitudinal dispersion of Re value and Rth value preferably falls within the crosswise dispersion of Re value and Rth value.

(Optical Properties of Cellulose Acylate Film)

The optical properties of the cellulose acylate film of the invention are preferably such that Re retardation value and Rth retardation value represented by formulae (V) and (VI) satisfy formulae (VII) and (VIII), respectively, to expand the viewing angle of liquid crystal displays, particularly VA mode liquid crystal displays, especially in the case where the cellulose acylate film is used as a protective film on the liquid crystal cell side of the polarizing plate.

$$Re(\lambda)=(nx-ny) \times d \quad \text{(V)}$$

$$Rth(\lambda)=\{(nx+ny)/2-nz\} \times d \quad \text{(VI)}$$

$$20 \text{ nm} \leq Re(590) \leq 200 \text{ nm} \quad \text{(VII)}$$

$$0 \text{ nm} \leq Rth(590) \leq 400 \text{ nm} \quad \text{(VIII)}$$

wherein Re(λ) represents a retardartion value (unit: nm) in a film plane of the cellulose acylate film with respect to light having a wavelength of λnm (a front retardation value at wavelength λmm); Rth(λ) represents a retardation value (unit: nm) in a direction perpendicular to the film plane with respect to the light having the wavelength of λnm (a retardation value in the thickness direction at wavelength λnm); nx represents a refractive index in a direction along a slow axis (i.e., a slow axis direction) in the film plane; ny represents a refractive index in a direction along a fast axis (i.e., a fast axis direction) in the film plane; nz represents a refractive index in a direction perpendicular to the film plane (a thickness direction); and d is the thickness of the film.

Further, in order to reduce the effect of the optical anisotropy of the cellulose acylate film, it is preferred that Re(λ) and Rth(λ) of the protective film (cellulose-acylate film) disposed on the liquid crystal cell side of the polarizing film satisfy formulae (IX) to (XII):

$$0 \leq Re(590) \leq 10 \text{ nm} \quad \text{(IX)}$$

$$|Rth(590)| \leq 25 \text{ nm} \quad \text{(X)}$$

$$|Re(400)-Re(700)| \leq 10 \text{ nm} \quad \text{(XI)}$$

$$|Rth(400)-Rth(700)| \leq 35 \text{ nm} \quad \text{(XII)}$$

In the case where the cellulose acylate film of the invention is used in VA mode, there are two modes of use, i.e., mode in which one sheet of cellulose acylate film is used on both sides of the cell, totaling two sheets of cellulose acylate film (two-sheet mode) and mod in which one sheet of cellulose acylate film is used only one of the upper and lower sides of the cell (one-sheet mode).

In the case of two-sheet mode, Re is preferably from 20 to 100 nm, more preferably from 30 to 70 nm. Rth is preferably from 70 to 300 nm, more preferably from 100 to 200 nm.

In the case of one-sheet mode, Re is preferably from 30 to 150 nm, more preferably 40 to 100 nm. Rth is preferably from 100 to 300 nm, more preferably from 150 to 250 nm.

The dispersion of angle of slow axis in the plane of the cellulose acylate film of the invention is preferably from −2 degrees to +2 degrees, more preferably −1 degree to +1 degree, most preferably from −0.5 degrees to +0.5 degrees with respect to the reference direction of the rolled film. The term "reference direction" as used herein is meant to indicate the longitudinal direction of the rolled film in the case where the cellulose acylate film is longitudinally stretched or the crosswise direction of the rolled film in the case where the cellulose acylate film is crosswise stretched.

In the cellulose acylate film of the invention, the difference ΔRe (=R10% RH−Re80% RH) between Re at 25° C. and 10% RH and Re at 25° C. and 80% RH is preferably from 0 to 10 nm and the difference ΔRth (=Rth10% RH−Rth80% RH) between Rth at 25° C. and 10% RH and Rth at 25° C. and 80% RH is preferably from 0 to 30 nm in order to reduce the tint change of the liquid crystal display with time.

The cellulose acylate film of the invention preferably has an equilibrium moisture content of 3.2% or less at 25° C. and 80% RH to reduce the tint change of the liquid crystal display with time.

For the measurement of moisture content, a cellulose acylate film sample of the invention having a size of from 7 mm×35 mm is measured by Karl Fisher method using a Type CA-03 moisture meter (produced by MITSUBISHI CHEMICAL CORPORATION) and a Type VA-05 sample dryer (produced by MITSUBISHI CHEMICAL CORPORATION). The moisture content is calculated by dividing the water content (g) by the weight (g) of the sample.

Further, the cellulose acylate film of the invention preferably has a moisture permeability of from not smaller than 400 g/m²·24 hr to not greater than 1,800 g/m²·24 hr at 60° C. and 95% RH-24 hr as calculated in terms of thickness of 80 μm to reduce the tint change of the liquid crystal display with time.

As the thickness of the cellulose acylate film increases, the moisture permeability decreases. As the thickness of the cellulose acylate film decreases, the moisture permeability increases. Accordingly, the moisture permeability of a sample having any thickness needs to be converted with 80 μm as reference. The conversion in thickness equivalence is carried out by the following equation:

Moisture permeability in 80 μm equivalence=Measured moisture permeability× Measured Thickness (μm)/80

For the details of the method of measuring moisture permeability employable herein, reference can be made to "Kobunshi no Bussei II (Physical Properties of Polymers II)";. Institute of Polymer Experiment (4), Kyouritsu Shuppan, pp. 285-294; Measurement of transmission of water vapor (weight process, thermometer process, vapor pressure process, adsorption process).

For the measurement of glass transition temperature, a cellulose acylate film sample of the invention (unstretched) having a size of 5 mm×30 mm is moisture-controlled at 25° C. and 60% RH for 2 hours or more. The sample thus moisture-controlled is then measured at a distance of 20 mm between bites, a temperature rising rate of 2° C./min, a temperature of from 30° C. to 200° C. and a frequency of 1 Hz using a Type Vibron DVA-225 dynamic viscoelasticity meter (produced by IT Keisoku Seigyo Co., Ltd.). The measurements are then plotted with storage elastic modulus as logarithmic ordinate and temperature (° C.) as linear abscissa. A straight line 1 indicating a sudden reduction of storage elastic modulus developed when the sample shows transition from solid to glass is drawn in a solid material region. A straight line 2 is drawn in a glass transition region. The point of crossing of the two lines is defined to be glass transition temperature Tg (dynamic viscoelasticity) because it is the temperature at which the storage elastic modulus shows a sudden change of storage elastic modulus to initiate softening of the film during temperature rise and cause the film to begin to move to glass transition region.

For the measurement of elastic modulus, a cellulose acylate film sample of the invention having a size of 10 mm×150 mm is moisture-controlled at 25° C. and 60% RH for 2 hours or more. The sample thus moisture-controlled is then measured at a distance of 100 mm between bites, a temperature of 25° C. and a stretching rate of 10 mm/min using a Type Strograph R2 tensile testing machine (produced by TOYO SEIKI KOGYO CO., LTD.).

For the measurement of hygroscopic expansion coefficient, a film which has been allowed to stand at 25° C. and 80% RH for 2 hours or more is measured for dimension L80 using a pin gauge. Further, a film which has been allowed to stand at 25° C. and 10% RH for 2 hours or more is measured for dimension L10 using a pin gauge. The hygroscopic expansion coefficient of the film is then calculated by the following equation:

$$(L10-L80)/(80\% RH-10\% RH) \times 1,000,000$$

The cellulose acylate film of the invention preferably has a haze of from 0.01 to 2%. The haze of the cellulose acylate film of the invention can be measured as follows.

For the measurement of haze, a cellulose acylate film sample of the invention having a size of 40 mm×80 mm is measured according to JIS K-6714 using a Type HGM-2DP haze meter (produced by Suga Test Instruments Co., Ltd.).

The cellulose acylate film of the invention preferably exhibits a weight change of from 0 to 5% when allowed to stand at 80° C. and 90% RH for 48 hours.

The cellulose acylate film of the invention preferably exhibits a dimensional change of from 0 to 5% when allowed to stand at 60° C. and 95% RH for 24 hours and when allowed to stand at 90° C. and 5% RH for 24 hours.

The cellulose acylate film of the invention preferably exhibits an optoelastic coefficient of $50 \times 10^{-13}$ cm$^2$/dyne or less to reduce the tint change of liquid crystal display with time.

Referring in detail to the method of measuring optoelastic coefficient, a cellulose acylate film sample having a size of 10 mm×100 mm is subjected to tensile stress in the longitudinal direction. During this process, the sample is measured for retardation using a Type M150 ellipsometer (produced by JASCO). The optoelastic coefficient is then calculated from the change of retardation with respect to stress.

(Polarizing Plate)

The polarizing plate of the invention will be further described hereinafter.

The polarizing plate of the invention comprises at least one sheet of the aforementioned optical cellulose acylate film of the invention as a protective film for polarizing film (or polarizer).

A polarizing plate normally comprises a polarizing film and two sheets of transparent protective film disposed on the respective side thereof. In the invention, as at least one of the protective films there is used a cellulose acylate film of the invention. As the other protective film there may be used either a cellulose acylate film of the invention or an ordinary cellulose acylate film. In the invention, the relationship between the thickness, elastic modulus and hygroscopic expansion coefficient of the protective film on the liquid crystal cell side of the polarizing film and the protective film on the side of the polarizing film opposite the liquid crystal cell is adjusted to adjust the curling of the polarizing plate.

In the polarizing plate of the invention, the thickness d1 of the protective film (i.e., a first protective film) disposed on the liquid crystal cell side of the polarizing film and the thickness d2 of the protective film (i.e., a second protective film) disposed on the side of the polarizing film opposite the liquid crystal cell preferably satisfy formula (I):

$$0.3 \times d1 \leq d2 \leq 1.3 \times d1 \tag{I}$$

When the aforementioned formula (1) is satisfied, the curl of the polarizing plate falls within a range of from −30 mm to +15 mm in the case where protective films having substantially the same elastic modulus and hygroscopic expansion coefficients are combined, making it possible to obtain desirable results.

Further, in the polarizing plate of the invention, the elastic modulus I of the protective film disposed on the liquid crystal cell side of the polarizing film and the elastic modulus II of the protective film disposed on the side of the polarizing film opposite the liquid crystal cell preferably satisfy formula (II). In this arrangement, the curl of the polarizing plate falls within a range of from −30 mm to +15 mm in the case where protective films having substantially the same thicknesses and hygroscopic expansion coefficients are combined, making it possible to obtain desirable results.

$$0.3 \times E1 \leq E2 \leq 1.3 \times E1 \tag{II}$$

Moreover, the thickness d1 of the protective film disposed on the liquid crystal cell side of the polarizing film and the thickness d2 of the protective film disposed on the side of the polarizing film opposite the liquid crystal cell preferably satisfy formula (III):

$$0.3 \times E1 \times d1 \leq E2 \times d2 \leq 1.3 \times E1 \times d1$$

When the aforementioned formula (III) is satisfied, the curl of the polarizing plate falls within a range of from −30 mm to +15 mm also in the case where protective films having substantially the same thicknesses and hygroscopic expansion coefficients are combined.

Further, in the polarizing plate of the invention, the hygroscopic expansion coefficient C1 of the protective film disposed on the liquid crystal cell side of the polarizing film and the hygroscopic expansion coefficient C2 of the protective film disposed on the side of the polarizing film opposite the liquid crystal cell preferably satisfy formula (IV):

$$0.3 \times C1 \leq C2 \leq 1.3 \times C1 \quad (IV)$$

When the aforementioned formula is satisfied, the curl of the polarizing plate falls within a range of from −30 mm to +15 mm in the case where the humidity during the sticking of the polarizing plate to the liquid crystal cell is higher than during the preparation of the polarizing plate, making it possible to obtain desirable results.

Examples of the polarizing film in the polarizing plate include iodine-based polarizing films, dye-based polarizing films comprising a dichromatic die, and polyene-based polarizing films. The iodine-based polarizing film and the dye based polarizing film are normally produced from a polyvinyl alcohol based film. In the case where a cellulose acylate film of the invention is used as a protective film for polarizing plate, the method of preparing the polarizing plate is not specifically limited but may be any ordinary method. For example, a method may be employed which comprises subjecting a cellulose acylate film obtained to alkaline treatment, and then sticking the cellulose acylate filth to the both surfaces of a polarizing filth prepared by dipping and stretching a polyvinyl alcohol in an iodine solution with an aqueous solution of a fully-saponified polyvinyl alcohol. A processing for easy adhesion as disclosed in JP-A-6-94915 and JP-A-6-118232 may be effected instead of alkaline treatment. Examples of the adhesive with which the processed surface of the protective film and the polarizing film are stuck to each other include polyvinyl-based adhesives such as polyvinyl alcohol and polyvinyl butyral, and vinyl-based latexes such as butyl acrylate. The polarizing plate comprises a polarizing film and a protective film for protecting the both surfaces thereof. The polarizing plate may further have a protective film provided on one surface thereof and a separate film provided on the other. The protective film and the separate film are used for the purpose of protecting the surface of the polarizing plate during the shipment of the polarizing plate and during the inspection of the product. In this case, the protective film is stuck to the polarizing plate for the purpose of protecting the surface of the polarizing plate. The protective film is provided on the side of the polarizing plate opposite the side on which it is stuck to the liquid crystal cell. The separate film is used for the purpose of covering the adhesive layer to be stuck to the liquid crystal cell. The separate film is provided on the side of the polarizing plate on which it is stuck to the liquid crystal cell.

Referring to the sticking of the cellulose acylate film of the invention to the polarizing film, the two components are preferably stuck to each other in such an arrangement that the transmission axis of the polarizing film and the slow axis of the cellulose acylate film of the invention (TAC in FIG. 1) coincide with each other as shown in FIG. 1.

In the polarizing plate prepared under polarizing plate crossed nicols, when the precision in right-angle crossing of the slow axis of the cellulose acylate film of the invention with the absorption axis of the polarizing film (perpendicular to the transmission axis) is greater than 1°, the polarizing properties under polarizing plate crossed nicols are deteriorated to cause light leakage. When such a polarizing plate is combined with a liquid crystal cell, sufficient black level or contrast cannot be obtained. Accordingly, the deviation of the direction of the main refractive index nx of the cellulose acylate film of the invention from the direction of the transmission axis of the polarizing plate needs to be 1° or less, preferably 0.5° or less.

The sticking of the polarizing plate to the liquid crystal cell is normally carried out by a process which comprises attaching the polarizing plate to a suction fixture having a numerous holes formed therein, peeling the separate film off the surface of the polarizing plate on which an adhesive is provided, bringing the adhesive surface of the polarizing plate into contact with the liquid crystal cell, and then pressing under a roller. In this procedure, when the polarizing plate is curled and bent toward the liquid crystal cell, the suction of the polarizing plate by the suction fixture cannot be fairly made, causing deviation of the angle at which the polarizing plate is attached to the suction fixture and hence deviation of the angle at which the polarizing plate is stuck to the liquid crystal cell and making it impossible to obtain the designed display properties. Further, the polarizing plate can come off the suction fixture during the sticking of the polarizing plate to the liquid crystal cell, making it impossible to continue sticking. In some cases, the operation can be suspended.

In order to prevent the occurrence of such malsticking of the polarizing plate, it is preferred that the curling of the polarizing plate fall within a range of from −30 mm to +15 mm, more preferably from −20 mm to +5 mm, most preferably from −10 mm to 0 mm. When the polarizing plate is curled and bent toward the side thereof on which it is stuck to the liquid crystal cell (adhesive coat side), it is called + (plus) curl. On the contrary, when the polarizing plate is curled and bent toward to the side of the polarizing plate opposite the adhesive coat side, it is called − (minus) curl. The curling of the polarizing plate can be controlled by adjusting the relationship between the thickness, elastic modulus and hygroscopic expansion coefficient of the protective film disposed on the liquid crystal cell side of the polarizing film and the protective film disposed on the side of the polarizing film opposite the liquid crystal cell side.

For the measurement of the curling of the polarizing plate, a polarizing plate having a size of 230 mm×305 mm is placed on a flat table with the side thereof having rising ends facing downward. The sample is then allowed to stand at 25° C. and 60% RH for 2 hours or more. The highest height of the end of the polarizing plate from the surface of the table is then measured to determine the curling. When the polarizing plate is curled and bent toward the side of the polarizing plate on which it is stuck to the liquid crystal cell, it is called + (plus) curl. When the polarizing plate is curled and bent toward the side of the polarizing plate opposite the liquid crystal cell, it is called − (minus) curl.

In the case where the polarizing plate is provided with a separate film and a protective film, measurement is conducted with these films left attached to the polarizing plate.

(Surface Treatment)

The cellulose acylate film of the invention may be optionally subjected to surface treatment to attain the enhancement of the adhesion of the cellulose acylate film to the various functional layers (e.g., undercoat layer and back layer). Examples of the surface treatment employable herein include glow discharge treatment, irradiation with ultraviolet rays, corona treatment, flame treatment, and acid or alkaline treatment. The glow discharge treatment employable herein may involve the use of low temperature plasma developed under a low gas pressure of from 10-3 to 20 Torr, even more preferably plasma under the atmospheric pressure. The plasma-excitable gas is a gas which can be excited by plasma under the aforementioned conditions. Examples of such a plasma-excitable gas include argon, helium, neon, krypton, xenon, nitrogen, carbon dioxide, fluorocarbon such as tetrafluoromethane, and mixture thereof. For the details of these plasma-excitable gases, reference can be made to Kokai Giho No. 2001-1745, Mar. 15, 2001, pp. 30-32, Japan Institute of Invention and Innovation. In the plasma treatment under the atmospheric pressure, which has been recently noted, a radiation energy of from 20 to 500 Kgy is used under an electric field of from 10 to 1,000 Kev. Preferably, a radiation energy of from 20 to 300 Kgy is used under an electric field of from 30 to 500 Kev. Particularly preferred among these surface treatments is alkaline saponification, which is extremely effective for the surface treatment of the cellulose acylate film.

The alkaline saponification is preferably carried out by dipping the cellulose acylate film directly in a saponifying solution tank or by spreading a saponifying solution over the cellulose acylate film. Examples of the coating method employable herein include dip coating method, curtain coating method, extrusion coating method, bar coating method, and E type coating method. As the solvent for the alkaline saponification coating solution there is preferably selected a solvent which exhibits good wetting properties and can keep the surface conditions of the cellulose acylate film good without roughening the surface thereof because the saponifying solution is spread over the cellulose acylate film. In some detail, an alcohol-based solvent is preferably used. An isopropyl alcohol is particularly preferred. Further, an aqueous solution of a surface active agent may be used as a solvent. The alkali of the alkaline saponification coating solution is preferably an alkali soluble in the aforementioned solvent, more preferably KOH or NaOH. The pH value of the saponification coating solution is preferably 10 or more, more preferably 12 or more. During the alkaline saponification, the reaction is preferably effected at room temperature for 1 second to 5 minutes, more preferably 5 seconds to 5 minutes, particularly 20 seconds to 3 minutes. The cellulose acylate film thus alkaline-saponified is preferably washed with water or an acid and then with water on the saponifying solution-coated surface thereof.

Figure 2:
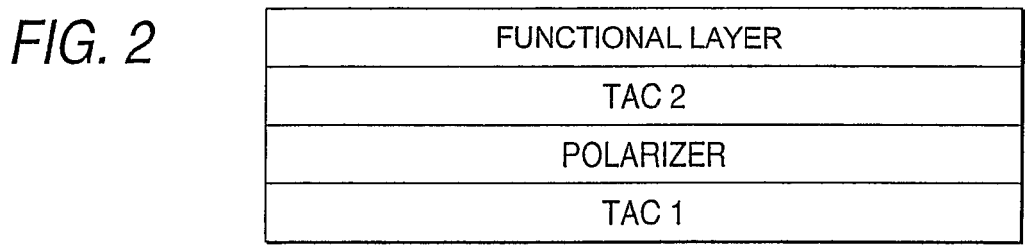
FIG. 2 is a sectional view typically illustrating a sectional structure of a polarizing plate according to an illustrative, non-limiting embodiment of the invention.

The polarizing plate of the invention preferably comprises at least one of hard coat layer, anti-glare layer and anti-reflection layer provided on the surface of the protective film disposed on the other side of the polarizing plate. In some detail, as shown in FIG. 2, a functional layer such as anti-reflection layer is preferably provided on the protective film (TAC2) disposed on the side of the polarizing plate opposite the liquid crystal cell during the use of the polarizing plate in the liquid crystal display. As such a functional layer there is preferably provided at least one of hard coat layer, anti-glare layer and anti-reflection layer. The various layers do not necessarily need to be provided as separate layers. For example, the anti-reflection layer or hard coat layer may be provided with the function of anti-glare layer so that the anti-reflection layer or hard coat layer acts also as an anti-glare layer.

(Anti-Reflection Layer)

In the invention, an anti-reflection layer comprising a light-scattering layer and a low refractive layer laminated on a protective film in this order or an anti-reflection layer comprising a middle refractive layer, a high refractive layer and a low refractive layer laminated on a protective film in this order is preferably used. Preferred examples of such an anti-reflection layer will be given below. The former configuration normally exhibits a specular reflectance of 1% or more and is called low reflection (LR) film. The latter configuration can attain a specular reflectance of 0.5% or less and is called anti-reflection (AR) film.

A preferred example of the anti-reflection layer (LR film) comprising a light-scattering layer and a low refractive layer provided on a protective film will be described below.

The light-scattering layer preferably has a particulate mat dispersed therein. The refractive index of the material of the light-scattering layer other than the particulate mat is preferably from 1.50 to 2.00. The refractive index of the low refractive layer is preferably from 1.20 to 1.49. In the invention, the light-scattering layer has both anti-glare properties and hard coating properties. The light-scattering layer may be formed by a single layer or a plurality of layers such as two to four layers.

The anti-reflection layer is preferably designed in its surface roughness such that the central line average roughness Ra is from 0.08 to 0.40 µm, the ten point averaged roughness Rz is 10 times or less Ra, the average distance between mountain and valley Sm is from 1 to 100 µm, the standard deviation of the height of mountains from the deepest portion in roughness is 0.5 µm or less, the standard deviation of the average distance between mountain and valley Sm with central line as reference is 20 µm or less and the proportion of the surface having an inclination angle of from 0 to 5 degrees is 10% or less, making it possible to attain sufficient anti-glare properties and visually uniform matte finish. Further, when the tint of reflected light under C light source comprises a* value of −2 to 2 and b* value of −3 to 3 and the ratio of minimum reflectance to maximum reflectance at a wavelength of from 380 nm to 780 nm is from 0.5 to 0.99, the tint of reflected light is neutral to advantage. Moreover, when the b* value of transmitted light under C light source is predetermined to range from 0 to 3, the yellow tint of white display for use in display devices is reduced to advantage. Further, when a lattice of having a size of 120 µm×40 µm is disposed interposed between the planar light source and the anti-reflection film of the invention so that the standard deviation of brightness distribution measured over the film is 20 or less, glare developed when the film of the invention is applied to a high precision panel can be eliminated to advantage.

When the optical properties of the anti-reflection layer employable herein are such that the specular reflectance is 2.5% or less, the transmission is 90% or more and the 60° gloss is 70% or less, the reflection of external light can be inhibited, making it possible to enhance the viewability to advantage. In particular, the specular reflectance is more preferably 1% or less, most preferably 0.5% or less. When the haze is from 20% to 50%, the ratio of inner haze to total haze is from 0.3 to 1; the reduction of haze from that up to the light-scattering layer to that developed after the formation of the low refractive layer is 15% or less, the sharpness of transmitted image at an optical comb width of 0.5 mm is from 20% to 50% and the ratio of transmission of vertical transmitted light to transmission of transmitted light in the direction of 2 degrees from the vertical direction is from 1.5 to 5.0, the prevention of glare on a high precision LCD panel and the elimination of blurring of letters, etc. can be attained to advantage.

(Low Refractive Layer)

The refractive index of the low refractive layer employable herein is preferably from 1.20 to 1.49, more preferably from 1.30 to 1.44. Further, the low refractive layer preferably satisfies formula (XX) to advantage from the standpoint of reduction of reflectance.

$$(m/4) \times 0.7 < n1d1 < (m/4) \times 1.3 \quad \quad (XX)$$

wherein m represents a positive odd number; n1 represents the refractive index of the low refractive layer; and d1 represents the thickness (nm) of the low refractive layer. λ is a wavelength ranging from 500 to 550 nm.

The materials constituting the low refractive layer will be described hereinafter.

The low refractive layer preferably comprises a fluorine-containing polymer incorporated therein as a low refractive binder. As such a fluorine-based polymer there is preferably used a thermally or ionized radiation-crosslinkable fluorine-containing polymer having a dynamic friction coefficient of from 0.03 to 0.20, a contact angle of from 90 to 120° with respect to water and a purified water slip angle of 70° or less. As the peel force of the polarizing plate of the invention with respect to a commercially available adhesive tape during the mounting on the image display device decreases, the polarizing plate can be more easily peeled after the sticking of seal or memo to advantage. The peel force of the polarizing plate is preferably 500 gf or less, more preferably 300 gf or less, most preferably 100 gf or less as measured by a tensile testing machine. The higher the surface hardness as measured by a microhardriess meter is, the more difficultly can be damaged the low refractive layer. The surface hardness of the low refractive layer is preferably 0.3 GPa or more, more preferably 0.5 GPa or more.

Examples of the fluorine-containing polymer to be used in the low refractive layer include hydrolyzates and dehydration condensates of perfluoroalkyl group-containing silane compounds (e.g., (heptadecafluoro-1, 1, 2, 2-tetrahydrodecyl)triethoxysilane). Other examples of the fluorine-containing polymer include fluorine-containing copolymers comprising a fluorine-containing monomer unit and a constituent unit for providing crosslinking reactivity as constituent components.

Specific examples of the fluorine-containing monomers include fluoroolefins (e.g., fluoroethylene, vinylidene fluoride, tetrafluoroethylene, perfluorooctylethylene, hexafluoropropylene, perfluoro-2,2-dimethyl-1,3-dioxol), partly or fully fluorinated alkylester derivatives of (meth)acrylic acid (e.g., Biscoat 6FM (produced by OSAKA ORGANIC CHEMICAL INDUSTRY LTD.), M-2020 (produced by DAIKIN INDUSTRIES, Ltd.), and fully or partly fluorinated vinyl ethers. Preferred among these fluorine-containing monomers are perfluoroolefins. Particularly preferred among these fluorine-containing monomers is hexafluoropropylene from the standpoint of refractive index, solubility, transparency, availability, etc.

Examples of the constituent unit for providing crosslinking reactivity include constituent units obtained by the polymerization of monomers previously having a self-crosslinking functional group such as glycidyl (meth)acrylate and glycidyl vinyl ether, constituent units obtained by the polymerization of monomers having carboxyl group, hydroxyl group, amino group, sulfo group or the like (e.g., (meth)acrylic acid, methyl (meth)acrylate, hydroxylallyl (meth)acrylate, allyl acrylate, hydroxyethyl vinyl ether, hydroxybutyl vinyl ether, maleic acid, crotonic acid), and constituent units obtained by introducing a crosslinking reactive group such as (meth)acryloyl group into these constituent units by a polymer reaction (e.g., by reacting acrylic acid chloride with hydroxyl group).

Besides the aforementioned fluorine-containing monomer units and constituent units for providing crosslinking reactivity, monomers free of fluorine atom may be properly copolymerized from the standpoint of solubility in the solvent, transparency of the film, etc. The monomer units which can be used in combination with the aforementioned monomer units are not specifically limited. Examples of these monomer units include olefins (e.g., ethylene, propylene, isoprene, vinyl chloride, vinylidene chloride), acrylic acid esters (e.g., methyl acrylate, ethyl acrylate, 2-ethylhexyl acrylate), methacrylic acid esters (e.g., methyl methacrylate, ethyl methacrylate, butyl methacrylate, ethylene glycol dimethacrylate), styrene derivatives (e.g., styrene, divinyl ether, vinyl toluene, α-methyl styrene), vinylethers (e.g., methyl vinyl ether, ethyl vinyl ether, cyclohexyl vinyl ether), vinylethers (e.g., vinyl acetate, vinyl propionate, vinyl cinnamate), acrylamides N-tert-butyl acrylamide, N-cyclohexyl acrylamide), methacrylamides, and acrylonitrile derivatives.

The aforementioned polymers may be used properly in combination with a hardener as disclosed in JP-A-10-25388 and JP-A-10-147739.

(Light-Scattering Layer)

The light-scattering layer is formed for the purpose of providing the film with light-scattering properties developed by any of surface scattering and inner scattering and hard coating properties for the enhancement of scratch resistance of the film. Accordingly, the light-scattering layer comprises a binder for providing hard coating properties, a particulate mat for providing light diffusibility and optionally an inorganic filler for the enhancement of refractive index, the prevention of crosslink shrinkage and the enhancement of strength incorporated therein. Further, the provision of such a light-scattering layer allows the light-scattering layer to act as an anti-glare layer, causing the polarizing plate to have an anti-glare layer.

The thickness of the light-scattering layer is from 1 to 10 μm, more preferably from 1.2 to 6 μm for the purpose of providing hard coating properties. When the thickness of the light-scattering layer is too small, the hard coating properties are short. On the contrary, when the thickness of the light-scattering layer is too great, the resulting polarizing plate exhibits deteriorated curling resistance and raised brittleness and thus lacks adaptability to working.

The binder to be incorporated in the light-scattering layer is preferably a polymer having a saturated hydrocarbon chain or polyether chain as a main chain, more preferably a polymer having a saturated hydrocarbon chain as a main chain. The binder polymer preferably has a crosslinked structure. As the binder polymer having a saturated hydrocarbon chain as a main chain there is preferably used a (co)polymer of monomers having two or more ethylenically unsaturated groups. In order to provide the binder polymer with a higher refractive index, those containing an aromatic ring or at least one atom selected from the group consisting of halogen atoms other than fluorine, sulfur atom, phosphorus atom and nitrogen atom may be selected.

Examples of the monomer having two or more ethylenically unsaturated groups include esters of polyvalent alcohol with (meth)acrylic acid (e.g., ethylene glycol di(meth)acrylate, butanediol di(meth)acrylate, hexanediol di(meth)acrylate, 1,4-cyclohexanediacrylate, pentaerythritol tetra(meth)acrylate, pentaerythritol tri(meth)acrylate, trimethylolpropane tri(meth)acrylate, trimethylolethane tri(meth)acrylate, dipentaerythritol penta(meth)acrylate, dipentaerythritol tetra(meth)acrylate, dipentaerythritol penta(meth)acrylate, dipentaeritluitol hexa(meth)acrylate, pentaerythritol hexa(meth)acrylate, 1,2,3-cyclohexane tetramethacrylate, polyurethane polyacrylate, polyester polyacrylate), modification products of the aforementioned ethylene oxides, vinylbenzene and derivatives thereof (e.g., 1,4-divinylbenzene, 4-vinyl benzoic acid-2-acryloylethylester, 1,4-divinyl cyclohexanone), vinylsulfones (e.g., divinylsulfone), acrylamides (e.g., methylenebisacrylamide), and methacrylamides. The aforementioned monomers may be used in combination of two or more thereof.

Specific examples of the high refractive monomer include bis(4-methacryloylthiophenyl)sulfide, vinyl naphthalene, vinyl phenyl sulfide, and 4-methacryloxy phenyl-4'-methoxyphenylthioether. These monomers, too, may be used in combination of two or more thereof.

The polymerization of the monomers having these ethylenically unsaturated groups can be effected by irradiation with ionized radiation or heating in the presence of a photoradical polymerization initiator or heat-radical polymerization initiator.

Accordingly, an anti-reflection layer can be formed by a process which comprises preparing a coating solution containing a monomer having an ethylenically unsaturated group, a photo-polymerization initiator or heat radical polymerization initiator, a particulate mat and an inorganic filler, spreading the coating solution over the protective film, and then irradiating the coat with ionized radiation or applying heat to the coat to cause polymerization reaction and curing. As such a photo-polymerization initiator or the like there may be used any compound known as such.

As the polymer having a polyether as a main chain there is preferably used an open-ring polymerization product of polyfunctional epoxy compound. The open-ring polymerization of the polyfunctional epoxy compound can be carried out by the irradiation of the polyfunctional epoxy compound with ionized radiation or applying heat to the polyfunctional epoxy compound in the presence of a photo-acid generator or heat-acid generator.

Accordingly, the anti-reflection layer can be formed by a process which comprises preparing a coating solution containing a polyfunctional epoxy compound, a photo-acid generator or heat-acid generator, a particulate mat and an inorganic filler, spreading the coating solution over the protective film, and then irradiating the coat layer with ionized radiation or applying heat to the coat layer to cause polymerization reaction and curing.

Instead of or in addition to the monomer having two or more ethylenically unsaturated groups, a monomer having a crosslinkable functional group may be used to incorporate a crosslinkable functional group in the polymer so that the crosslinkable functional group is reacted to incorporate a crosslinked structure in the binder polymer.

Examples of the crosslinkable functional group include isocyanate group, epoxy group, aziridin group, oxazoline group, aldehyde group, carbonyl group, hydrazine group, carboxyl group, methylol group, and active methylene group. Vinylsulfonic acids, acid anhydries, cyanoacrylate derivatives, melamines, etherified methylol, esters, urethane, and metal alkoxides such as tetramethoxysilane, too, may be used as monomers for introducing crosslinked structure. Functional groups which exhibit crosslinkability as a result of decomposition reaction such as block isocyanate group may be used. In other words, in the invention, the crosslinkable functional group may not be reactive as they are but may become reactive as a result of decomposition reaction.

These binder polymers having a crosslinkable functional group may be spread and heated to form a crosslinked structure.

The light-scattering layer comprises a particulate mat incorporated therein having an average particle diameter which is greater than that of filler particles and ranges from 1 to 10 μm, preferably from 1.5 to 7.0 μm, such as inorganic particulate compound and particulate resin for the purpose of providing itself with anti-glare properties.

Specific examples of the aforementioned particulate mat include inorganic particulate compounds such as particulate silica and particulate $TiO_2$, and particulate resins such as particulate acryl, particulate crosslinked acryl, particulate polystyrene, particulate crosslinked styrene, particulate melamine resin and particulate benzoguanamine resin. Preferred among these particulate resins are particulate crosslinked styrene, particulate crosslinked acryl, particulate crosslinked acryl styrene, and particulate silica. The particulate mat may be either spherical or amorphous.

Two or more particulate mats having different particle diameters may be used in combination. A particulate mat having a greater particle diameter may be used to provide the light-scattering layer with anti-glare properties. A particulate mat having a greater particle diameter may be used to provide the light-scattering layer with other optical properties.

Further, the distribution of the particle diameter of the mat particles is most preferably monodisperse. The particle diameter of the various particles are preferably as close to each other as possible. For example, in the case where a particle having a diameter of 20% or more greater than the average particle diameter is defined as coarse particle, the proportion of these coarse particles is preferably 1% or less, more preferably 0.1% or less, even more preferably 0.01% or less of the total number of particles. A particulate mat having a particle diameter distribution falling within the above defined range can be obtained by properly classifying the mat particles obtained by an ordinary synthesis method. By raising the number of classifying steps or intensifying the degree of classification, a matting agent having a better distribution can be obtained.

The aforementioned particulate mat is incorporated in the light-scattering layer in such a manner that the proportion of the particulate mat in the light-scattering layer is from 10 to 1,000 mg/m$^2$, more preferably from 100 to 700 mg/m$^2$.

For the measurement of the distribution of particle size of mat particles, a coulter counter method. The particle size distribution thus measured is then converted to distribution of number of particles.

The light-scattering layer preferably comprises an inorganic filler made of an oxide of at least one metal selected from the group consisting of titanium, zirconium, aluminum, indium, zinc, tin and antimony having an average particle diameter of 0.2 μm or less, preferably 0.1 μm or less, more preferably 0.06 μm or less incorporated therein in addition to the aforementioned particulate mat to enhance the refractive index thereof. In order to enhance the difference of refractive index from the particulate mat, the light-scattering layer comprising a high refractive particulate mat incorporated therein preferably comprises a silicon oxide incorporated therein for keeping the refractive index thereof somewhat low. The preferred particle diameter of the particulate silicon oxide is the same as that of the aforementioned inorganic filler.

Specific examples of the inorganic filler to be incorporated in the light-scattering layer include $TiO_2$, $ZrO_2$, $Al_2O_3$, $In_2O_3$, $ZnO$, $SnO_2$, $Sb_2O_3$, ITO, and $SiO_2$. Particularly preferred among these inorganic fillers are $TiO_2$ and $ZrO_2$ from the standpoint of enhancement of refractive index. The inorganic filler is preferably subjected to silane coupling treatment or titanium coupling treatment on the surface thereof. To this end, a surface treatment having a functional group reactive with the binder seed on the surface thereof is preferably used.

The amount of the inorganic filler to be incorporated is preferably from 10 to 90%, more preferably from 20 to 80%, particularly from 30 to 75% based on the total weight of the light-scattering layer.

Such a filler has a particle diameter which is sufficiently smaller than the wavelength of light and thus causes no scattering. Thus, a dispersion having such a filler dispersed in a binder polymer behaves as an optically uniform material.

The bulk refractive index of the mixture of binder and inorganic filler in the light-scattering layer is preferably from 1.50 to 2.00, more preferably from 1.51 to 1.80. In order to predetermine the bulk refractive index of the mixture within the above defined range, the kind and proportion of the binder and the inorganic filler may be properly selected. How to select these factors can be previously easily known experimentally.

In order to keep the light-scattering layer uniform in surface conditions such as uniformity in coating and drying and prevention of point defects, the coating solution for forming the light-scattering layer comprises either or both of fluorine-based surface active agent and silicone-based surface active agent incorporated therein. In particular, a fluorine-based surface active agent is preferably used because it can be used in a smaller amount to exert an effect of eliminating surface defects such as unevenness in coating and drying and point defects of the anti-reflection film of the invention. Such a fluorine-based surface active agent is intended to render the coating solution adaptable to high speed coating while enhancing the uniformity in surface conditions, thereby raising the productivity.

The anti-reflection layer (AR film) comprising a middle refractive layer, a high refractive layer and a low refractive layer laminated on a protective film in this order will be described hereinafter.

The anti-reflection layer comprising a layer structure having at least a middle refractive layer, a high refractive layer and a low refractive layer (outermost layer) laminated on a protective film in this order is designed so as to have a refractive index satisfying the following relationship.

Refractive index of high refractive layer>refractive index of middle refractive layer>refractive index of protective film>refractive index of low refractive layer Further, a hard coat layer may be provided interposed between the protective film and the middle refractive layer. Moreover, the anti-reflection layer may comprise a middle refractive layer, a hard coat layer, a high refractive layer and a low refractive layer laminated on each other.

For example, an anti-reflection layer as disclosed in JP-A-8-122504, JP-A-8-110401, JP-A-10-300902, JP-A-2002-243906, and JP-A-2000-111706 may be used.

Further, the various layers may be provided with other functions. Examples of these layers include stain-proof low refractive layer, and antistatic high refractive layer (as disclosed in JP-A-10-206603, JP-A-2002-243906).

The haze of the anti-reflection layer is preferably 5% or less, more preferably 3% or less. The strength of the anti-reflection layer is preferably not lower than H, more preferably not lower than 2H, most preferably not lower than 3H as determined by pencil hardness test method according to JIS K5400.

(High Refractive Layer and Middle Refractive Layer)

The layer having a high refractive index in the anti-reflection layer is formed by a hardened layer containing at least a high refractive inorganic particulate compound having an average particle diameter of 100 nm or less and a matrix binder.

As the high refractive inorganic particulate compound there may be used an inorganic compound having a refractive index of 1.65 or more, preferably 1.9 or more. Examples of such a high refractive inorganic particulate compound include oxides of Ti, Zn, Sb, Sn, Zr, Ce, Ta, La and In, and composite oxides of these metal atoms.

In order to provide such a particulate material, the following requirements need to be satisfied. For example, the surface of the particles must be treated with a surface treatment (e.g., silane coupling agent as disclosed in JP-A-11-295503, JP-A-11-153703, and JP-A-2000-9908, anionic compound or organic metal coupling agent as disclosed in JP-A-2001-310432). Further, the particles must have a core-shell structure comprising a high refractive particle as a core (as disclosed in JP-A-2001-166104). A specific dispersant must be used at the same time (as disclosed in JP-A-11-153703, U.S. Pat. No. 6,210,858B1, JP-A-2002-2776069).

Examples of the matrix-forming materials include known thermoplastic resins, thermosetting resins, etc.

Preferred examples of the matrix-forming materials include polyfunctional compound-containing compositions having two or more of at least any of radically polymerizable group and cationically polymerizable group, compositions having an organic metal compound containing a hydrolyzable group, and at least one selected from the group consisting of compositions containing a partial condensate thereof.

Examples of these materials include compounds as disclosed in JP-A-2000-47004, JP-A-2001-315242, JP-A-2001-31871, and JP-A-2001-296401.

Further, a colloidal metal oxide obtained from a hydrolytic condensate of metal alkoxide and a curable layer obtained from a metal alkoxide composition are preferably used. For the details of these materials, reference can be made to JP-A-2001-293818.

The refractive index of the high refractive layer is preferably from 1.70 to 2.20. The thickness of the high refractive layer is preferably from 5 nm to 10 μm, more preferably from 10 nm to 1 μm.

The refractive index of the middle refractive layer is adjusted so as to fall between the refractive index of the low refractive layer and the high refractive layer. The refractive index of the middle refractive layer is preferably from 1.50 to 1.70. The thickness of the middle refractive layer is preferably from 5 nm to 10 μm, more preferably from 10 nm to 1 μm.

(Low Refractive Layer)

The low refractive layer is laminated on the high refractive layer. The refractive index of the low refractive layer is preferably from 1.20 to 1.55, more preferably from 1.30 to 1.50.

The low refractive layer is preferably designed as an outermost layer having scratch resistance and stain resistance. In order to drastically raise the scratch resistance of the low refractive layer, a thin layer which can effectively provide surface slipperiness may be formed on the low refractive layer by introducing a known silicone or fluorine thereinto.

As the fluorine-containing compound there is preferably used a compound containing a crosslinkable or polymerizable functional group having fluorine atoms in an amount of from 35 to 80% by weight.

Examples of such a compound include those disclosed in JP-A-9-222503, paragraphs [0018]-[0026], JP-A-11-38202, paragraphs [0019]-[0030], JP-A-2001-40284, paragraphs [0027]-[0028], and JP-A-284102.

The refractive index of the fluorine-containing compound is preferably from 1.35 to 1.50, more preferably from 1.36 to 1.47.

As the silicone compound there is preferably used a compound having a polysiloxane structure wherein a curable functional group or polymerizable functional group is incorporated in the polymer chain to form a bridged structure in the film. Examples of such a compound include reactive silicones (e.g., SILAPLANE, produced by CHESSO CORPORATION), and polysiloxanes having silanol group at both ends thereof (as disclosed in JP-A-11-258403).

In order to effect the crosslinking or polymerization reaction of at least any of fluorine-containing polymer and siloxane polymer having crosslikable or polymerizable group, the coating composition for forming the outermost layer containing a polymerization initiator, a sensitizer, etc. is preferably irradiated with light or heated at the same time with or after spreading to form a low refractive layer.

Further, a sol-gel cured film obtained by curing an organic metal compound such as silane coupling agent and a silane coupling agent containing a specific fluorine-containing hydrocarbon group in the presence of a catalyst is preferably used.

Examples of such a sol-gel cured film include polyfluoroalkyl group-containing silane compounds and partial hydrolytic condensates thereof (compounds as disclosed in JP-A-58-142958, JP-A-58-14783, JP-A-58-147484, JP-A-9-157582, and JP-A-11-106704), and silyl compounds having poly(perfluoroalkylether) group as a fluorine-containing long chain (compounds as disclosed in JP-A-2000-117902, JP-A-2001-48590, JP-A-2002-53804).

The low refractive layer may comprise a filler (e.g., low refractive inorganic compound having a primary average particle diameter of from 1 to 150 nm such as particulate silicon dioxide (silica) and particulate fluorine-containing material (magnesium fluoride, calcium fluoride, barium fluoride), organic particulate material as disclosed in JP-A-11-3820, paragraphs [0020]-[0038]), a silane coupling agent, a lubricant, a surface active agent, etc. incorporated therein as additives other than the aforementioned additives.

In the case where the low refractive layer is disposed under the outermost layer, the low refractive layer may be formed by a gas phase method (vacuum metallizing method, sputtering method, ion plating method, plasma CVD method, etc.). A coating method is desirable because the low refractive layer can be produced at reduced cost.

The thickness of the low refractive layer is preferably from 30 to 200 nm, more preferably from 50 to 150 nm, most preferably from 60 to 120 nm.

(Hard Coat Layer)

The hard coat layer is provided on the surface of the protective film to give a physical strength to the protective film having an anti-reflection layer provided thereon. In particular, the hard coat layer is preferably provided interposed between the transparent support and the aforementioned high refractive layer. The hard coat layer is preferably formed by the crosslinking reaction or polymerization reaction of a photosetting and/or thermosetting compound. The curable functional group in the curable compound is preferably a photopolymerizable functional group. Further, an organic metal compound or organic alkoxysilyl compound containing a hydrolyzable functional group is desirable.

Specific examples of these compounds include the same compounds as exemplified with reference to the high refractive layer. Specific examples of the composition constituting the hard coat layer include those described in JP-A-2002-144913, JP-A-2000-9908, and WO00/46617.

The high refractive layer may act also as a hard coat layer. In this case, particles may be finely dispersed in a hard coat layer in the same manner as described with reference to the high refractive layer to form a high refractive layer.

The hard coat layer may comprise particles having an average particle diameter of from 0.2 to 10 μm incorporated therein to act also as an anti-glare layer provided with anti-glare properties.

The thickness of the hard coat layer may be properly designed depending on the purpose. The thickness of the hard coat layer is preferably from 0.2 to 10 μm, more preferably from 0.5 to 7 μm.

The strength of the hard coat layer is preferably not lower than H, more preferably not lower than 2H, most preferably not lower than 3H as determined by pencil hardness test according to JIS K5400. The abrasion of the test specimen is preferably as little as possible when subjected to taper test according to JIS $K_{5400}$.

(Layers Other than Anti-Reflection Layer)

Further, a forward scattering layer, a primer layer, an antistatic layer, an undercoating layer, a protective film, etc. may be provided.

(Antistatic Layer)

The antistatic layer, if provided, is preferably given an electrical conductivity of $10^{-8}$ ($\Omega cm^{-3}$) or less as calculated in terms of volume resistivity. The use of a hygroscopic material, a water-soluble inorganic salt, a certain kind of a surface active agent, a cation polymer, an anion polymer, colloidal silica, etc. makes it possible to provide a volume resistivity of $10^{-8}$ ($\Omega cm^{-3}$). However, these materials have a great dependence on temperature and humidity and thus cannot provide a sufficient electrical conductivity at low humidity. Therefore, as the electrically conductive layer material there is preferably used a metal oxide. Some metal oxides have a color. The use of such a colored metal oxide as an electrically conductive layer material causes the entire film to be colored to disadvantage. Examples of metal that forms a colorless metal oxide include Zn, Ti, Al, In, Si, Mg, Ba, W, and V. Metal oxides mainly composed of these metals are preferably used. Specific examples of these metal oxides include $ZnO$, $TiO_2$, $SnO_2$, $Al_2O_3$, $In_2O_3$, $SiO_2$, $MgO$, $BaO$, $MoO_3$, $V_2O_5$, and composites thereof. Particularly preferred among these metal oxides are $ZnO$, $TiO_2$, and $SnO_2$. Referring to the incorporation of different kinds of atoms, Al, In, etc. are effectively added to $ZnO$. Sb, Nb, halogen atoms, etc. are effectively added to $SnO_2$. Nb, Ta, etc. are effectively added to $TiO_2$. Further, as disclosed in JP-B-59-6235, materials comprising the aforementioned metal oxide attached to other crystalline metal particles or fibrous materials (e.g., titanium oxide) may be used. Volume resistivity and surface resistivity are different physical values and thus cannot be simply compared with each other. However, in order to provide an electrical conductivity of $10^{-8}$ ($\Omega cm^{-3}$) or less as calculated in terms of volume resistivity, it suffices if the electrically conductive layer has an electrical conductivity of $10^{-10}$ ($\Omega/\square$) or less as calculated in terms of surface resistivity. It is necessary that the surface resistivity of the electrically conductive layer be measured when the antistatic layer is provided as an outermost layer. The measurement of surface resistivity can be effected at a step in the course of the formation of laminated film.

(Liquid Crystal Display)

Exemplary embodiments of the liquid crystal display of the invention can be classified as liquid crystal display comprising at least one sheet of polarizing plate of the invention (first aspect), VA mode, OCB mode and TN mode liquid crystal displays each comprising one sheet of polarizing plate of the invention provided on the upper and lower sides of the cell (second aspect) and VA mode liquid crystal display comprising any one sheet of the polarizing plates of the invention provided only on the backlight side (third aspect).

In other words, the cellulose acylate film of the invention can be used as an optical compensation sheet to advantage. Further, the cellulose acylate film of the invention can be used in various display modes of liquid crystal cell. Various display modes, including TN (Twisted Nematic), IPS (In-Plane Switching), FLC (Ferroelectric Liquid Crystal), AFLC (Antiferroelectric Liquid Crystal), OCB (Optically Compensatory Bend), STN (Super Twisted Nematic), VA (Vertically Aligned) and HAN (Hybrid Aligned Nematic), have been proposed. Among these display modes, VA mode and OCB mode are preferably used in the invention.

In a VA mode liquid crystal cell, rod-like liquid crystal molecules are vertically oriented when no voltage is applied.

VA mode liquid crystal cells include (1) liquid crystal cell in VA mode in a narrow sense in which rod-like liquid crystal molecules are oriented substantially vertically when no voltage is applied but substantially horizontally when a voltage is applied (as disclosed in JP-A-2-176625). In addition to the VA mode liquid crystal cell (1), there have been provided (2) liquid crystal cell of VA mode which is multidomained to expand the viewing angle (MVA mode) (as disclosed in SID97, Digest of Tech. Papers (preprint) 28 (1997), 845), (3) liquid crystal cell of mode in which rod-like molecules are oriented substantially vertically when no voltage is applied but oriented in twisted multidomained mode when a voltage is applied (n-ASM mode, CAP mode) (as disclosed in Pre-prints of Symposium on Japanese Liquid Crystal Society Nos. 58 to 59, 1988 and (4) liquid crystal cell of SURVAL-VAL mode (as reported in LCD International 98).

Figure 3:
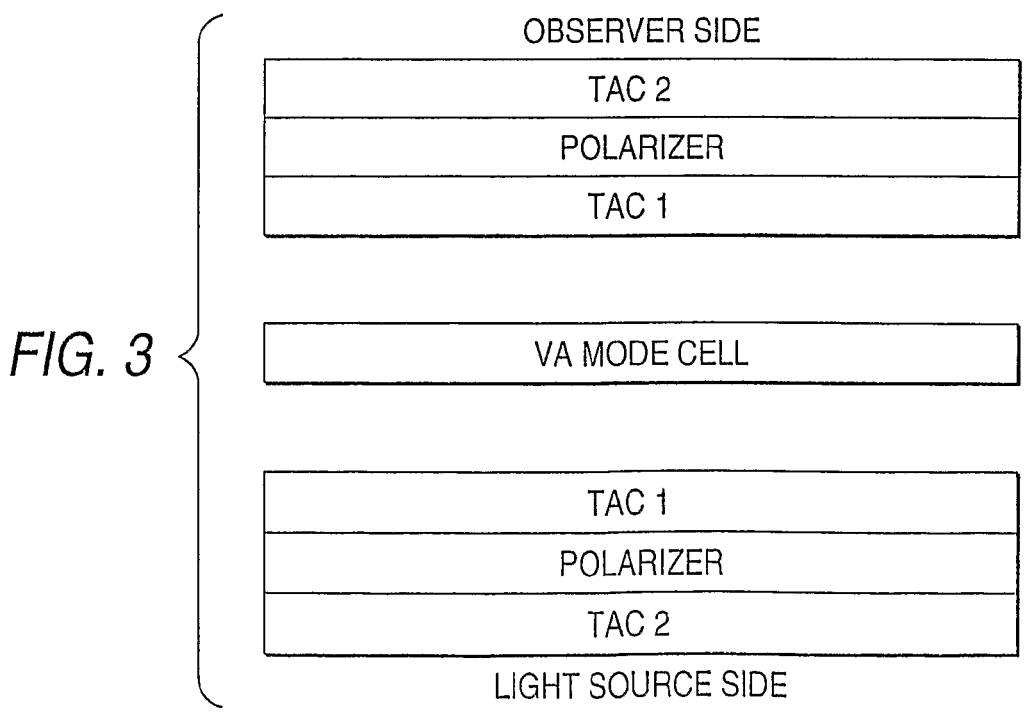
FIG. 3 is a sectional view typically illustrating a liquid crystal display according to an illustrative, non-limiting embodiment of the invention of the invention.

As the VA mode liquid crystal display there may be exemplified one comprising a liquid crystal cell (VA mode cell) and two sheets of polarizing plate disposed on the respective side thereof (polarizing plate comprising TAC1, polarizing film and TAC2) as shown in FIG. 3. Thought not shown specifically, the liquid crystal cell comprises a liquid crystal supported interposed between two sheets of electrode substrate.

In an embodiment of implementation of the transmission type liquid crystal display of the invention, a cellulose acylate film of the invention is used as an optical compensation sheet. The cellulose acylate film is disposed interposed between the liquid crystal cell and one or both of the polarizing plates.

In another embodiment of implementation of the transmission type liquid crystal display of the invention, as the protective film to be disposed between the liquid crystal cell and the polarizing film there is used a cellulose acylate film of the invention. The aforementioned cellulose acylate film may be used only as the protective film for one of the polarizing plates (between the liquid crystal cell and the polarizing film). Alternatively, the aforementioned cellulose acylate film may be used as the protective film for both the two polarizing plates (between the liquid crystal cell and the polarizing film). The sticking of the cellulose acylate film to the liquid crystal cell is preferably effected such that the cellulose acylate film of the invention (TAC1) is disposed on VA cell side. In the case where the aforementioned cellulose acylate film is used only as the protective film for one of the polarizing plates (between the liquid crystal cell and the polarizing film), the cellulose acylate film may be disposed either on the upper polarizing plate (viewing side) or on the lower polarizing plate (backlight side) without any functional limitation. However, when the cellulose acylate film is used for the upper polarizing plate, it is necessary that a functional layer be provided on the viewing side (upper side), possibly deteriorating the productivity. Therefore, it is thought likely that the cellulose acylate film can be used for the lower polarizing plate. This is thought to be a preferred embodiment.

The embodiment of FIG. 3 in which the protective film on both the light source side and viewing side are formed by the polarizing plate of the invention is a liquid crystal display of the second aspect. The embodiment of FIG. 3 in which the protective film only on the light source side is formed by the polarizing plate of the invention is a liquid crystal display of the third aspect.

The protective film of FIG. 3 (TAC2) may be an ordinary cellulose acylate film and is preferably thinner than the cellulose acylate film of the invention. The thickness of TAC2 is preferably from 40 to 80 µm. Examples of TAC2 include commercially available products such as KC4UX2M (produced by Konica Minolta Opto Products Co., Ltd.; 40 µm), KC5UX (produced by Konica Minolta Opto Products Co., Ltd.; 60 µm) and TD80 (produced by Fuji Photo Film Co., Ltd.; 80 µm). However, the invention is not limited to these products.

EXAMPLE

The invention will be further described in the following examples, but the invention is not limited thereto.

Example 1

Production of Cellulose Acylate Film Using Band Casting Machine (Films 1 to 18, 28, 29))

(1) Cellulose Acylate

Cellulose acylates having different kinds of acyl groups and substitution degrees as set forth in Table 1 were prepared. In some detail, sulfuric acid was added as a catalyst (in an amount of 7.8 parts by weight based on 100 parts by weight of cellulose). In the presence of this catalyst, a carboxylic acid as a raw material of acyl substituent was then subjected to acylation reaction at 40° C. During this procedure, the kind and amount of carboxylic acid used was adjusted to adjust the kind and substitution degree of acyl group. The carboxylic acid thus acylated was then ripened at 40° C. The low molecular components of cellulose acylate were then removed by washing with acetone. In Table 2, CAB stands for cellulose acylate butyrate (cellulose acetate derivative comprising acyl group composed of acetate and butyryl (Bu) groups), CAP stands for cellulose acetate propionate (cellulose ester derivative comprising acyl group composed of acetate and propionyl (Pr) groups), and CTA stands for cellulose triacetate (cellulose ester derivative comprising acyl group composed of acetate group alone).

(2) Dissolution

Cellulose acylates as set forth in Table 1, a plasticizer (TPP: triphenyl phosphate; BDP: biphenyl diphenyl phosphate), an ultraviolet absorber (UV1: 2(2'-hydroxy-3',5'-di-tert-butylphenyl)benzotriazole); UV2: 2(2'-hydroxy-3',5'-di-amylphenyl)-5-chlorobenzotriazole), the following retardation increasing agent 13 represented by formula (A), and the following retardation increasing agent 19 represented by formula (B) were added to a 87: 13 (by weight) mixture of dichloromethane and methanol with stirring in such an amount that the weight concentration of cotton reached 15% by weight. The mixture was then heated with stirring to make solution. At the same time, a particulate matting agent (Aerosil R972, produced by Nippon Aerosil Co., Ltd.) were added to the mixture in an amount of 0.05 parts by weight based on 100 parts by weight of cellulose acylate. In Table 1, the amount of particulate matting agent is based on 100 parts by weight of cotton.

Retardation Increasing Agent

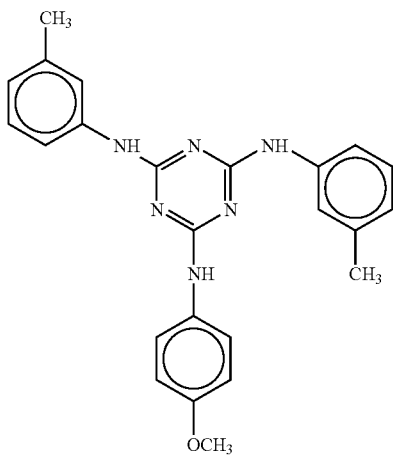

Formula (A)

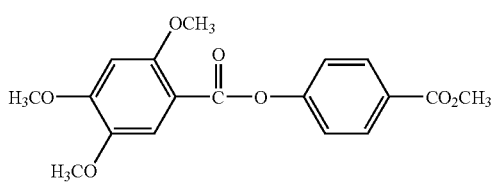

Formula (B)

(Casting)

The aforementioned dopes were each then casted using a band casting machine. The films thus formed were each then peeled off the band when the amount of residual solvent was from 25 to 35% by weight. Using a tenter, the films thus peeled were each then crosswise stretched by a factor of from 0% to 30% (see Table 1) at a stretching temperature of from about (Tg−5° C.) to (Tg+5° C.) to prepare a cellulose acylate film. Table 1 indicates the draw ratio attained by the tenter. The cellulose acylate films thus prepared (optical compensation sheet) were each then measured for Re retardation value and Rth retardation value at 25° C., 60% RH and a wavelength of 590 nm using a Type KOBRA 21ADH birefringence measuring device (produced by Ouji Scientific Instruments Co. Ltd.). The cellulose acylate films 1 to 18, 28 and 29 thus prepared were each then measured for elastic modulus and hygroscopic expansion coefficient in the machine direction. The results are set forth in the column "Liquid crystal cell side protective film" in Table 2.

All the films obtained in the present example exhibited a haze of from 0.1 to 0.9, a matting agent secondary average particle diameter of 1.0 µm or less and a weight change of from 0 to 3% after being allowed to stand at 80° C. and 90% RH for 48 hours. The dimensional change developed when the films are each allowed to stand at 60° C. and 95% RH and 90° C. and 5% RH for 24 hours was from 0 to 4.5%. All the samples exhibited an optoelastic coefficient of $50 \times 10^{-13}$ cm$^2$/dyne or less.

Example 2

Preparation of Cellulose Acylate Film Using Drum Casting Machine (Films 19 to 21, and 27))

(1) Dissolution

Cellulose acylates CTA as set forth in Table 1 which had been prepared in the same manner as in Example 1, a plasticizer, the aforementioned retardation increasing agent 13 represented by formula (A), a retardation increasing agent 18 represented by formula (C), a retardation reducer (A-19), and a wavelength dispersion adjustor (2-hydroxy-4-n-octoxybenzopheone; HOBP) were added to a 82:1:3 (by weight) mixture of dichloromethane, methanol and butanol with stirring in such an amount that the weight concentration of cotton reached 18% by weight. The mixture was then heated with stirring to make solution. At the same time, a particulate matting agent (Aerosil R972, produced by Nippon Aerosil Co., Ltd.) was added to the mixture in an amount of 0.05 parts by weight based on 100 parts by weight of cellulose acylate.

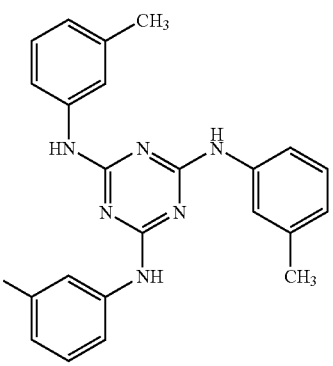

Formula (C)

(Casting)

The dopes thus prepared were each casted over a drum which had been cooled to 0° C. through a casting port. The films thus formed were each then peeled off the drum when the solvent content was 70% by weight. The films thus peeled were each then dried while the crosswise size thereof was being kept such that the crosswise draw ratio (in the direction perpendicular to the machine direction) is 3% when the solvent content is from 3 to 5% by weight with the both crosswise ends thereof being fixed to a pin tenter (pin tenter shown in FIG. 3 of JP-A-4-1009). Thereafter, the films thus processed were each then passed through the gap between rolls in a heat treatment apparatus so that they were dried to prepare films 19 to 21, and 27. The cellulose acylate films thus prepared were each then measured for Re retardation value and Rth retardation value at 25° C.; 60% RH and a wavelength of 590 nm using a Type KOBRA 21ADH birefringence measuring device (produced by Ouji Scientific Instruments Co. Ltd.). The cellulose acylate films 19 to 21, and 27 thus prepared were each then measured for elastic modulus and hygroscopic expansion coefficient in the machine direction. The results are set forth in the column "Liquid crystal cell side protective film" in Table 2.

All the films obtained in the present example exhibited a haze of from 0.1 to 0.9, a matting agent secondary average particle diameter of 1.0 µm or less and a weight change of from 0 to 3% after being allowed to stand at 80° C. and 90% RH for 48 hours. The dimensional change developed when the films are each allowed to stand at 60° C. and 95% RH and 90° C. and 5% RH for 24 hours was from 0 to 4.5%. All the samples exhibited an optoelastic coefficient of $50 \times 10^{-13}$ cm$^2$/dyne or less.

Example 3

Preparation of Optical Compensation Sheet (Film 22) Having Optical Anisotropic Layer)

(Saponification)

The film 15 thus prepared was passed through induction type heated rolls at 60° C. so that the surface temperature of the film was raised to 40° C. Using a bar coater, an alkaline solution having formulation was then spread over the film in an amount of 14 ml/m$^2$. The film thus coated was then allowed to reside under a 110° C. steam type far infrared heater (produced by Noritake Co., Limited) for 10 seconds. Using a bar coated similarly, purified water was then spread over the film in an amount of 3 ml/m$^2$. At this time, the temperature of the film was 40° C. Subsequently, rinse using a fountain coater and dehydration using an air knife were conducted three time. Thereafter, the film was allowed to reside in a 70° C. drying zone for 2 seconds.

<Formulation of Alkaline Solution>

| | |
|---|---|
| Potassium hydroxide | 4.7 parts by weight |
| Water | 15.7 parts by weight |
| Isopropanol | 64.8 parts by weight |
| Propylene glycol | 14.9 parts by weight |
| $C_{16}H_{33}O(CH_2CH_2O)_{10}H$ (surface active agent) | 1.0 parts by weight |

(Formation of Oriented Layer)

Using a #14 wire bar coater, a coating solution having formulation was spread over the cellulose acylate film thus prepared in an amount of 24 ml/m$^2$. The coated cellulose acylate film was dried with 60° C. hot air for 60 seconds and then with 90° C. hot air for 150 seconds. Subsequently, the cellulose acylate film was subjected to rubbing in the direction of clockwise 135° with the longitudinal direction (conveying direction) of the cellulose acylate film as 0°.

<Formulation of Oriented Layer Coating Solution>

| | |
|---|---|
| Modified polyvinyl alcohol having formulation | 40 parts by weight |
| Water | 728 parts by weight |
| Methanol | 228 parts by weight |
| Glutaraldehyde (crosslinking agent) | 2 parts by weight |
| Ester citrate (AS3, produced by Sankio Chemical Co., Ltd.) | 0.69 parts by weight |

Modified polyvinyl alcohol

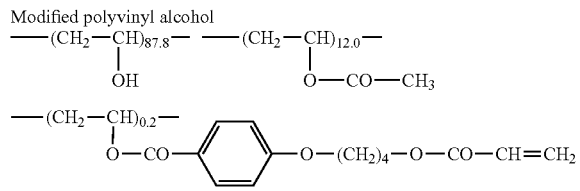

(Formation of Optical Anisotropic Layer)

A coating solution obtained by dissolving 41.01 Kg of the following discotic liquid crystal compound, 4.06 Kg of an ethylene oxide-modified trimethylolpropane triacrylate (V#360, produced by OSAKA ORGANIC CHEMICAL INDUSTRY LTD.), 0.29 Kg of a cellulose acetate butyrate (CAB531-1, produced by Eastman Chemical Ltd.), 1.35 Kg of a photopolymerization initiator (Irgacure 907, produced by Ciba Geigy Inc.), 0.45 Kg of a sensitizer (Kayacure DETX, produced by NIPPON KAYAKU CO., LTD.) and 0.45 Kg of ester citrate (AS3, produced by Sankio Chemical Co., Ltd.) in 102 Kg of methyl ethyl ketone and then adding 0.1 Kg of a fluoroaliphatic group-containing copolymer (Magafac F780, produced by DAINIPPON INK AND CHEMICALS, INCORPORATED) to the solution was continuously spread over the oriented layer of the film 15 which was being conveyed at a rate of 20 m/min using a #2.7 wire bar which was being rotated at 391 rpm in the same direction as the direction of conveyance of the film. The film was then dried at a step where the film was continuously heated from room temperature to 100° C. to remove solvent. Thereafter, the film was heated for about 90 seconds in a 135° C. drying zone in such a manner that hot air hit the surface of the film at a rate of 1.5 m/sec in the direction parallel to that of conveyance of the film so that the discotic liquid crystal compound was oriented. Subsequently, the film was passed to a 80° C. drying zone where the film was irradiated with ultraviolet rays at an illuminance of 600 mW for 4 seconds using an ultraviolet radiator (ultraviolet lamp: output: 160 W/cm; length of light emitted: 1.6 m) with the surface temperature of the film kept at about 100° C. so that the crosslinking reaction proceeded to fix the discotic liquid crystal compound to its orientation. Thereafter, the film was allowed to cool to room temperature, and then wound cylindrically to form a rolled film. Thus, a rolled optical compensation film 22 was prepared.

The optical anisotropic layer thus obtained exhibited Re retardation value of 28 nm as measured at a wavelength of 546 nm using a Type M-150 ellipsometer (produced by JASCO). The angle (inclination angle) between the disc surface and the support surface of the discotic liquid crystal compound in the optical anisotropic layer showed a continuous change in the depth direction and was 33° on the average. Further, only the optical anisotropic layer was peeled off the sample. The optical anisotropic layer was then measured for average direction of symmetrical molecular axes. The result was 45.5° with respect to the longitudinal direction of the optical compensation film 22. The optical compensation film (film 22) thus prepared was then measured for elastic modulus and hygroscopic expansion coefficient in the machine direction. The results are set forth in the column "Liquid crystal cell side protective film" in Table 2.

Discotic Liquid Crystal Compound

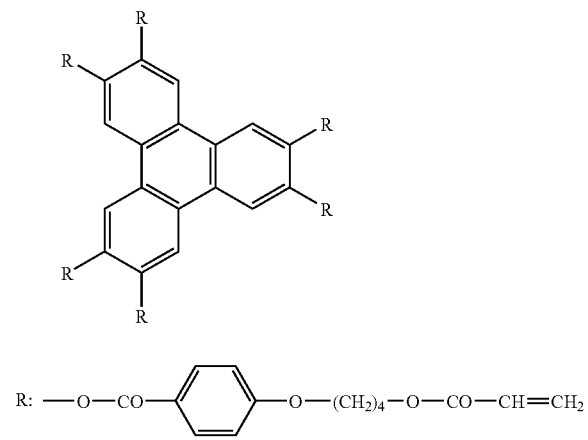

Example 4

Preparation of Optical Compensation Sheet (Films 23, 24) Having Optical Anisotropic Layer The films 19 and 20 prepared in Example 2 were each subjected to saponification and preparation of oriented layer in the same manner as in Example 3. Subsequently, the cellulose acylate film was subjected to rubbing in the direction of clockwise 180° with the longitudinal direction (conveying direction) of the cellulose acylate film as 0°.

A coating solution obtained by dissolving 91.0 Kg of the aforementioned discotic liquid crystal compound, 9.0 Kg of an ethylene oxide-modified trimethylolpropane triacrylate (V#360, produced by OSAKA ORGANIC CHEMICAL INDUSTRY LTD.), 2.0 Kg of a cellulose acetate butyrate (CAB551-0.2, produced by Eastman Chemical Ltd), 0.5 Kg of a cellulose acetate butyrate (CAB531-1, produced by Eastman Chemical Ltd.), 3.0 Kg of a photopolymerization initiator (Irgacure 907, produced by Ciba Geigy Inc.) and 1.0 Kg of a sensitizer (Kayacure DETX, produced by NIPPON KAYAKU CO., LTD.) in 207 Kg of methyl ethyl ketone and then adding 0.4 Kg of a fluoroaliphatic group-containing copolymer (Magafac F780, produced by DAINIPPON INK AND CHEMICALS, INCORPORATED) to the solution was continuously spread over the oriented layer of the films 19 and 20 which were being conveyed at a rate of 20 m/min using a #3.2 wire bar which was being rotated at 391 rpm in the same direction as the direction of conveyance of the film. The films were each then dried at a step where the film was continuously heated from room temperature to 100° C. to remove solvent. Thereafter, the film was heated for about 90 seconds in a 135° C. drying zone in such a manner that hot air hit the surface of the film at a rate of 5.0 msec in the direction parallel to that of conveyance of the film so that the discotic liquid crystal compound was oriented. Subsequently, the films were each passed to a 80° C. drying zone where the films were irradiated with ultraviolet rays at an illuminance of 600 mW for 4 seconds using an ultraviolet radiator (ultraviolet lamp: output: 160 W/cm; length of light emitted: 1.6 m) with the surface temperature of the film kept at about 100° C. so that the crosslinking reaction proceeded to fix the discotic liquid crystal compound to its orientation. Thereafter, the films were each allowed to cool to room temperature, and then wound cylindrically to form a rolled film. Thus, rolled optical compensation films 23 and 24 were prepared.

The optical anisotropic layers thus obtained exhibited Re retardation value of 45 nm as measured at a wavelength of 633 nm using a Type M-150 ellipsometer (produced by JASCO). The angle (inclination angle) between the disc surface and the support surface of the discotic liquid crystal compound in the optical anisotropic layers showed a continuous change in the depth direction and was 38° on the average. Further, only the optical anisotropic layer was peeled off the samples. The optical anisotropic layers were each then measured for average direction of symmetrical molecular axes. The result was −0.3° with respect to the longitudinal direction of the optical compensation films 23 and 24. The optical compensation films 23 and 24 thus prepared were each then measured for elastic modulus and hygroscopic expansion coefficient in the machine direction. The results are set forth in the column "Liquid crystal cell side protective film" in Table 2.

Example 5

Preparation of Protective Film (Film 25))

A polyimide synthesized from 2,2'-bis(3,4-discarboxyphenyl)hexafluoropropane and 2,2'-bis (trifluoromethyl)-4,4'-diaminobiphenyl was dissolved in cyclohexanone to prepare a 15 wt-% solution. The polyimide solution thus prepared was spread over the film 21 prepared in Example 2 to a dry thickness of 6 and then dried at 150° C. for 5 minutes. The film was then crosswise stretched in a 150° C. atmosphere using a tenter stretching machine by a factor of 15% to obtain a film 25. The film thus prepared was then measured for Re retardation value and Rth retardation value at 25° C., 60% RH and a wavelength of 590 nm using a Type KOBRA 21ADH birefringence measuring device (produced by Ouji Scientific Instruments Co. Ltd.). The thickness of the film 25 was 75 μm. The protective film (film 25) thus prepared was then measured for elastic modulus and hygroscopic expansion coefficient in the machine direction. The results are set forth in the column "Liquid crystal cell side protective film" in Table 2.

Example 6

Preparation of protective film (film 26))

A film 6 was prepared in the same manner as in Example 5 except that as the support there was used TD80U (produced by Fuji Photo Film Co., Ltd.) instead of film 21 and the polyimide solution was spread to a dry thickness of 5.5 μm. The thickness of the film 26 was 75 μm. The protective film (film 26) thus prepared was then measured for elastic modulus and hygroscopic expansion coefficient in the machine direction. The results are set forth in the column "Liquid crystal cell side protective film" in Table 2.

Example 7

Preparation of Protective Film Capable of Preventing Reflection (Film 30))

(Preparation of Light-Scattering Layer Coating Solution)

50 g of a mixture of pentaerythritol triacrylate and pentaerythritol tetraacryalte (PETA, produced by NIPPON KAYAKU CO., LTD.) was diluted with 38.5 g of toluene. To the solution was then added 2 g of a polymerization initiator (Irgacure 184, produced by Ciba Geigy Specialty Chemicals Co., Ltd.). The mixture was then stirred. The refractive index of the coat layer obtained by spreading and ultraviolet-curing the solution was 1.51.

To the solution were then added 1.7 g of a 30% toluene dispersion of a particulate crosslinked polystyrene having an average particle diameter of 3.5 μm (refractive index: 1.60; SX-350, produced by Soken Chemical & Engineering Co., Ltd.) and 13.3 g of a 30% toluene dispersion of a particulate crosslinked acryl-styrene having an average particle diameter of 3.5 μm (refractive index: 1.55, produced by Soken Chemical & Engineering Co., Ltd.) which had both been dispersed at 10,000 rpm by a polytron dispersing machine for 20 minutes. Finally, to the solution were added 0.75 g of a fluorine-based surface modifier (FP-1) and 10 g of a silane coupling agent (ICBM-5103, produced by Shin-Etsu Chemical Co., Ltd.) to obtain a completed solution.

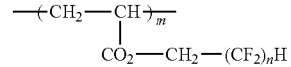

FP-1 m is about 36, and n is 6.

The aforementioned mixture was then filtered through a polypropylene filter having a pore diameter of 30 μm to prepare a light-scattering layer coating solution.

(Preparation of Low Refractive Layer Coating Solution)

Firstly, a sol a was prepared in the following manner. In some detail, 120 parts of methyl ethyl ketone, 100 parts of an acryloyloxypropyl trimethoxysilane (ICBM5103, produced by Shin-Etsu Chemical Co., Ltd.) and 3 parts of diisopropoxyaluminum ethyl acetoacetate were charged in a reaction vessel equipped with an agitator and a reflux condenser to make mixture. To the mixture were then added 30 parts of deionized water. The mixture was reacted at 60° C. for 4 hours, and then allowed to cool to room temperature to obtain a sol a. The weight-average molecular weight of the sol was 1,600. The proportion of components having a molecular weight of from 1,000 to 20,000 in the oligomer components was 100%. The gas chromatography of the sol showed that no acryloyloxypropyl trimethoxysilane which is a raw material had been left.

13 g of a thermally-crosslinkable fluorine-containing polymer (JN-7228; solid concentration: 6%; produced by JSR Co., Ltd.), 1.3 g of silica sol (silica having a particle size different from that MEK-ST; average particle size: 45 nm; solid concentration: 30%; produced by NISSAN CHEMICAL INDUSTRIES, LTD.), 0.6 g of the sol a thus prepared, 5 g of methyl ethyl ketone and 0.6 g of cyclohexanone were mixed with stirring. The solution was then filtered through a polypropylene filter having a pore diameter of 1 μm to prepare a low refractive layer coating solution.

(Preparation of Transparent Protective Film with Anti-Reflection Layer)

The aforementioned coating solution for functional layer (light-scattering layer) was spread over a triacetyl cellulose film having a thickness of 80 μm (Fujitac TD80U, produced by Fuji Photo Film Co., Ltd.) which was being unwound from a roll at a gravure rotary speed of 30 rpm and a conveying speed of 30 m/min using a mircogravure roll with a diameter of 50 mm having 180 lines/inch and a depth of 40 μm and a doctor blade. The coated film was dried at 60° C. for 150 seconds, irradiated with ultraviolet rays at an illuminance of 400 mW/cm² and a dose of 250 mJ/cm² from an air-cooled metal halide lamp having an output of 160 W/cm (produced by EYE GRAPHICS CO., LTD.) in an atmosphere in which the air within had been purged with nitrogen so that the coat layer was cured to form a functional layer to a thickness of 6 μm. The film was then wound.

The coating solution for low refractive layer thus prepared was spread over the triacetyl cellulose film having a functional layer (light-scattering layer) provided thereon was being unwound at a gravure rotary speed of 30 rpm and a conveying speed of 15 m/min using a mircogravure roll with a diameter of 50 mm having 180 lines/inch and a depth of 40 μm and a doctor blade. The coated film was dried at 120° C. for 150 seconds and then at 140° C. for 8 minutes. The film was irradiated with ultraviolet rays at an illuminance of 400 mW/cm² and a dose of 900 mJ/cm² from an air-cooled metal halide lamp having an output of 240 W/cm (produced by EYE GRAPHICS CO., LTD.) in an atmosphere in which the air within had been purged with nitrogen to form a low refractive layer to a thickness of 100 μm. The film was then wound. Thus, an anti-reflection protective film (film 30) was prepared. The anti-reflection protective film (film 30) thus prepared was then measured for elastic modulus and hygroscopic expansion coefficient in the machine direction. The results are set forth in the column "Liquid crystal cell side protective film" in Table 2.

Example 8

Preparation of Anti-Reflection Protective Film (Film 31))

(Preparation of Hard Coat Layer Coating Solution)

To 750.0 parts by weight of a trimethylolpropane triacrylate (TMPTA, produced by NIPPON KAYAKU CO., LTD.) were added 270.0 parts by weight of a poly(glycidyl methacrylate) having a weight-average molecular weight of 3,000, 730.0 g of methyl ethyl ketone, 500.0 g of cyclohexanone and 50.0 g of a photopolymerization initiator (Irgacure 184, produced by Ciba Geigy Japan Inc.). The mixture was then stirred. The mixture was then filtered through a polypropylene filter having a pore diameter of 0.4 μm to prepare a hard coat layer coating solution.

(Preparation of Fine Dispersion of Titanium Dioxide)

As the particulate titanium dioxide there was used a particulate titanium dioxide containing cobalt surface-treated with aluminum hydroxide and zirconium hydroxide (MPT-129, produced by ISHIHARA SANGYO KAISHA, LTD.).

To 257.1 g of the particulate titanium dioxide were then added 38.6 g of the following dispersant and 704.3 g of cyclohexanone. The mixture was then dispersed using a dinomill to prepare a dispersion of titanium dioxide particles having a weight-average particle diameter of 70 nm.

Dispersant

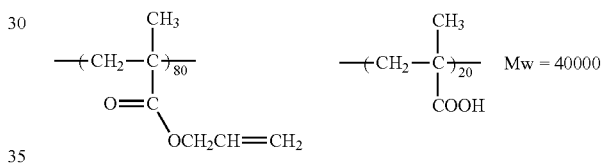

(Preparation of Middle Layer Coating Solution)

To 88.9 g of the aforementioned dispersion of titanium dioxide particles were added 58.4 g of a mixture of dipentaerytritol petaacrylate and dipentaerythritol hexaacrylate (DPHA), 3.1 g of a photopolymerization initiator (Irgacure 907), 1.1 g of a photosensitizer (Kayacure DETX, produced by NIPPON KAYAKU CO., LTD.), 482.4 g of methyl ethyl ketone and 1,869.8 g of cyclohexanone. The mixture was then stirred. The mixture was thoroughly stirred, and then filtered through a polypropylene filter having a pore diameter of 0.4 μm to prepare a middle refractive layer coating solution.

(Preparation of High Refractive Layer Coating Solution)

To 586.8 g of the aforementioned dispersion of titanium dioxide particles were added 47.9 g of a mixture of dipentaerytritol petaacrylate and dipentaerythritol hexaacrylate (DPHA), 4.0 g of a photopolymerization initiator (Irgacure 907), 1.3 g of a photosensitizer (Kayacure DETX, produced by NIPPON KAYAKU CO., LTD.), 455.8 g of methyl ethyl ketone and 1,427.8 g of cyclohexanone. The mixture was then stirred. The mixture was thoroughly stirred, and then filtered through a polypropylene filter having a pore diameter of 0.4 μm to prepare a high refractive layer coating solution.

(Preparation of Low Refractive Layer Coating Solution)

The following copolymer (P-1) was dissolved in methyl ethyl ketone in such an amount that the concentration reached 7% by weight. To the solution were then added a methacrylate group-terminated silicone resin X-22-164C (produced by Shin-Etsu Chemical Co., Ltd.) and a photoradical generator Irgacure 907 (trade name) in an amount of 3% and 5% by weight, respectively, to prepare a low refractive layer coating solution.

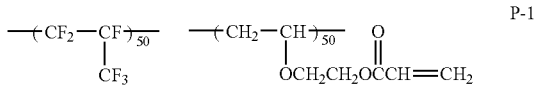

(The ratio 50:50 indicates a molar ratio)
(Preparation of Transparent Protective Film with Anti-Reflection Layer)

A hard coat layer coating solution was spread over a triacetyl cellulose film having a thickness of 80 μm (Fujitack TD80U, produced by Fuji Photo Film Co., Ltd.) using a gravure coater. The coated film was dried at 100° C., and then irradiated with ultraviolet rays at an illuminance of 400 mW/cm$^2$ and a dose of 300 mJ/cm$^2$ from an air-cooled metal halide lamp having an output of 160 W/cm (produced by EYE GRAPHICS CO., LTD.) in an atmosphere in which the air within had been purged with nitrogen to reach an oxygen concentration of 1.0 vol-% so that the coat layer was cured to form a hard coat layer to a thickness of 8 μm.

The middle refractive layer coating solution, the high refractive layer coating solution and the low refractive layer coating solution were continuously spread over the hard coat layer using a gravure coater having three coating stations.

The drying conditions of the middle refractive layer were 100° C. and 2 minutes. Referring to the ultraviolet curing conditions, the air in the atmosphere was purged with nitrogen so that the oxygen concentration reached 1.0 vol-%. In this atmosphere, ultraviolet rays were emitted at an illuminance of 400 mW/cm$^2$ and a dose of 400 mJ/cm$^2$ by an air-cooled metal halide lamp having an output of 180 W/cm (produced by EYE GRAPHICS CO., LTD.). The middle refractive layer thus cured had a refractive index of 1.630 and a thickness of 67 nm.

The drying conditions of the high refractive layer and the low refractive layer were 90° C. and 1 minute followed by 100° C. and 1 minute. Referring to the ultraviolet curing conditions, the air in the atmosphere was purged with nitrogen so that the oxygen concentration reached 1.0 vol-%. In this atmosphere, ultraviolet rays were emitted at an illuminance of 600 mW/cm$^2$ and a dose of 600 mJ/cm$^2$ by an air-cooled metal halide lamp having an output of 240 W/cm (produced by EYE GRAPHICS CO., LTD.).

The high refractive layer thus cured had a refractive index of 1.905 and a thickness of 107 nm and the low refractive layer thus cured had a refractive index of 1.440 and a thickness of 85 nm. Thus, a transparent protective film with anti-reflection layer (film 31) was prepared. The transparent protective film with anti-reflection layer (film 31) was then measured for elastic modulus and hygroscopic expansion coefficient in the machine direction.

Example 9

Preparation of Polarizing Plate

A polyvinyl alcohol (PVA) film having a thickness of 80 μm was dipped in an aqueous solution of iodine having an iodine concentration of 0.05% by weight at 30° C. for 60 seconds so that it was dyed, longitudinally stretched by a factor of 5 while being dipped in an aqueous solution of boric acid having a boric cid concentration of 4% by weight for 60 seconds, and then dried at 50° C. for 4 minutes to obtain a polarizing film having a thickness of 20 μm.

The protective films prepared in Examples 1 to 7 set forth in Table 2 and a commercially available cellulose acylate films were each dipped in a 55C 1.5 mol/l aqueous solution of sodium hydroxide, and then thoroughly washed with water to remove sodium hydroxide. Thereafter, these films were each dipped in a 35C 0.005 mol/l aqueous solution of diluted sulfuric acid for 1 minute, and then dipped in water to remove thoroughly the aqueous solution of diluted sulfuric acid. Finally, the sample was thoroughly dried at 120° C.

The protective films of Examples 1 to 7 and commercially available cellulose acylate films thus saponified were each then laminated with a polyvinyl alcohol-based adhesive with the aforementioned polarizing film interposed therebetween according to the combination set forth in Table 2 to obtain polarizing plates 1 to 27.

As the commercially available cellulose acylate films there were used Fujitac T40UZ, Fujitac TF80UL, Fujitac TD80UL (produced by Fuji Photo Film Co., Ltd.) and KC4UX2MW and KC80UVSFD (produced by Konica Minolta Opto Products Co., Ltd.). These commercially available cellulose acylate films, too, were each then measured for elastic modulus and hygroscopic expansion coefficient in the machine direction. The results are set forth in the column "Liquid crystal cell side protective film" in Table 2.

During this procedure, the polarizing film and the protective film on the both sides of the polarizing film are continuously stuck to each other because they are in a rolled form and parallel to each other in the longitudinal direction. In the protective film disposed on the cell side, as shown in FIG. 1, the transmission axis of the polarizing film and the slow axis of the cellulose acylate film prepared in Example 1 are parallel to each other.

An acrylic adhesive was provided on the cell side of the polarizing plate thus prepared. A separator film was then stuck to the adhesive. A protective film was stuck to the side of the polarizing plate opposite the cell.

Example 10

Using a spectrophotometer (produced by JASCO CO., LTD.), these polarizing plates were each measured for spectral reflectance on the functional layer side thereof at an incidence angle of 5° and a wavelength of from 380 to 780 nm to determine an integrating sphere average reflectance at 450 to 650 nm. As a result, the polarizing plates 16, 19 and 20, which comprise the transparent protective film 30 with anti-reflection layer, exhibited an integrating sphere average reflectance of 2.3%. The polarizing plate 18, which comprised the transparent protective film 31 with anti-reflection layer, exhibited an integrating sphere average reflectance of 0.4%. For the measurement of reflectance, the protective film was peeled off the transparent protective film with anti-reflection layer.

Example 11

Measurement of Curling

The polarizing plates 1 to 17 and 21 to 27 prepared in Example 9 were each punched to a rectangle having a side of 305 mm along the absorption axis and a side of 230 mm along the transmission axis. The polarizing plates 18 to 20 were each punched to a rectangle having a size of 305 mm×230 mm which is 45 degrees oblique to the absorption axis of the polarizing plate. These specimens were each then placed on a flat table with the side thereof having rising ends facing downward. The sample was then allowed to stand at 25° C. and 60% RH for 2 hours or more. The highest height of the point of the polarizing plate from the surface of the table was then measured to determine the curling.

When the polarizing plate is curled and bent toward the side of the polarizing plate on which it is stuck to the liquid crystal cell, it is called + (plus) curl. When the polarizing plate is curled and bent toward the side of the polarizing plate opposite the liquid crystal cell, it is called (minus) curl. The results are set forth in Table 2.

(Polarizing Plate Sticking Test)

The specimens thus punched from the polarizing plates were each set in a polarizing plate sticking machine where they were then subjected to sticking test on a glass sheet having a thickness of 0.7 mm. The polarizing plates 1 to 7, 9 to 15, 18, 19, and 21 to 27 showed no relief from the sticking fixture equipped with a suction mechanism in the sticking machine, no generation of bubbles after sticking of glass sheet and no deviation of the sides of the polarizing plate from the sides of the glass sheet.

On the contrary, the polarizing plates 8, 16 17 and 20 showed much curling that caused a clearance between the sticking fixture equipped with a suction mechanism in the sticking machine and the polarizing plate, making it impossible to suck and fix the polarizing plate stably by the sticking fixture. Thus, the polarizing plates came off the sticking fixture when stuck to the glass sheet. Further, bubbles were generated between the polarizing plate and the glass sheet. The sticking angle showed some deviation.

TABLE 1

| Film No. | Cotton | Substitution degree A | Kind | Substitution degree B | Total substitution degree A + B | Degree of substitution at 6-position | Total degree of substitution at 6-position | Kind of plasticizer |
|---|---|---|---|---|---|---|---|---|
| 1 | CAP | 1.9 | Pr | 0.8 | 2.7 | 0.897 | 0.332 | TPP/BDP |
| 2 | CAP | 0.18 | Pr | 2.47 | 2.65 | 0.883 | 0.333 | TPP/BDP |
| 3 | CAB | 1.4 | Bu | 1.3 | 2.7 | 0.88 | 0.326 | TPP/BDP |
| 4 | CAB | 0.3 | Bu | 2.5 | 2.8 | 0.89 | 0.318 | TPP/BDP |
| 5 | CTA | 2.785 | — | 0 | 2.785 | 0.91 | 0.327 | TPP/BDP |
| 6 | CTA | 2.849 | — | 0 | 2.849 | 0.934 | 0.328 | TPP/BDP |
| 7 | CTA | 2.87 | — | 0 | 2.87 | 0.907 | 0.316 | TPP/BDP |
| 8 | CAP | 1.9 | Pr | 0.8 | 2.7 | 0.897 | 0.332 | TPP/BDP |
| 9 | CAP | 0.18 | Pr | 2.47 | 2.65 | 0.883 | 0.333 | TPP/BDP |
| 10 | CAB | 1.1 | Bu | 1.6 | 2.7 | 0.881 | 0.326 | TPP/BDP |
| 11 | CAB | 0.3 | Bu | 2.5 | 2.8 | 0.89 | 0.318 | TPP/BDP |
| 12 | CTA | 2.785 | — | 0 | 2.785 | 0.91 | 0.327 | TPP/BDP |
| 13 | CTA | 2.847 | — | 0 | 2.847 | 0.947 | 0.333 | TPP/BDP |
| 14 | CTA | 2.87 | — | 0 | 2.87 | 0.907 | 0.316 | TPP/BDP |
| 15 | CTA | 2.87 | — | 0 | 2.87 | 0.907 | 0.316 | TPP/BDP |
| 16 | CAB | 0.3 | Bu | 2.5 | 2.8 | 0.89 | 0.318 | TPP/BDP |
| 17 | CAB | 1.1 | Bu | 1.6 | 2.7 | 0.881 | 0.326 | TPP/BDP |
| 18 | CAP | 1.9 | Pr | 0.8 | 2.7 | 0.897 | 0.322 | TPP/BDP |
| 19 | CTA | 2.87 | — | 0 | 2.87 | 0.907 | 0.316 | TPP/BDP |
| 20 | CTA | 2.87 | — | 0 | 2.87 | 0.907 | 0.316 | TPP/BDP |
| 21 | CTA | 2.92 | — | 0 | 2.92 | 0.923 | 0.316 | — |
| 27 | CTA | 2.87 | — | 0 | 2.87 | 0.907 | 0.316 | TPP/BDP |
| 28 | CTA | 2.79 | — | 0 | 2.79 | 0.9 | 0.323 | TPP/BDP |
| 29 | CTA | 2.79 | — | 0 | 2.79 | 0.9 | 0.323 | TPP/BDP |

| Film No. | Added amount | Kind of additives | Added amount of additives | Draw ratio % |
|---|---|---|---|---|
| 1 | 7.8/3.9 | UV absorber UV1/UV2 | 0.7/0.3 | 31 |
| 2 | 3.9/1.9 | Retardation increasing agent 13 | 3 | 15 |
| 3 | 3.9/1.9 | UV absorber UV1/UV2 | 0.7/0.3 | 20 |
| 4 | 3.9/1.9 | UV absorber UV1/UV2 | 0.7/0.3 | 20 |
| 5 | 7.8/3.9 | Retardation increasing agent 13 | 5 | 23 |
| 6 | 7.8/3.9 | Retardation increasing agent 13 | 4 | 23 |
| 7 | 7.8/3.9 | Retardation increasing agent 13 | 2.7 | 25 |
| 8 | 7.8/3.9 | UV absorber UV1/UV2 | 0.7/0.3 | 31 |
| 9 | 2/1 | Retardation increasing agent 13 | 5 | 30 |
| 10 | 3.9/1.9 | Retardation increasing agent 13 | 3 | 20 |
| 11 | 3.9/1.9 | Retardation increasing agent 13 | 3 | 20 |
| 12 | 7.8/3.9 | Retardation increasing agent 13 | 5 | 20 |
| 13 | 7.8/3.9 | Retardation increasing agent 13 | 5 | 20 |
| 14 | 7.8/3.9 | Retardation increasing agent 13 | 6.5 | 20 |
| 15 | 7.8/3.9 | Retardation increasing agent 13 | 5 | 20 |
| 16 | 3.9/1.9 | UV absorber UV1/UV2 | 0.7/0.3 | 20 |
| 17 | 3.9/1.9 | Retardation increasing agent 13 | 3 | 20 |
| 18 | 7.8/3.9 | UV absorber UV1/UV2 | 0.7/0.3 | 31 |
| 19 | 7.8/3.9 | Retardation increasing agent 13 | 2.4 | — |
| 20 | 7.8/3.9 | Retardation increasing agent 13 | 3 | — |
| 21 | — | Retardation reducer A-19/wavelength dispersion adjuster HOBP | 15/2 | — |
| 27 | 7.8/3.9 | Retardation increasing agent 18 | 1.4 | — |
| 28 | 7.8/3.9 | Retardation increasing agent 13 | 5.9 | 25 |
| 29 | 7.8/3.9 | Retardation increasing agent 13/retardation increasing agent 19 | 2.2/3.2 | 28 |

TABLE 2

| | | Liquid crystal cell side protective film | | | | | |
|---|---|---|---|---|---|---|---|
| Polarizing plate No. | Film No. | Thickness [μm] | Re [nm] | Rth [nm] | Elastic modulus [MPa] | Elastic modulus × thickness [MPa · m] | Hygroscopic expansion coefficient [ppm/% RH] |
| 1 | 1 | 80 | 45 | 125 | 2,352 | 0.19 | 61 |
| 2 | 2 | 93 | 39 | 138 | 1,700 | 0.16 | 31 |
| 3 | 3 | 93 | 24 | 140 | 2,100 | 0.20 | 55 |
| 4 | 4 | 92 | 28 | 138 | 1,500 | 0.14 | 28 |
| 5 | 5 | 60 | 48 | 132 | 2,900 | 0.17 | 56 |
| 6 | 6 | 92 | 51 | 130 | 3,000 | 0.28 | 63 |
| 7 | 7 | 92 | 33 | 136 | 3,136 | 0.29 | 51 |
| 8 | 16 | 92 | 28 | 138 | 1,500 | 0.14 | 28 |
| 9 | 8 | 134 | 76 | 210 | 2,352 | 0.32 | 61 |
| 10 | 9 | 91 | 61 | 263 | 1,700 | 0.15 | 31 |
| 11 | 10 | 92 | 58 | 233 | 2,000 | 0.18 | 55 |
| 12 | 11 | 93 | 56 | 229 | 1,500 | 0.14 | 28 |
| 13 | 12 | 92 | 74 | 220 | 2,900 | 0.27 | 56 |
| 14 | 13 | 92 | 47 | 211 | 3,000 | 0.28 | 63 |
| 15 | 14 | 97 | 50 | 210 | 3,038 | 0.29 | 51 |
| 16 | 17 | 92 | 58 | 233 | 2,000 | 0.18 | 55 |
| 17 | 18 | 134 | 76 | 210 | 2,352 | 0.32 | 61 |
| 18 | 22 | 94 | — | — | 3,038 | 0.29 | 53 |
| 19 | 23 | 82 | — | — | 3,701 | 0.30 | 55 |
| 20 | 24 | 60 | — | — | 3,579 | 0.21 | 55 |
| 21 | 21 | 80 | 2 | 1 | 2,901 | 0.23 | 50 |
| 22 | 25 | 74 | 61 | 220 | 3,010 | 0.22 | 41 |
| 23 | 26 | 73 | 60 | 210 | 3,611 | 0.26 | 55 |
| 24 | 27 | 80 | 9 | 80 | 3,801 | 0.30 | 57 |
| 25 | 28 | 92 | 67 | 217 | 3,015 | 0.28 | 60 |
| 26 | 29 | 93 | 66 | 190 | 3,030 | 0.28 | 62 |
| 27 | TD80UL | 80 | 2 | 43 | 3,528 | 0.28 | 59 |

| | | Protective film on the side opposite liquid crystal cell | | | | |
|---|---|---|---|---|---|---|
| Polarizing plate No. | Film No. | Thickness [μm] | Elastic modulus [MPa] | Elastic modulus × thickness [MPa · m] | Hygroscopic expansion coefficient [ppm/% RH] | Curl [mm] | Remarks |
| 1 | KC4UX2MW | 40 | 2,996 | 0.12 | 53 | −23 | Inventive |
| 2 | T40UZ | 40 | 2,813 | 0.11 | 53 | −10 | Inventive |
| 3 | KC4UX2MW | 40 | 2,996 | 0.12 | 53 | −24 | Inventive |
| 4 | T40UZ | 40 | 2,813 | 0.11 | 53 | −2 | Inventive |
| 5 | Film 1 | 80 | 2,352 | 0.19 | 61 | 6 | Inventive |
| 6 | TF80UL | 80 | 3,224 | 0.26 | 53 | −5 | Inventive |
| 7 | KC80UVSFD | 80 | 2,996 | 0.24 | 53 | −10 | Inventive |
| 8 | TD80UL | 80 | 3,528 | 0.28 | 59 | 74 | Comparative |
| 9 | TD80UL | 80 | 3,528 | 0.28 | 59 | −7 | Inventive |
| 10 | KC4UX2MW | 40 | 2,996 | 0.12 | 53 | −6 | Inventive |
| 11 | Film 2 | 93 | 1,700 | 0.16 | 31 | −13 | Inventive |
| 12 | T40UZ | 40 | 2,813 | 0.11 | 53 | −2 | Inventive |
| 13 | T80UZ | 80 | 3,119 | 0.25 | 53 | −4 | Inventive |
| 14 | TF80UL | 80 | 3,224 | 0.26 | 53 | −5 | Inventive |
| 15 | TF80UL | 80 | 3,224 | 0.26 | 53 | −7 | Inventive |
| 16 | Film 30 | 80 | 3,843 | 0.31 | 59 | 41 | Comparative |
| 17 | T40UZ | 40 | 2,813 | 0.11 | 53 | −40 | Comparative |
| 18 | Film 31 | 80 | 3,843 | 0.31 | 59 | 6 | Inventive |
| 19 | Film 30 | 80 | 3,843 | 0.31 | 59 | 1 | Inventive |
| 20 | Film 30 | 80 | 3,843 | 0.31 | 59 | 27 | Comparative |
| 21 | KC80UVSFD | 80 | 2,996 | 0.24 | 53 | 3 | Inventive |
| 22 | Film 1 | 80 | 2,352 | 0.19 | 61 | −5 | Inventive |
| 23 | KC80UVSFD | 80 | 2,996 | 0.24 | 53 | −6 | Inventive |
| 24 | TD80UL | 80 | 3,528 | 0.28 | 59 | −4 | Inventive |
| 25 | TD80UL | 80 | 3,528 | 0.28 | 59 | 1 | Inventive |
| 26 | TD80UL | 80 | 3,528 | 0.28 | 59 | 0 | Inventive |
| 27 | TD80UL | 80 | 2,996 | 0.28 | 59 | 0 | Inventive |

Example 12

Mounting on Panel

Mounting on VA Panel (Two-Sheet Type)

The front and rear polarizing plates and the retarder film plate were peeled off a Type LC-20C5-S VA mode liquid crystal TV (produced by SHARP CORPORATION). The polarizing plates 1 to 8 prepared in Example 9 were each then stuck to the front and back sides of the liquid crystal. During this procedure, arrangement was made such that the absorption axis of the polarizing plate on the viewing side was disposed along the horizontal direction of the panel, the absorption axis of the polarizing plate on the backlight side was disposed on the vertical direction of the panel and the adhesive surface was disposed on the liquid crystal cell side.

The protective film was then peeled off the polarizing plates. Using a Type EZ-Contrast 160D measuring instrument (produced by ELDIM Inc.), the liquid crystal display was then measured for viewing angle (range within which the contrast ratio is 10 or more and there is no brightness inversion on the black side) at 8 steps from black display (L1) to white display (L8). All the polarizing plates provided good viewing angle properties.

Mounting on VA Panel (One-Sheet Type) (1)

The front and rear polarizing plates and the retarder film were peeled off a Type LC-20C5-S VA mode liquid crystal TV (produced by SHARP CORPORATION). A commercially available polarizing plate free of viewing angle compensation plate (HLC2-5618, produced by SANRITZ CORPORATION) was stuck to the front side of the liquid crystal display. The polarizing plates 9 to 17, 22 and 23 prepared in Example 9 were each then stuck to the back side of the liquid crystal display. During this procedure, arrangement was made such that the absorption axis of the polarizing plate on the viewing side was disposed along the horizontal direction of the panel, the absorption axis of the polarizing plate on the backlight side was disposed on the vertical direction of the panel and the adhesive surface was disposed on the liquid crystal cell side.

The protective film was then peeled off the polarizing plates. Using a Type EZ-Contrast 160D measuring instrument (produced by ELDIM Inc.), the liquid crystal display was then measured for viewing angle (range within which the contrast ratio is 10 or more and there is no brightness inversion on the black side) at 8 steps from black display (L1) to white display (L8). All the polarizing plates provided good viewing angle properties.

Mounting on VA Panel (One-Sheet Type) (2)

The polarizing plates prepared in Example 9 were each stuck to the viewing side and backlight side of MVA mode liquid crystal cells according to the combination set forth in Table 3. During this procedure, arrangement was made such that the absorption axis of the polarizing plate on the viewing side was disposed along the horizontal direction of the panel, the absorption axis of the polarizing plate on the backlight side was disposed on the vertical direction of the panel and the adhesive surface was disposed on the liquid crystal cell side. As the MVA' mode liquid crystal cells there were used those having $\Delta nd$ of 260 nm, 280 nm, 300 nm, 320 nm, 340 nm and 360 nm, respectively, as set forth in Table 3.

Using a Type EZ-Contrast 160D measuring instrument (produced by ELDIM Inc.), the liquid crystal display was then measured for brightness and tint of black display (L1) and white display (L8). The extreme angle at which the contrast ratio in the direction along the bisector between the absorption axis of the viewing side polarizing plate and the backlight side polarizing plate is defined as viewing angle. The greatest distance of chromaticity (x, y) from the chromaticity coordinates (x0, y0) in xy chromaticity diagram where the xy chromaticity of tint change developed when the viewing direction approaches from the direction of line normal to the liquid crystal cell to the aforementioned direction of bisector in black display is defined as color change $\Delta xy$. The measurements of color change $\Delta xy$ and viewing angle are set forth in Table 3.

TABLE 3

| Liquid crystal cell No. | Viewing side polarizing plate No. | Re(590) [nm] | Rth(590) [nm] | Backlight side polarizing plate No. | Re(590) [nm] | Rth(590) [nm] | Rth(590) total [nm] | Liquid crystal cell $\Delta nd$ [nm] | Rth(590) total/liquid crystal cell $\Delta nd$ | Color change | Viewing angle [°] | Remarks |
|---|---|---|---|---|---|---|---|---|---|---|---|---|
| 1 | 21 | 2 | 1 | 6 | 51 | 130 | 131 | 280 | 0.47 | 0.1 | 40 | Inventive |
| 2 | 21 | 2 | 1 | 26 | 66 | 190 | 191 | 280 | 0.68 | 0.1 | 60 | Inventive |
| 3 | 25 | 67 | 217 | 21 | 2 | 1 | 218 | 300 | 0.73 | 0.15 | 75 | Inventive |
| 4 | 21 | 2 | 1 | 10 | 61 | 263 | 264 | 300 | 0.88 | 0.25 | 80 | Inventive |
| 5 | 21 | 2 | 1 | 10 | 61 | 263 | 264 | 280 | 0.94 | 0.17 | 75 | Inventive |
| 6 | 27 | 2 | 43 | 6 | 51 | 130 | 173 | 360 | 0.48 | 0.11 | 41 | Inventive |
| 7 | 27 | 2 | 43 | 26 | 66 | 190 | 233 | 300 | 0.78 | 0.16 | 80 | Inventive |
| 8 | 26 | 66 | 190 | 27 | 2 | 43 | 233 | 280 | 0.83 | 0.27 | 80 | Inventive |
| 9 | 27 | 2 | 43 | 25 | 67 | 217 | 260 | 300 | 0.87 | 0.3 | 80 | Inventive |
| 10 | 27 | 2 | 43 | 10 | 61 | 263 | 306 | 300 | 1.02 | 0.15 | 70 | Inventive |
| 11 | 24 | 9 | 80 | 26 | 66 | 190 | 270 | 340 | 0.79 | 0.16 | 75 | Inventive |
| 12 | 24 | 9 | 80 | 26 | 66 | 190 | 270 | 320 | 0.84 | 0.3 | 80 | Inventive |
| 13 | 24 | 9 | 80 | 26 | 66 | 190 | 270 | 360 | 1.04 | 0.12 | 60 | Inventive |
| 14 | 25 | 67 | 217 | 24 | 9 | 80 | 297 | 300 | 0.99 | 0.13 | 70 | Inventive |
| 15 | 24 | 9 | 80 | 10 | 61 | 263 | 343 | 340 | 1.01 | 0.14 | 70 | Inventive |
| 16 | 24 | 9 | 80 | 10 | 61 | 263 | 343 | 280 | 1.23 | 0.05 | 40 | Inventive |

Industrial Applicability

An polarizing plate according to the invention can be used as liquid crystal display which can attain both the expansion of viewing angle and the reduction of color change.

It will be apparent to those skilled in the art that various modifications and variations can be made to the described preferred embodiments of the invention without departing from the spirit or scope of the invention. Thus, it is intended that the present invention cover all modifications and variations of this invention consistent with the scope of the appended claims and their equivalents.

This application is based on Japanese Patent Application Nos. JP2004-150640 and JP2004-223220, filed on May 20 of 2004 and Jul. 30 of 2004, respectively, the contents of which is incorporated herein by reference.

The invention claimed is:

1. A polarizing plate comprising: a polarizing film; and at least one protective film, wherein the polarizing plate has a curl amount of from −30 mm to +15 mm at 25° C. and 60% RH, wherein the at least one protective film comprises a first protective film between the polarizing film and a liquid crystal cell, wherein the first protective film satisfies formulae (VII) and (VIII) with respect to Re(λ) and Rth(λ) defined by formulae (V) and (VI):

$$Re(\lambda)=(nx-ny) \times d \quad \text{(V)}$$

$$Rth(\lambda)=\{(nx+ny)/2-nz\} \times d \quad \text{(VI)}$$

$$20 \text{ nm} \leq Re(590) \leq 200 \text{ nm} \qquad \text{(VII)}$$

$$0 \text{ nm} \leq Rth(590) \leq 400 \text{ nm} \qquad \text{(VIII)}$$

wherein $Re(\lambda)$ represents a retardation value by nm in a film plane of the first protective film with respect to light having a wavelength of $\lambda$ nm; $Rth(\lambda)$ represents a retardation value by nm in a direction perpendicular to the film plane with respect to light having the wavelength of $\lambda$ nm; nx represents a refractive index in a slow axis direction in the film plane; ny represent a refractive index in a fast axis direction in the film plane; nz represents a refractive index in the direction perpendicular to the film plane; and d is a thickness of the first protective film.

2. A polarizing plate comprising: a polarizing film; and at least one protective film, wherein the polarizing plate has a curl amount of from −30 mm to +15 mm at 25° C. and 60% RH, wherein the at least one protective film comprises a first protective film between the polarizing film and a liquid crystal cell, wherein the first protective film satisfies formulae (IX) to (XII) with respect to $Re(\lambda)$ and $Rth(\lambda)$:

$$0 \leq Re(590) \leq 10 \text{ nm} \qquad \text{(IX)}$$

$$|Rth(590)| \leq 25 \text{ nm} \qquad \text{(X)}$$

$$|Re(400) - Re(700)| \leq 10 \text{ nm} \qquad \text{(XI)}$$

$$|Rth(400) - Rth(700)| \leq 35 \text{ nm} \qquad \text{(XII)}.$$

3. A polarizing plate comprising: a first protective film having an elastic modulus E1 and a hygroscopic expansion coefficient C1; a polarizing film; and a second protective film having an elastic modulus E2 and a hygroscopic expansion coefficient C2, in this order,
wherein the first protective film is between the polarizing film and a liquid crystal cell,
wherein the elastic moduli E1 and E2 satisfy formula (II):

$$0.3 \times E1 \leq E2 \leq 1.3 \times E1 \qquad \text{(II)}$$

wherein the hygroscopic expansion coefficients C1 and C2 satisfy formula (IV):

$$0.3 \times C1 \leq C2 \leq 1.3 \times C1 \qquad \text{(IV)}$$

wherein the elastic modulus E1 of the first protective film is not equal to the elastic modulus E2 of the second protective film, or the hygroscopic expansion coefficient C1 of the first protective film is not equal to the hygroscopic expansion coefficient C2 of the second protective film,
wherein the polarizing plate has a curl amount of from −30 mm to +15 mm at 25° C. and 60% RH,
wherein the first protective film comprises a cellulose acylate film,
wherein
the cellulose acylate film comprises a cellulose acylate as a main polymer component;
the cellulose acylate is a mixed aliphatic acid ester of cellulose, wherein a hydroxyl group of the cellulose is substituted by an acetyl group, and another hydroxyl group of the cellulose is substituted by an acyl group having 3 or more carbon atoms; and
the cellulose acylate satisfies formulae (XIII) and (XIV):

$$2.0 \leq A + B \leq 3.0 \qquad \text{(XIII)}$$

$$0 < B \qquad \text{(XIV)}$$

wherein A is a degree of substitution by the acetyl group; and B is a degree of substitution by the acyl group having 3 or more carbon atoms.

4. The polarizing plate according to claim 3, wherein the acyl group having 3 or more carbon atoms is a butanoyl group.

5. The polarizing plate according to claim 3, wherein the acyl group having 3 or more carbon atoms is a propionyl group.

6. The polarizing plate according to claim 3, wherein the cellulose acylate has a degree of substitution of hydroxyl group at a 6-position of cellulose of 0.75 or more.

7. A polarizing plate comprising: a first protective film having an elastic modulus E1 and a hygroscopic expansion coefficient C1; a polarizing film; and a second protective film having an elastic modulus E2 and a hygroscopic expansion coefficient C2, in this order,
wherein the first protective film is between the polarizing film and a liquid crystal cell,
wherein the elastic moduli E1 and E2 satisfy formula (II):

$$0.3 \times E1 \leq E2 \leq 1.3 \times E1 \qquad \text{(II)}$$

wherein the hygroscopic expansion coefficients C1 and C2 satisfy formula (IV):

$$0.3 \times C1 \leq C2 \leq 1.3 \times C1 \qquad \text{(IV)}$$

wherein the elastic modulus E1 of the first protective film is not equal to the elastic modulus E2 of the second protective film, or the hygroscopic expansion coefficient C1 of the first protective film is not equal to the hygroscopic expansion coefficient C2 of the second protective film,
wherein the polarizing plate has a curl amount of from −30 mm to +15 mm at 25° C. and 60% RH,
wherein the first protective film is on a side of the polarizing film facing to the liquid crystal cell, the first protective film comprising a cellulose acylate film,
wherein
the cellulose acylate film comprises a cellulose acylate having a glucose unit of cellulose, wherein a hydroxyl group of the glucose unit is substituted by an acyl group having 2 or more carbon atoms; and
DS2, DS3 and DS6 respectively representing degrees of substitution of the hydroxyl groups at 2, 3 and 6 positions of the glucose unit by the acyl group satisfy formula (XV) and (XVI):

$$2.0 \leq DS2 + DS3 + DS6 \leq 3.0 \qquad \text{(XV)}$$

$$DS6/(DS2 + DS3 + DS6) \geq 0.315 \qquad \text{(XVI)}.$$

8. The polarizing plate according to claim 7, wherein the acyl group is an acetyl group.

9. A polarizing plate comprising: a first protective film having an elastic modulus E1 and a hygroscopic expansion coefficient C1; a polarizing film; and a second protective film having an elastic modulus E2 and a hygroscopic expansion coefficient C2, in this order,
wherein the first protective film is between the polarizing film and a liquid crystal cell,
wherein the elastic moduli E1 and E2 satisfy formula (II):

$$0.3 \times E1 \leq E2 \leq 1.3 \times E1 \qquad \text{(II)}$$

wherein the hygroscopic expansion coefficients C1 and C2 satisfy formula (IV):

$$0.3 \times C1 \leq C2 \leq 1.3 \times C1 \qquad \text{(IV)}$$

wherein the elastic modulus E1 of the first protective film is not equal to the elastic modulus E2 of the second protective film, or the hygroscopic expansion coefficient C1 of the first protective film is not equal to the hygroscopic expansion coefficient C2 of the second protective film,
wherein the polarizing plate has a curl amount of from −30 mm to +15 mm at 25° C. and 60% RH, wherein the first protective film comprises a cellulose acylate film having an acyl substitution degree of from 2.85 to 3.00, and the cellulose acylate film has a compound capable of lowering Re(λ) and Rth(λ) in an amount of from 0.01 to 30% by weight based on a solid content of cellulose acylate.

10. A liquid crystal display comprising: a first polarizing plate; a liquid crystal cell; and a second polarizing plate in this order,
wherein
each of the first and second polarizing plates comprises a polarizing film and at least one protective film;
at least one of the first and second polarizing plates has a curl amount of from −30 mm to +15 mm at 25° C. and 60% RH;
the first polarizing plate has a protective film A between the polarizing film and the liquid crystal cell;
the protective film A satisfies formulae (VII) and (VIII) with respect to Re(λ) and Rth(λ) defined by formulae (V) and (VI);
the second polarizing plate has a protective film B between the polarizing film and the liquid crystal cell; and
the protective film B satisfies formula (XVII) with respect to Rth(λ):

$$Re(\lambda)=(nx-ny)\times d \tag{V}$$

$$Rth(\lambda)=\{(nx+ny)/2-nz\}\times d \tag{VI}$$

$$20 \text{ nm} \leq Re(590) \leq 200 \text{ nm} \tag{VII}$$

$$0 \text{ nm} \leq Rth(590) \leq 400 \text{ nm} \tag{VIII}$$

$$50 \text{ nm} \leq Rth(590) \leq 150 \text{ nm} \tag{XVII}$$

wherein Re(λ) represents a retardation value by nm in a film plane of the protective film with respect to light having a wavelength of λ nm; Rth(λ) represents a retardation value by nm in a direction perpendicular to the film plane with respect to light having the wavelength of λ nm; nx represents a refractive index in a slow axis direction in the film plane; ny represent a refractive index in a fast axis direction in the film plane; nz represents a refractive index in the direction perpendicular to the film plane; and d is a thickness of the protective film.

11. The liquid crystal display according to claim 10, wherein the protective film B satisfies formula (XVIII) with respect to Re(λ):

$$Re(590) \leq 20 \text{ nm} \tag{XVIII}$$

12. A liquid crystal display comprising: a first polarizing plate; a liquid crystal cell; and a second polarizing plate in this order,
wherein
each of the first and second polarizing plates comprises a polarizing film and at least one protective film;
at least one of the first and second polarizing plates has a curl amount of from −30 mm to +15 mm at 25° C. and 60% RH;
the first polarizing plate has a protective film A between the polarizing film and the liquid crystal cell;
the protective film A satisfies formulae (VII) and (VIII) with respect to Re(λ) and Rth(λ) defined by formulae (V) and (VI);
the second polarizing plate has a protective film B between the polarizing film and the liquid crystal cell;
the protective film B satisfies formula (XIX) with respect to Rth(λ):

$$Re(\lambda)=(nx-ny)\times d \tag{V}$$

$$Rth(\lambda)=\{(nx+ny)/2-nz\}\times d \tag{VI}$$

$$20 \text{ nm} \leq Re(590) \leq 200 \text{ nm} \tag{VII}$$

$$0 \text{ nm} \leq Rth(590) \leq 400 \text{ nm} \tag{VIII}$$

$$Rth(590) \leq 35 \text{ nm} \tag{XIX}$$

wherein Re(λ) represents a retardation value by nm in a film plane of the protective film with respect to light having a wavelength of λ nm; Rth(λ) represents a retardation value by nm in a direction perpendicular to the film plane with respect to light having the wavelength of λ nm; nx represents a refractive index in a slow axis direction in the film plane; ny represent a refractive index in a fast axis direction in the film plane; nz represents a refractive index in the direction perpendicular to the film plane; and d is a thickness of the protective film.

13. The liquid crystal display according to claim 12, wherein the protective film B satisfies formulae (IX) to (XII) with respect to Re(λ) and Rth(λ):

$$0 \leq Re(590) \leq 10 \text{ nm} \tag{IX}$$

$$|Rth(590)| \leq 25 \text{ nm} \tag{X}$$

$$|Re(400)-Re(700)| \leq 10 \text{ nm} \tag{XI}$$

$$|Rth(400)-Rth(700)| \leq 35 \text{ nm} \tag{XII}$$

14. A liquid crystal display comprising: a first polarizing plate; a liquid crystal cell; and a second polarizing plate in this order,
wherein
each of the first and second polarizing plates comprises a polarizing film and at least one protective film;
at least one of the first and second polarizing plates has a curl amount of from −30 mm to +15 mm at 25° C. and 60% RH;
the first polarizing plate has a protective film A between the polarizing film and the liquid crystal cell;
the second polarizing plate has a protective film B between the polarizing film and the liquid crystal cell; and
the liquid crystal display satisfies formula (XX):

$$0.9 \leq Rth(590)\text{total}/\Delta n \times d\text{cell} \leq 1.1 \tag{XX}$$

wherein Rth(590)total represents a sum of Rth(λ) of the protective film A and Rth(λ) of the protective film B; Rth(λ) represents a retardation value by nm in a direction perpendicular to a film plane of the protective film with respect to light having a wavelength of λ nm; Δn is a birefringence of a liquid crystal in the liquid crystal cell; and dcell is cell gap.

15. The liquid crystal display according to claim 14, wherein the protective film A satisfies formulae (VII) and (VIII) with respect to Re(λ) and Rth(λ) defined by formulae (V) and (VI); and
the protective film B satisfies formula (XVII) with respect to Rth(λ):

$$Re(\lambda)=(nx-ny)\times d \tag{V}$$

$$Rth(\lambda)=\{(nx+ny)/2-nz\}\times d \tag{VI}$$

$$20 \text{ nm} \leq Re(590) \leq 200 \text{ nm} \tag{VII}$$

$$0 \text{ nm} \leq Rth(590) \leq 400 \text{ nm} \tag{VIII}$$

wherein Re(λ) represents a retardation value by nm in a film plane of the protective film with respect to light having a wavelength of λ nm; Rth(2) represents a retardation value by nm in a direction perpendicular to the film plane with respect to light having the wavelength of λnm; nx represents a refractive index in a slow axis direction in the film plane; ny represents a refractive index in a fast axis direction in the film plane; nz represents a refractive index in the direction perpendicular to the film plane; and d is a thickness of the protective film.

16. The liquid crystal display according to claim 15, wherein the protective film B satisfies formula (XVIII) with respect to Re(λ):

$$Re(590) \leq 20 \text{ nm} \tag{XVIII}$$

17. A liquid crystal display comprising: a first polarizing plate; a liquid crystal cell; and a second polarizing plate in this order,
wherein
each of the first and second polarizing plates comprises a polarizing film and at least one protective film;
at least one of the first and second polarizing plates has a curl amount of from −30 mm to +15 mm at 25° C. and 60% RH;
the first polarizing plate has a protective film A between the polarizing film and the liquid crystal cell;
the second polarizing plate has a protective film B between the polarizing film and the liquid crystal cell; and
the liquid crystal display satisfies formula (XXI):

$$0.6 \leq Rth(590)\text{total}/\Delta n \times d\text{cell} \leq 0.8 \tag{XXI}$$

wherein Rth(590)total represents a sum of Rth(λ) of the protective film A and Rth(λ) of the protective film B; Rth(λ) represents a retardation value by nm in a direction perpendicular to a film plane of the protective film with respect to light having a wavelength of λnm; Δn is a birefringence of a liquid crystal in the liquid crystal cell; and dcell is cell gap.

18. The liquid crystal display according to claim 17, wherein the protective film A satisfies formulae (VII) and (VIII) with respect to Re(λ) and Rth(λ) defined by formulae (V) and (VI); and
the protective film B satisfies formula (XIX) with respect to Rth(A):

$$Re(\lambda)=(nx-ny)\times d \tag{V}$$

$$Rth(\lambda)=\{(nx+ny)/2-nz\}\times d \tag{VI}$$

$$20 \text{ nm } Re(590) \leq 200 \text{ nm} \tag{VII}$$

$$0 \text{ nm} \leq Rth(590) \leq 400 \text{ nm} \tag{VIII}$$

$$Rth(590) \leq 35 \text{ nm} \tag{XIX}$$

wherein Re(λ) represents a retardation value by nm in a film plane of the protective film with respect to light having a wavelength of λnm; Rth(λ) represents a retardation value by nm in a direction perpendicular to the film plane with respect to light having the wavelength of λnm; nx represents a refractive index in a slow axis direction in the film plane; ny represent a refractive index in a fast axis direction in the film plane; nz represents a refractive index in the direction perpendicular to the film plane; and d is a thickness of the protective film.

19. The liquid crystal display device according to claim 18, wherein the protective film B satisfies formulae (IX) to (XII) with respect to Re(λ) and Rth(λ):

$$0 \leq Re(590) \leq 10 \text{ nm} \tag{IX}$$

$$|Rth(590)| \leq 25 \text{ nm} \tag{X}$$

$$|Re(400)-Re(700)| \leq 10 \text{ nm} \tag{XI}$$

$$|Rth(400)-Rth(700)| \leq 35 \text{ nm} \tag{XII}$$

20. A polarizing plate comprising: a first protective film having an elastic modulus E1 and a hygroscopic expansion coefficient C1; a polarizing film; and a second protective film having an elastic modulus E2 and a hygroscopic expansion coefficient C2, in this order,
wherein the first protective film is between the polarizing film and a liquid crystal cell,
wherein the elastic moduli E1 and E2 satisfy formula (II):

$$0.3 \times E1 \leq E2 \leq 1.3 \times E1 \tag{II}$$

wherein the hygroscopic expansion coefficients C1 and C2 satisfy formula (IV):

$$0.3 \times C1 \leq C2 \leq 1.3 \times C1 \tag{IV}$$

wherein the elastic modulus E1 of the first protective film is not equal to the elastic modulus E2 of the second protective film, or the hygroscopic expansion coefficient C1 of the first protective film is not equal to the hygroscopic expansion coefficient C2 of the second protective film,
wherein the polarizing plate has a curl amount of from −30 mm to +15 mm at 25° C. and 60% RH,
wherein the first protective film satisfies formulae (VII) and (VIII) with respect to Re(λ) and Rth(λ) defined by formulae (V) and (VI):

$$Re(\lambda)=(nx-ny)\times d \tag{V}$$

$$Rth(\lambda)=\{(nx+ny)/2-nz\}\times d \tag{VI}$$

$$20 \text{ nm} \leq Re(590) \leq 200 \text{ nm} \tag{VII}$$

$$0 \text{ nm} \leq Rth(590) \leq 400 \text{ nm} \tag{VIII}$$

wherein Re(λ) represents a retardation value by nm in a film plane of the first protective film with respect to light having a wavelength of λnm; Rth(λ) represents a retardation value by nm in a direction perpendicular to the film plane with respect to light having the wavelength of λnm; nx represents a refractive index in a slow axis direction in the film plane; ny represent a refractive index in a fast axis direction in the film plane; nz represents a refractive index in the direction perpendicular to the film plane; and d is a thickness of the first protective film.

21. A polarizing plate comprising: a first protective film having an elastic modulus E1 and a hygroscopic expansion coefficient C1; a polarizing film; and a second protective film having an elastic modulus E2 and a hygroscopic expansion coefficient C2, in this order,
wherein the first protective film is between the polarizing film and a liquid crystal cell,
wherein the elastic moduli E1 and E2 satisfy formula (II):

$$0.3 \times E1 E2 \leq 1.3 \times E1 \tag{II}$$

wherein the hygroscopic expansion coefficients C1 and C2 satisfy formula (IV):

$$0.3 \times C1 \leq C2 \leq 1.3 \times C1 \tag{IV}$$

wherein the elastic modulus E1 of the first protective film is not equal to the elastic modulus E2 of the second protective film, or the hygroscopic expansion coefficient C1 of the first protective film is not equal to the hygroscopic expansion coefficient C2 of the second protective film,
wherein the polarizing plate has a curl amount of from −30 mm to +15 mm at 25° C. and 60% RH, wherein the first protective film satisfies formulae (IX) to (XII) with respect to Re(λ) and Rth(λ):

$$0 \leq Re(590) \leq 10 \text{ nm} \tag{IX}$$

$$|Rth(590)| \leq 25 \text{ nm} \tag{X}$$

$$|Re(400) - Re(700)| \leq 10 \text{ nm} \tag{XI}$$

$$|Rth(400) - Rth(700)| \leq 35 \text{ nm} \tag{XII}.$$

* * * * *